US011841097B2

(12) United States Patent
McNamara et al.

(10) Patent No.: US 11,841,097 B2
(45) Date of Patent: *Dec. 12, 2023

(54) PRE-ASSEMBLED COUPLING ASSEMBLIES WITH PIPE FITTING

(71) Applicant: Anvil International, LLC, Portsmouth, NH (US)

(72) Inventors: Matthew William McNamara, Portsmouth, RI (US); Jordan Cameron Belen, West Warwick, RI (US); Stephen Eric Scott, North Kingstown, RI (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/104,505

(22) Filed: Nov. 25, 2020

(65) Prior Publication Data

US 2021/0080036 A1    Mar. 18, 2021

Related U.S. Application Data

(63) Continuation of application No. 16/044,161, filed on Jul. 24, 2018, now Pat. No. 11,268,638.

(Continued)

(51) Int. Cl.
*F16L 21/06* (2006.01)
*F16L 17/04* (2006.01)
(Continued)

(52) U.S. Cl.
CPC ............. *F16L 21/065* (2013.01); *B29C 65/56* (2013.01); *F16K 15/00* (2013.01); *F16K 15/03* (2013.01);
(Continued)

(58) Field of Classification Search
CPC .......... F16L 21/065; F16L 21/03; F16L 17/04
See application file for complete search history.

(56) References Cited

U.S. PATENT DOCUMENTS

| 29,731 A | 8/1860 | Truss |
| 179,947 A | 7/1876 | O'Neill |

(Continued)

FOREIGN PATENT DOCUMENTS

| CN | 202024016 | 2/2011 |
| CN | 102003584 | 4/2011 |

(Continued)

OTHER PUBLICATIONS

McNamara, Matthew William; Notice of Allowance for U.S. Appl. No. 16/044,080, filed Jul. 24, 2018, dated Aug. 24, 2021, 10 pgs.

(Continued)

*Primary Examiner* — Zachary T Dragicevich
*Assistant Examiner* — Fannie C Kee
(74) *Attorney, Agent, or Firm* — Taylor English Duma LLP

(57) ABSTRACT

A sprinkler configured for engagement with a coupling, the sprinkler including a raised lip end; and a distal end disposed opposite from the raised lip end, the sprinkler defining a raised lip between the distal end and the raised lip end, the sprinkler defining a groove between the raised lip and the distal end.

14 Claims, 43 Drawing Sheets

Related U.S. Application Data

(60) Provisional application No. 62/538,480, filed on Jul. 28, 2017.

(51) Int. Cl.
*F16L 21/03* (2006.01)
*F16K 15/03* (2006.01)
*F16K 27/06* (2006.01)
*F16K 27/02* (2006.01)
*B29C 65/56* (2006.01)
*F16K 15/00* (2006.01)
*F16L 41/02* (2006.01)
*F16L 43/00* (2006.01)

(52) U.S. Cl.
CPC ........ *F16K 27/0218* (2013.01); *F16K 27/067* (2013.01); *F16L 17/04* (2013.01); *F16L 21/03* (2013.01); *F16L 41/021* (2013.01); *F16L 43/00* (2013.01)

(56) References Cited

U.S. PATENT DOCUMENTS

| | | | |
|---|---|---|---|
| 771,682 A | 10/1904 | Sussman |
| 1,093,868 A | 4/1914 | Leighty |
| 1,830,782 A | 11/1931 | Burnish et al. |
| 1,862,153 A | 6/1932 | Lee |
| 2,020,156 A | 11/1935 | Muchnic |
| 2,131,509 A | 9/1938 | Goepel et al. |
| 2,283,672 A | 5/1942 | Frances |
| 2,548,934 A | 4/1951 | Beaird |
| 2,794,658 A | 6/1957 | Purkhiser |
| 2,812,959 A | 11/1957 | Fuller |
| 2,999,700 A | 9/1961 | Smith |
| 3,006,663 A | 10/1961 | Bowne |
| 3,207,184 A | 9/1965 | Lambert |
| 3,231,298 A | 1/1966 | Tomb et al. |
| 3,233,907 A | 2/1966 | Stanton |
| 3,235,293 A | 2/1966 | Condon |
| 3,278,202 A | 10/1966 | Smith |
| 3,351,352 A | 11/1967 | Blakeley et al. |
| 3,419,291 A | 12/1968 | Tomb et al. |
| 3,467,120 A | 9/1969 | Hill et al. |
| 3,479,066 A | 11/1969 | Gittleman |
| 3,596,934 A | 8/1971 | DeCenzo |
| 3,633,947 A | 1/1972 | Nelson |
| 3,743,329 A | 7/1973 | Wesel, Sr. |
| 3,768,736 A * | 10/1973 | Cox ........................ B05B 1/265 169/37 |
| 3,776,579 A | 12/1973 | Gale |
| 3,896,880 A | 7/1975 | Asp |
| 3,996,966 A | 12/1976 | Princell |
| 4,112,979 A | 9/1978 | Widdicombe |
| 4,127,290 A | 11/1978 | Mutschlechner |
| 4,316,053 A | 2/1982 | Rieffle |
| 4,417,755 A | 11/1983 | Gittleman |
| 4,448,448 A | 5/1984 | Pollia |
| 4,471,979 A | 9/1984 | Gibb et al. |
| 4,522,434 A | 6/1985 | Webb |
| 4,576,778 A | 3/1986 | Ferree et al. |
| 4,601,495 A | 7/1986 | Webb |
| 4,719,687 A | 1/1988 | Nanny |
| 4,938,145 A | 7/1990 | Martwick |
| 5,031,755 A | 7/1991 | Blakely |
| 5,109,929 A * | 5/1992 | Spears ........................ F16L 47/24 169/37 |
| 5,131,689 A | 7/1992 | Bates |
| 5,469,890 A | 11/1995 | Carpentier |
| 5,642,907 A | 7/1997 | Dole |
| 5,658,021 A | 8/1997 | Matsumoto et al. |
| 5,678,607 A | 10/1997 | Krywitsky |
| 5,694,978 A | 12/1997 | Heilmann et al. |
| 6,056,326 A | 5/2000 | Guest |
| 6,123,363 A | 9/2000 | Burgard et al. |
| 6,220,635 B1 | 4/2001 | Vitel et al. |
| 6,450,551 B1 | 9/2002 | Lee |
| 6,467,812 B1 | 10/2002 | Klemm et al. |
| 6,523,866 B2 | 2/2003 | Lin |
| 7,086,131 B2 | 8/2006 | Gibb et al. |
| 7,533,699 B1 | 5/2009 | Cellemme et al. |
| 7,712,796 B2 | 5/2010 | Gibb et al. |
| 7,950,701 B2 | 5/2011 | Dole et al. |
| 8,038,176 B2 | 10/2011 | Bowman et al. |
| 8,122,969 B1 | 2/2012 | Fischer |
| 8,282,136 B2 | 10/2012 | Vandal et al. |
| 8,459,370 B2 * | 6/2013 | Orr ........................ A62C 35/68 169/37 |
| 8,474,472 B2 * | 7/2013 | Spears .................... F16L 15/02 137/15.09 |
| 8,480,134 B2 | 7/2013 | Crompton et al. |
| 8,777,277 B2 | 7/2014 | Dole |
| 9,010,164 B2 | 4/2015 | Novitsky |
| 9,038,428 B2 | 5/2015 | Novitsky |
| 9,039,046 B2 | 5/2015 | Beagen, Jr. |
| 9,194,516 B2 | 11/2015 | Beagen, Jr. |
| 9,297,484 B2 | 3/2016 | Beagen, Jr. |
| 9,333,543 B2 | 5/2016 | Dole |
| 9,528,642 B2 | 12/2016 | Bancroft |
| 9,611,960 B2 | 4/2017 | Swingley |
| 9,976,677 B2 | 5/2018 | Lurk et al. |
| 10,018,290 B2 | 7/2018 | Kishi et al. |
| 10,471,288 B2 | 11/2019 | Bancroft et al. |
| 11,209,107 B2 | 12/2021 | McNamara et al. |
| 11,215,301 B2 | 1/2022 | McNamara et al. |
| 11,268,638 B2 | 3/2022 | McNamara et al. |
| 11,391,396 B2 * | 7/2022 | Ohnemus .................. F16L 3/02 |
| 11,592,129 B2 | 2/2023 | McNamara et al. |
| 2003/0227171 A1 | 12/2003 | Legeai et al. |
| 2005/0253380 A1 | 11/2005 | Gibb et al. |
| 2006/0061095 A1 | 3/2006 | Sabando et al. |
| 2006/0232063 A1 | 10/2006 | Steingass et al. |
| 2007/0216158 A1 | 9/2007 | Kertesz et al. |
| 2008/0284159 A1 | 11/2008 | Krehl |
| 2009/0127846 A1 | 5/2009 | Dole et al. |
| 2009/0272453 A1 | 11/2009 | Schlecht |
| 2010/0102549 A1 | 4/2010 | Radzik |
| 2012/0124804 A1 | 5/2012 | Vandal |
| 2014/0103043 A1 | 4/2014 | Lonsway et al. |
| 2014/0327238 A1 | 11/2014 | Bowman |
| 2015/0020371 A1 | 1/2015 | Beagen, Jr. |
| 2015/0285417 A1 | 10/2015 | Beagen |
| 2016/0223110 A1 | 8/2016 | Novitsky |
| 2017/0184226 A1 | 6/2017 | Cuvo et al. |
| 2017/0184232 A1 | 6/2017 | Langhelle |
| 2017/0205014 A1 | 7/2017 | Kelk |
| 2017/0328500 A1 | 11/2017 | Bowman et al. |
| 2018/0200550 A1 | 7/2018 | Bancroft et al. |
| 2018/0306369 A1 | 10/2018 | Piontek et al. |
| 2019/0032823 A1 | 1/2019 | McNamara et al. |
| 2019/0032824 A1 | 1/2019 | McNamara et al. |
| 2019/0032825 A1 | 1/2019 | McNamara et al. |
| 2019/0063645 A1 | 2/2019 | McNamara et al. |
| 2019/0078710 A1 | 3/2019 | Nishijima et al. |
| 2021/0164594 A1 | 6/2021 | McNamara et al. |
| 2022/0042628 A1 | 2/2022 | McNamara et al. |
| 2022/0074527 A1 | 3/2022 | McNamara et al. |

FOREIGN PATENT DOCUMENTS

| | | |
|---|---|---|
| DE | 29506622 | 6/1995 |
| DE | 19851723 | 5/2000 |
| DE | 10340946 | 12/2004 |
| DE | 102004034791 | 6/2006 |
| DE | 102015001633 | 8/2016 |
| EP | 0264587 | 4/1988 |
| EP | 2669561 | 12/2013 |
| EP | 2783146 | 10/2014 |
| EP | 3645925 | 7/2023 |
| FR | 2184631 | 12/1973 |
| JP | H0960774 | 3/1997 |
| JP | 2009052715 | 3/2009 |
| JP | 4317352 | 8/2009 |
| KR | 100808545 | 3/2008 |

(56) References Cited

FOREIGN PATENT DOCUMENTS

| KR | 200449405 | 7/2010 |
| KR | 100989052 | 10/2010 |
| KR | 101085122 | 11/2011 |
| KR | 101579403 | 12/2015 |
| WO | 2019023554 | 1/2019 |
| WO | 2019023556 | 1/2019 |
| WO | 2019023557 | 1/2019 |

OTHER PUBLICATIONS

McNamara, Matthew William; Notice of Allowance for U.S. Appl. No. 16/044,095, filed Jul. 24, 2018, dated Jul. 26, 2021, 9 pgs.
McNamara, Matthew William; Final Office Action for U.S. Appl. No. 16/044,161, filed Jul. 24, 2018, dated Aug. 4, 2021, 23 pgs.
McNamara, Matthew Wililam; Notice of Allowance for U.S. Appl. No. 16/171,809, filed Oct. 26, 2018, dated Sep. 9, 2022, 9 pgs.
McNamara, Matthew William; Office Action for European patent application No. 18839358.1, filed Jul. 27, 2018, dated Jul. 29, 2022, 4 pgs.
McNamara, Matthew William; Office Action for Mexico patent application No. MX/a/2020/001069, filed Jun. 27, 2018, dated Aug. 26, 2022, 7 pgs.
McNamara, Matthew William; Non-Final Office Action for U.S. Appl. No. 16/044,095, filed Jul. 24, 2018, dated Feb. 11, 2021, 58 pgs.
McNamara, Matthew William; Non-Final Office Action for U.S. Appl. No. 16/171,809, filed Oct. 26, 2018, dated Feb. 18, 2021, 55 pgs.
McNamara, Matthew William; Extended European Search Report for application No. 18839358.1, filed Jul. 27, 2018, dated Mar. 9, 2021, 11 pgs.
McNamara, Matthew William; Extended European Search Report for application No. 18837561.2, filed Jul. 27, 2018, dated Mar. 5, 2021, 11 pgs.
McNamara, Matthew William; Extended European Search report for application No. 18838122.2, filed Jul. 27, 2018, dated Mar. 1, 2021, 10 pgs.
McNamara, Matthew William; Non-Final Office Action for U.S. Appl. No. 16/044,080, filed Jul. 24, 2018, dated Apr. 27, 2021, 22 pgs.
McNamara, Matthew William; Final Office Action for U.S. Appl. No. 16/044,095, filed Jul. 24, 2018, dated May 18, 2021, 10 pgs.
McNamara, Matthew William; Final Office Action for U.S. Appl. No. 16/171,809, filed Oct. 26, 2018, dated May 6, 2022, 13 pgs.
McNamara, Matthew William; Office Action for Mexico patent application No. MX/a/2020/001069, filed Jun. 27, 2018, dated Apr. 7, 2022, 7 pgs.
McNamara, Matthew William; Final Office Action for U.S. Appl. No. 16/044,080, filed Jul. 24, 2018, dated Oct. 27, 2020, 25 pgs.
McNamara, Matthew William; Non-Final Office Action for U.S. Appl. No. 16/044,080, filed Jul. 24, 2018, dated May 28, 2020, 48 pgs.
McNamara, Matthew William; Requirement for Restriction/Election for U.S. Appl. No. 16/044,080, filed Jul. 24, 2018, dated Mar. 17, 2020, 5 pgs.
Victaulic; Brochure for Victaulic® VicFlex™ Flexible Hose with Fittings for Fire Protection Service, updated Jan. 2018, 18 pgs.
McNamara, Matthew William; Requirement for Restriction/Election for U.S. Appl. No. 16/044,095, filed Jul. 24, 2018, dated Dec. 9, 2020, 7 pgs.
McNamara, Matthew William; Requirement for Restriction/Election for U.S. Appl. No. 16/171,809, filed Oct. 26, 2018, dated Nov. 2, 2020, 8 pgs.
McNamara, Mathew William; Invitation to Pay Additional Fees for PCT Application No. PCT/US2018/044052, filed Jul. 27, 2018, dated Sep. 12, 2018, 2 pgs.
McNamara, Matthew William; International Preliminary Report on Patentability for PCT Application No. PCT/US2018/44052, filed Jul. 27, 2018, dated Feb. 6, 2020, 9 pgs.
McNamara, Matthew William; International Search Report for PCT Application No. PCT/US2018/44052, filed Jul. 27, 2018, dated Nov. 21, 2018, 12 pgs.
McNamara, Matthew William; International Preliminary Report n Patentability for PCT Application No. PCT/US2018/044054, filed Jul. 27, 2018, dated Feb. 6, 2020, 9 pgs.
McNamara, Matthew William; International Search Report for PCT Application No. PCT/US2018/044054, filed Jul. 27, 2018, dated Oct. 15, 2018, 10 pgs.
McNamara, Matthew William; International Preliminary Report on Patentability for PCT Application No. PCT/US2018/044055, filed Jul. 27, 2018, dated Feb. 6, 2020, 9 pgs.
McNamara, Matthew William; International Search Report for PCT Application No. PCT/US2018/044055, filed Jul. 27, 2018, dated Nov. 30, 2018, 12 pgs.
McNamara, Matthew William; Invitation to Pay Additional Fees for PCT Application No. PCT/US2018/044055, filed Jul. 27, 2018, dated Sep. 17, 2018, 2 pgs.
Victaulic; Article entitled: "Victaulic Introduces New FireLock® Innovative Groove System (IGS) for Small Diameter Hard-pipe Solutions", published May 15, 2017, 3 pgs.
McNamara, Matthew William; Supplemental Notice of Allowance for U.S. Appl. No. 16/044,095, filed Jul. 24, 2018, dated Nov. 1, 2021, 6 pgs.
McNamara, Matthew William; Notice of Allowance for U.S. Appl. No. 16/044,161, filed Jul. 24, 2018, dated Nov. 23, 2021, 9 pgs.
McNamara, Matthew William; Non-Final Office Action for U.S. Appl. No. 16/171,809, filed Oct. 26, 2018, dated Oct. 27, 2021, 24 pgs.
McNamara, Matthew William; Office Action for application No. 18838122.2, filed Jul. 27, 2018, dated Nov. 23, 2022, 5 pgs.
McNamara, Matthew William; Non-Final Office Action for U.S. Appl. No. 17/510,030, filed Oct. 25, 2021, dated Jul. 27, 2023, 49 pgs.
McNamara, Matthew William; Requirement for Restriction/Election for U.S. Appl. No. 17/510,030, filed Oct. 25, 2021, dated Jun. 7, 2023, 9 pgs.
McNamara, Matthew William; Non-Final Office Action for U.S. Appl. No. 17/171,909, filed Feb. 9, 2021, dated May 19, 2023, 33 pgs.
McNamara, Matthew William; Examination Report for Australian patent application No. 2018307818, filed Jul. 17, 2018, dated Jul. 12, 2023, 4 pgs.
McNamara, Matthew William; Examination Report for Australian patent application No. 2018307817, filed Jul. 27, 2018, dated Jul. 7, 2023, 4 pgs.
McNamara, Matthew William; Examination Report for Australian patent application No. 2018306608, filed Jul. 27, 2018, dated Jul. 4, 2023, 4 pgs.
Anvil, "Gruvlok Installation and Assembly Figure 7400 Rigidlite Coupling-Advanced Copper Method", Anvil Pipe Fitters Handbook, publicly available prior to Jul. 24, 2018, 3 pgs.
McNamara, Matthew William; Non-Final Office Action for U.S. Appl. No. 16/044,161, filed Jul. 24, 2018, dated Dec. 17, 2020, 49 pgs.
McNamara, Matthew William; Requirement for Restriction/Election for U.S. Appl. No. 16/044,161, filed Jul. 24, 2018, dated Jul. 29, 2020, 8 pgs.
McNamara, Matthew William; Extended European Search Report for application No. 23175188.4, filed Jul. 27, 2018, dated Aug. 14, 2023, 7 pgs.
McNamara, Matthew William; Non-Final Office Action for U.S. Appl. No. 17/524,926, filed Nov. 12, 2021, dated Sep. 1, 2023, 59 pgs.
McNamara, Matthew William; Final Office Action for U.S. Appl. No. 17/171,909, filed Feb. 9, 2021, dated Oct. 6, 2023, 17 pgs.

* cited by examiner

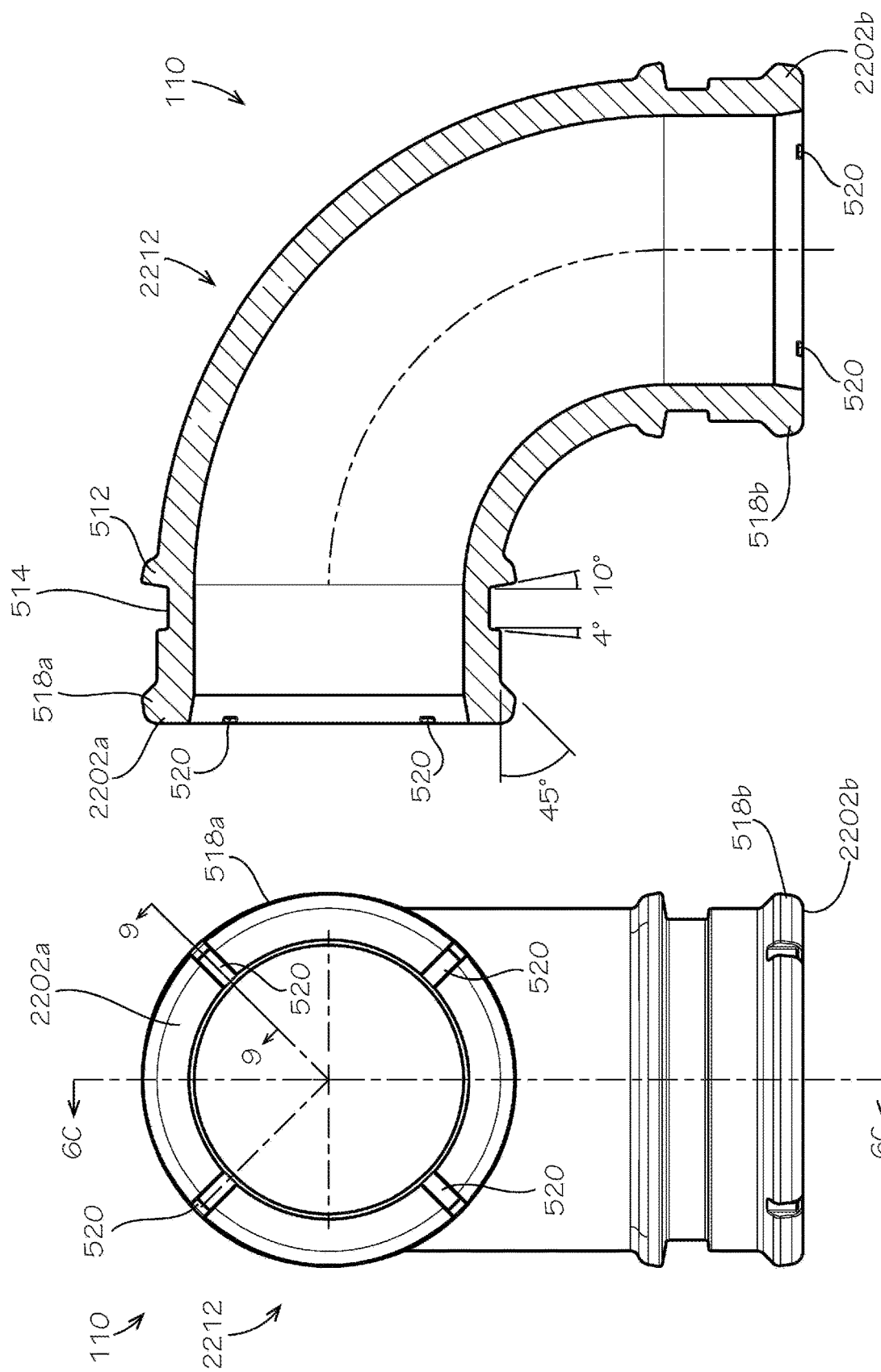

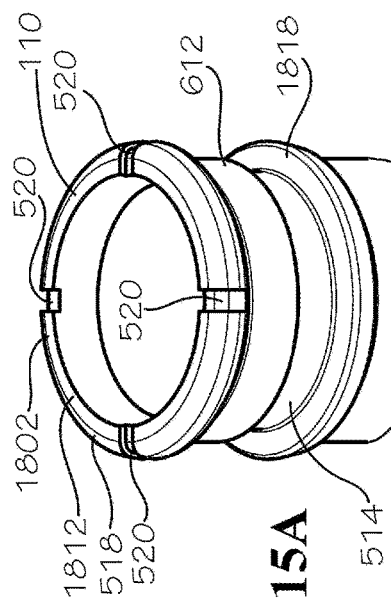
FIG. 15A
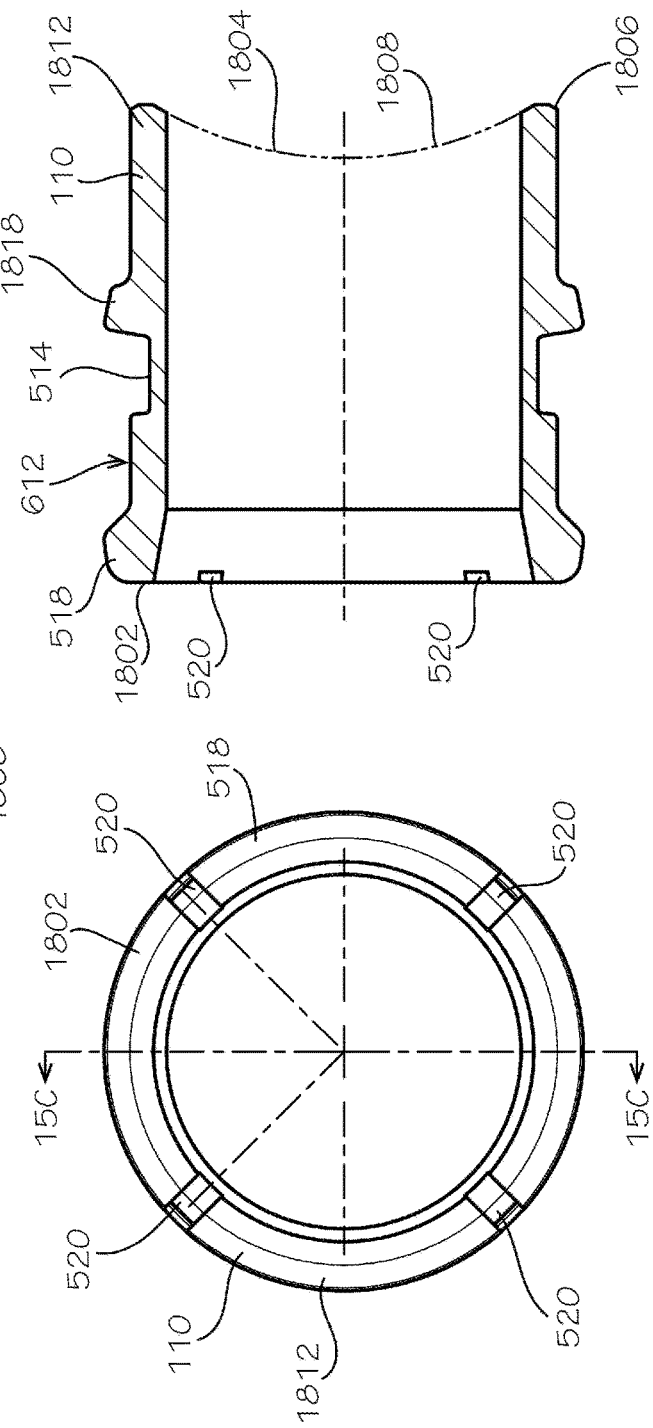
FIG. 15C
FIG. 15B

PRE-ASSEMBLED COUPLING ASSEMBLIES WITH PIPE FITTING

CROSS-REFERENCE TO RELATED APPLICATIONS

This application is a continuation of U.S. application Ser. No. 16/044,161, filed Jul. 24, 2018, which claims the benefit of U.S. Provisional Application No. 62/538,480, filed on Jul. 28, 2017, which are each hereby incorporated by reference in their entirety.

TECHNICAL FIELD

This disclosure relates to couplings and pipe fittings. More specifically, this disclosure relates to couplings which are retained on pipe fittings to form a pre-assembled coupling assembly.

BACKGROUND

Pipe couplings are commonly used to connect two pipe elements, such as pipe lengths and pipe fittings, to assemble a piping system. Pipe fittings can include elbows, tees, caps, valves, reducers, sprinklers, and other types of pipe fittings. Slip-on pipe couplings are one type of pipe coupling which can be slipped over the ends of two adjacent pipe elements in a relaxed position and then tightened to a tensioned position to connect the two pipe elements together. It can be difficult for a single worker to align both pipe elements and secure the ends of the pipe elements within the coupling while tightening the coupling. Often multiple workers cooperate to couple the pipe elements together which can reduce efficiency and increase the man hours required to assemble the piping system.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a sprinkler configured for engagement with a coupling, the sprinkler comprising a raised lip end; and a distal end disposed opposite from the raised lip end, the sprinkler defining a raised lip between the distal end and the raised lip end, the sprinkler defining a groove between the raised lip and the distal end.

Also disclosed is a pre-assembled coupling assembly comprising a coupling, the coupling defining a coupling bore extending through the coupling, the coupling comprising a gasket disposed within the coupling bore, the gasket being relaxed and uncompressed when the coupling is in a relaxed position; and a sprinkler, the sprinkler defining a raised lip end and a distal end disposed opposite from the raised lip end, the raised lip end inserted into the coupling bore, the coupling retained on the raised lip end of the sprinkler when the coupling is in the relaxed position.

Also disclosed is a method for using a pre-assembled coupling assembly, the method comprising providing a sprinkler defining a raised lip end and a distal end disposed opposite from the raised lip end, the sprinkler defining an axis extending from the raised lip end to the distal end; axially inserting the raised lip end into a gasket, a raised lip of the sprinkler positioned radially outward from at least a portion of the gasket relative to the axis; and assembling a housing around the gasket, the housing and the gasket comprising a coupling, the coupling retained on the raised lip end of the sprinkler when the coupling is in a relaxed position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

FIG. 6B is an end view of the elbow fitting of FIG. 5A.

FIG. 6C is a cross-sectional side view of the elbow fitting of FIG. 5A taken along line 6C-6C shown in FIG. 6B.

FIG. 15A is a perspective view of another aspect of the pipe fitting defining a weldolet in accordance with another aspect of the present disclosure.

FIG. 15B is an end view of the weldolet of FIG. 15A.

FIG. 15C is a cross-sectional side view of the weldolet of FIG. 15A taken along line 15C-15C shown in FIG. 15B.

DETAILED DESCRIPTION

Figure 1:
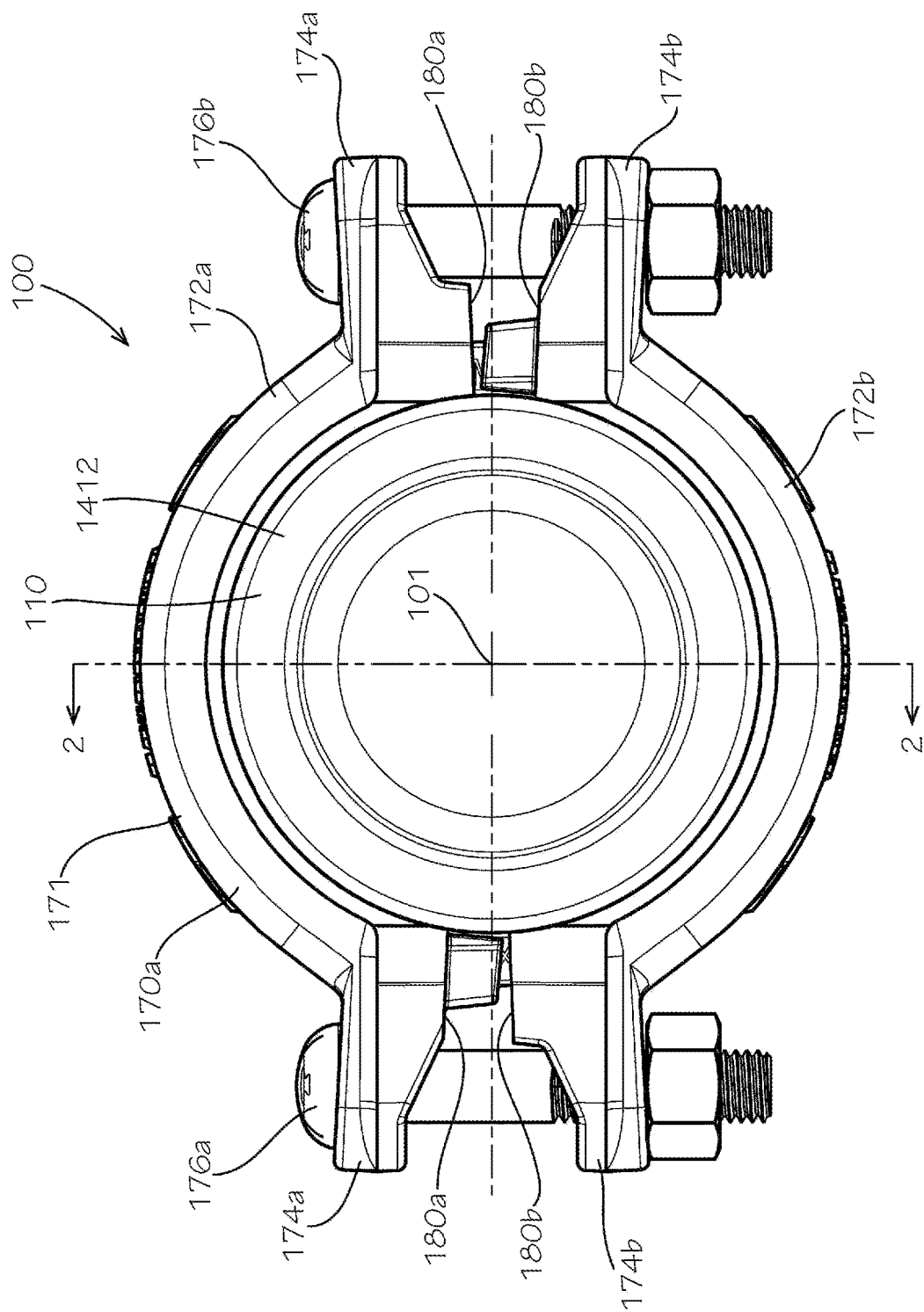
FIG. 1 is an end view of a pre-assembled coupling assembly comprising two couplings and a pipe fitting defining a raised-lip pipe in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pre-assembled coupling assembly and associated methods, systems, devices, and various apparatus. The pre-assembled coupling assembly can comprise a pipe fitting and a coupling retained on an end of the pipe fitting. It would be understood by one of skill in the art that the disclosed pre-assembled coupling is described in but a few exemplary aspects among many. No particular terminology or description should be considered limiting on the disclosure or the scope of any claims issuing therefrom.

Figure 2:
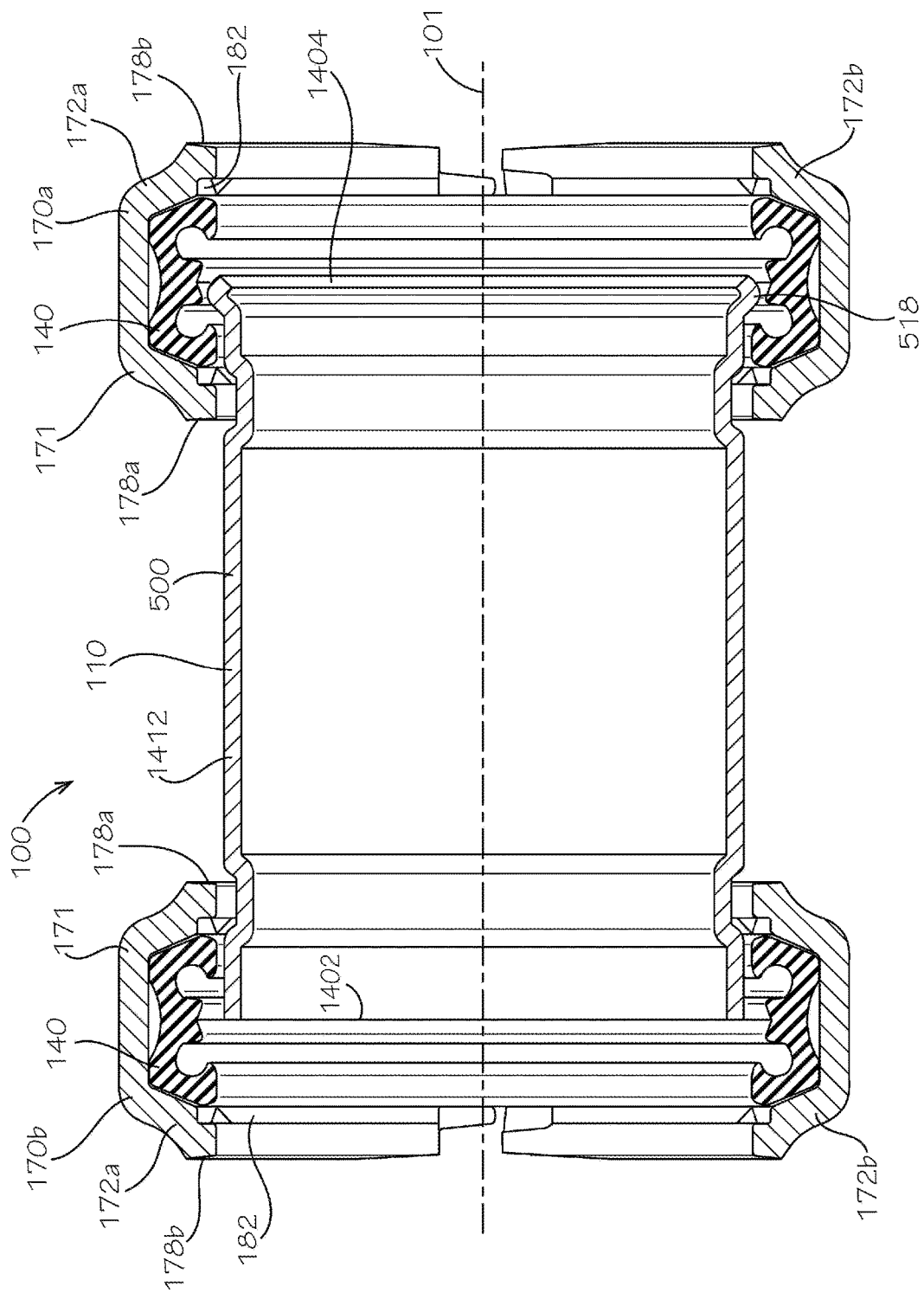
FIG. 2 is a cross-sectional side view of the pre-assembled coupling assembly of FIG. 1 taken along line 2-2 shown in FIG. 1.

FIG. 1 is an end view of a pre-assembled coupling assembly 100 in accordance with the present disclosure, and FIG. 2 is a cross-sectional view of the pre-assembled coupling assembly 100 of FIG. 1 taken along line 2-2 as shown in FIG. 1. Angles and dimensions shown in FIGS. 1-22B are merely exemplary and should not be viewed as limiting. The structures and components shown can be scaled upwards or downwards, reshaped, or resized in other aspects.

The pre-assembled coupling assembly 100 can comprise a pipe fitting 110 and at least one coupling 170. In some aspects, the coupling 170 can be a slip-on coupling, such as the slip-on coupling described in U.S. Pat. No. 9,194,516, issued on Nov. 24, 2015, which is hereby incorporated by reference in its entirety.

In the present aspect, the pre-assembly coupling assembly 100 can comprise two couplings 170a,b which can be substantially the same (referred to generally hereafter as "pipe coupling 170" or "pipe couplings 170" unless individually identified). Each coupling 170 can comprise a housing 171 and a gasket 140 which can be enclosed and encircled by the respective housing 171. Each housing 171 can comprise a first segment 172a and a second segment 172b. The first segment 172a can define a pair of fastener ears 174a disposed at opposite ends of the first segment 172a. The second segment 172b can define a pair of fastener ears 174b disposed at opposite ends of the second segment 172b. A pair of fasteners 176a,b, which can comprise nuts and bolts in some aspects, can extend through the fastener ears 174a of the first segment 172a and the fastener ears 174b of the second segment 172b to secure the first segment 172a to the second segment 172b.

In the present aspect, each housing 171 can be substantially circular in shape, and each of the segments 172a,b can define a semicircular arc shape. Each housing 171 can define a coupling bore 182 extending through the housing 171 from a first end 178a to a second end 178b of the housing 171. Each gasket 140 can be disposed within the respective coupling bore 182. The coupling bore 182 can define an axis 101. The first segment 172a can define a pair of shoulders 180a disposed at opposite ends of the first segment 172a and proximate to the respective fastener ears 174a. The second segment 172b can define a pair of shoulders 180b disposed at opposite ends of the second segment 172b and proximate to the respective fastener ears 174b.

In the present aspect, the couplings 170 can be in a relaxed position. In the relaxed position of the coupling 170s, the shoulders 180a can be spaced apart from the shoulders 180b, and the gasket 140 can be relaxed and uncompressed by the housing 171. The fasteners 176a,b can be tightened to reconfigure the coupling 170 from the relaxed position to a tensioned position. In the tensioned position of the coupling 170, the shoulders 180a of the first segment 172a can be pressed against the shoulders 180b of the second segment 172b, and the gasket 140 can be compressed radially inward relative to the axis 101. In some aspects, each segment 172a,b can be deformed by the fasteners 176a,b, to align and engage the shoulders 180a of the first segment 172a with the shoulders 180b of the second segment 172b.

The pipe fitting 110 can extend into the coupling bore 182 of each of the couplings 170 at the first end 178a of the housing 171 of each respective coupling 170.

In the aspect shown, the pipe fitting 110 can be a pipe 500, wherein the pipe is a raised-lip pipe 1412. The raised-lip pipe 1412 can define a standard grooved end 1402 and a raised-lip end 1404 disposed opposite from the standard grooved end 1402. The raised-lip end 1404 can define a raised lip 518. The raised lip 518 can retain the coupling 170a on the raised-lip end 1404 with the coupling 170a in the relaxed position due to interference between the raised lip 518 and the gasket 140 of the coupling 170a.

The standard grooved end 1402 does not define the raised lip 518. The standard grooved end 1402 can readily be inserted and withdrawn from the coupling 170b with the coupling 170b in the relaxed position. In practice, the coupling 170b can be comprised by a second pre-assembled coupling assembly 100 (not shown) comprising a second raised-lip pipe (not shown) or other pipe fitting 110. The standard grooved end 1402 of each pre-assembled coupling assembly 100 can be stabbed into the coupling 170 of an adjacent pre-assembled coupling assembly 100 and tightened to form a piping system. Similarly, a standard grooved end 1402 of a second raised-lip pipe 1412 could be stabbed into the second end 178b of the coupling 170a to join the raised-lip end 1404 of the present pre-assembled coupling assembly 100 to the standard grooved end 1402 of the second raised-lip pipe 1412, such as to form a pipeline.

It can be desirable for the coupling 170a to be retained on the raised-lip end 1404 of the raised-lip pipe 1412 so that the pre-assembled coupling assembly 100 can be easily attached to a second raised-lip pipe (not shown). For example, a user can hold the second raised-lip pipe 1412 with one hand, and the pre-assembled coupling assembly 100 can be slipped over the standard grooved end 1402 of the second raised-lip pipe 1412 with a second hand of the user. Additionally, because the coupling 170a can be retained on the raised-lip pipe 1412, the user is less likely to lose or mix up parts, such as in a field environment, because the pre-assembled coupling assembly 100 may not come apart without a deliberate effort by the user.

In some aspects, both ends of the raised-lip pipe 1412 can be raised-lip ends 1404, and both couplings 170a,b can be retained on the respective ends of the raised-lip pipe 1412 when the couplings 170a,b are in the relaxed position. A similar configuration is shown by an elbow fitting 2212 of FIGS. 5A-6C.

Figure 4:
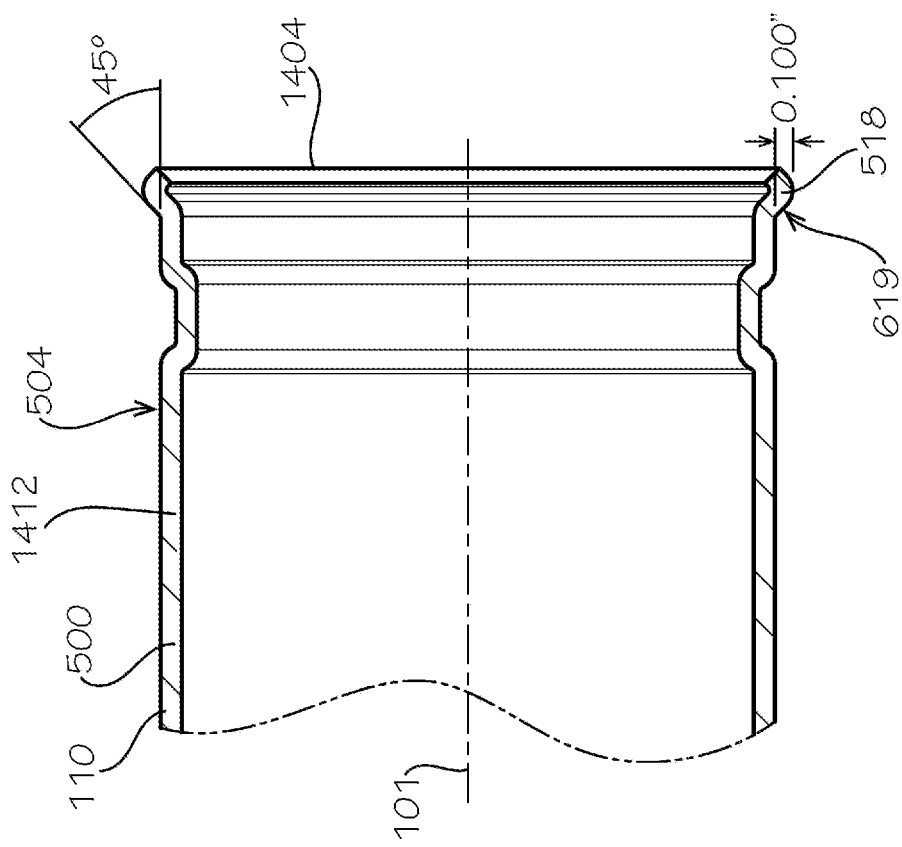
FIG. 4 is a detailed cross-sectional side view of the raised-lip end of the raised-lip pipe of FIG. 1 taken along line 4-4 shown in FIG. 3.
Figure 3:
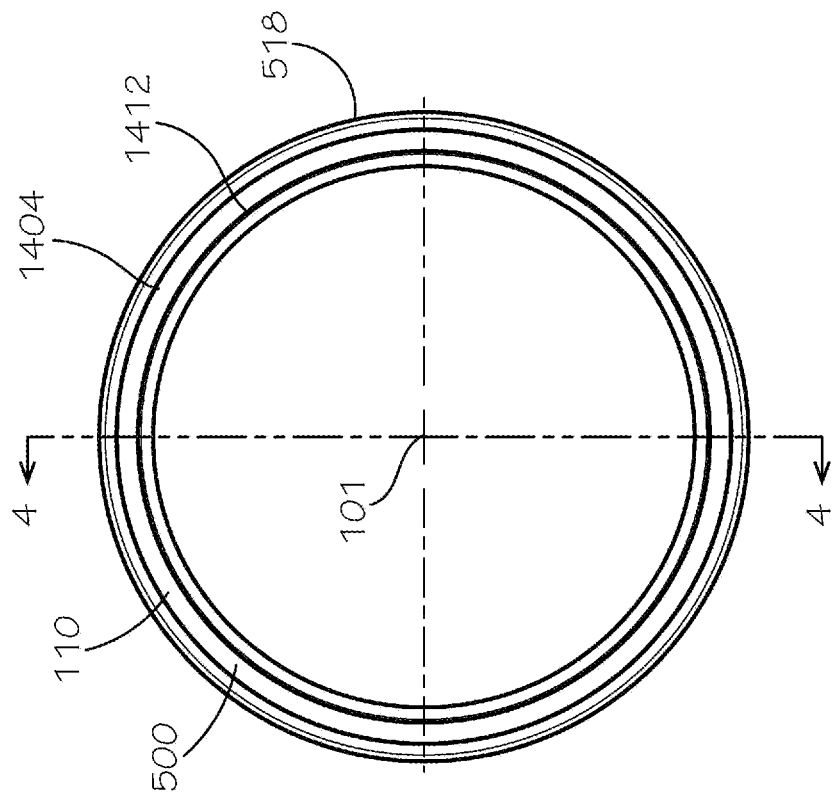
FIG. 3 is end view of a raised-lip end of the raised-lip pipe of FIG. 1.

FIG. 3 is an end view of the raised-lip end 1404 of the raised-lip pipe 1412 of FIG. 1, and FIG. 4 is a cross-sectional view of the raised-lip end 1404 of the raised-lip pipe 1412 taken along line 4-4 shown in FIG. 3. In the present aspect, an outer pipe surface 504 of the raised-lip pipe 1412 can be substantially parallel with the axis 101, and a ramped surface 619 of the raised lip 518 can define a 45-degree angle with the outer pipe surface 504. In other aspects, the ramped surface 619 can be angled relative to the outer pipe surface 504 at greater or fewer than 45 degrees. In the present aspect, the raised lip 518 can extend radially outward about 0.100" from the outer pipe surface 504; however in other aspects, the raised lip 518 can extend radially outward more than or less than 0.100".

Figure 5A:
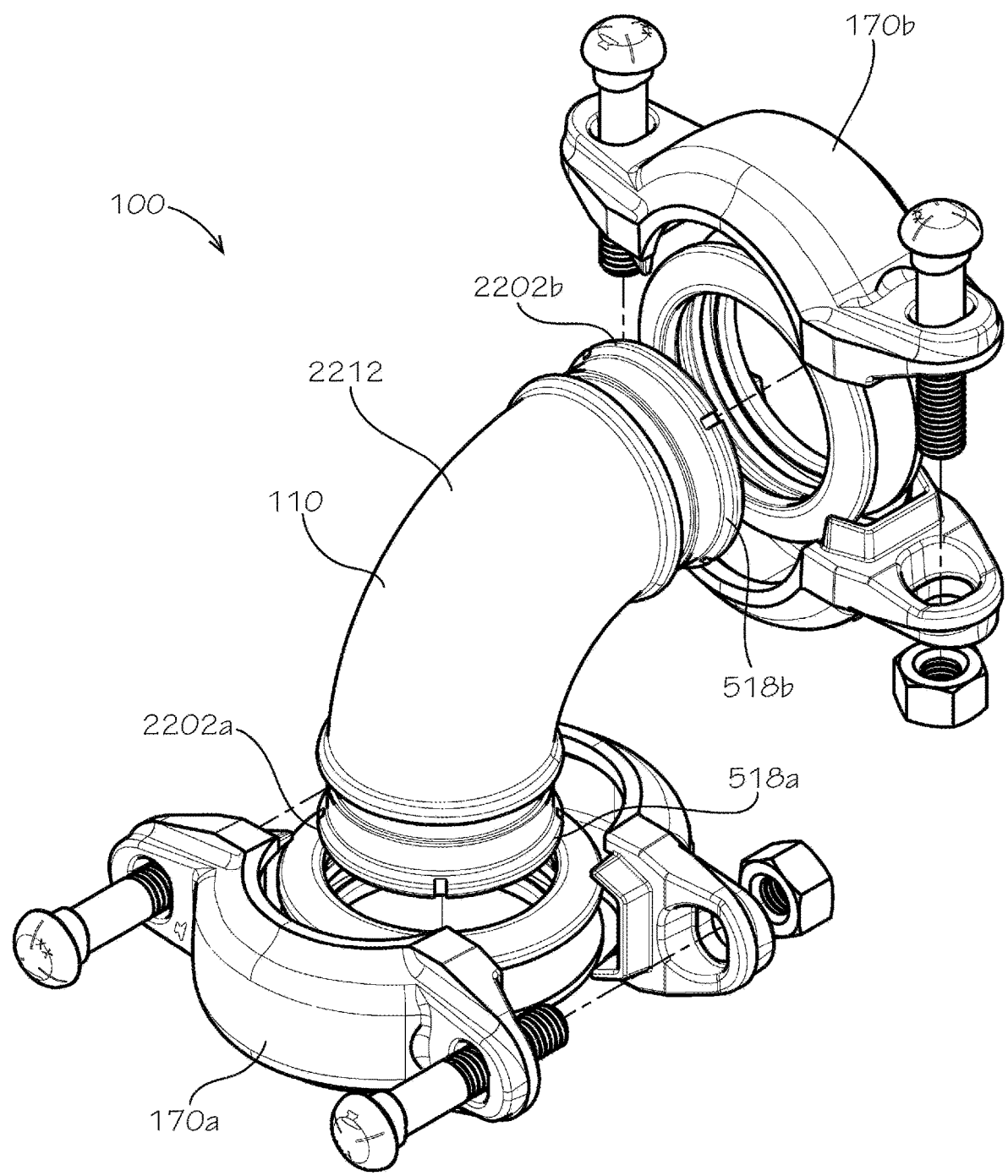
FIG. 5A is an exploded perspective view of another aspect of the pre-assembled coupling assembly wherein the pipe fitting defines an elbow fitting in accordance with another aspect of the present disclosure.
Figure 5B:
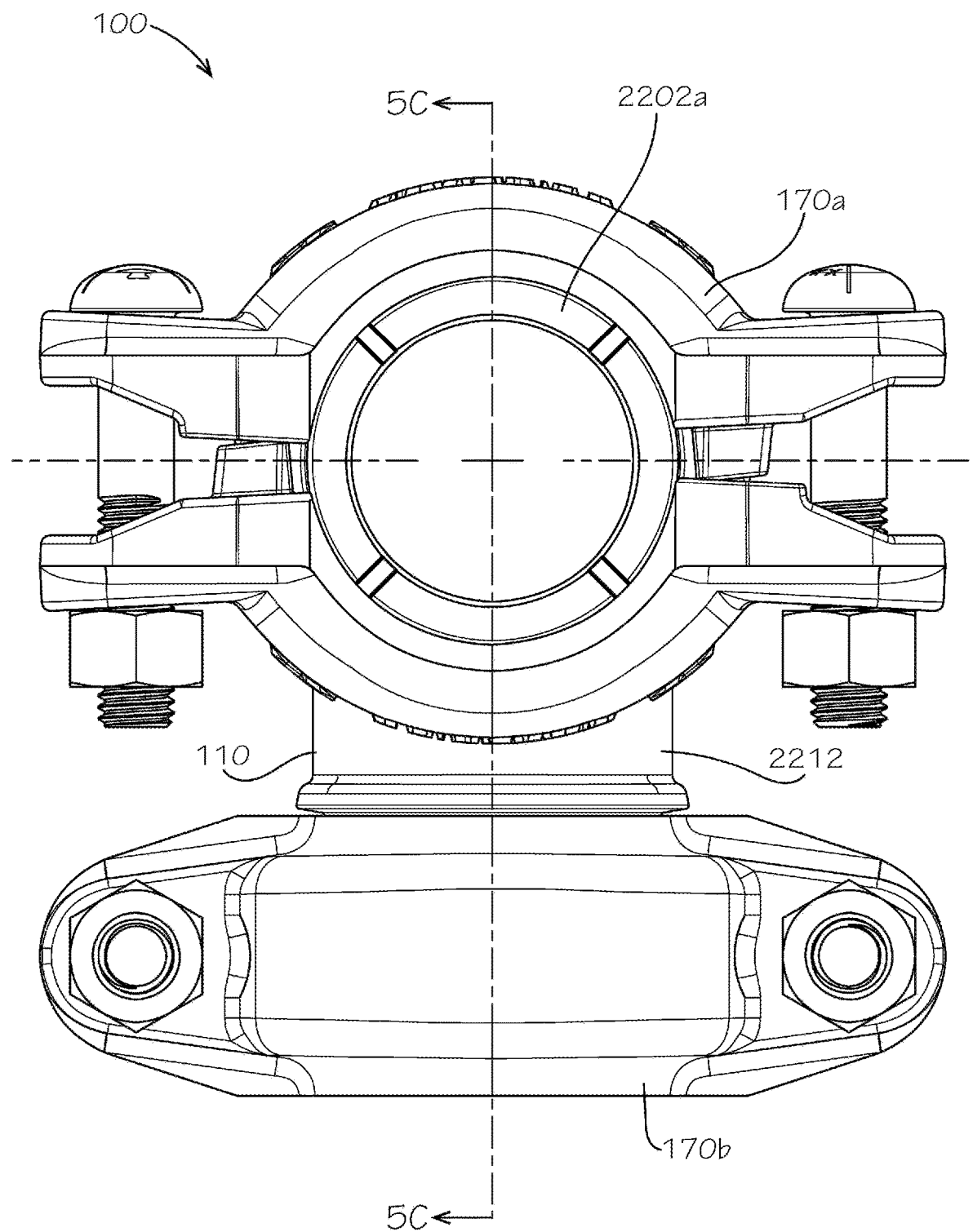
FIG. 5B is an end view of the pre-assembled coupling assembly of FIG. 5A.
Figure 5C:
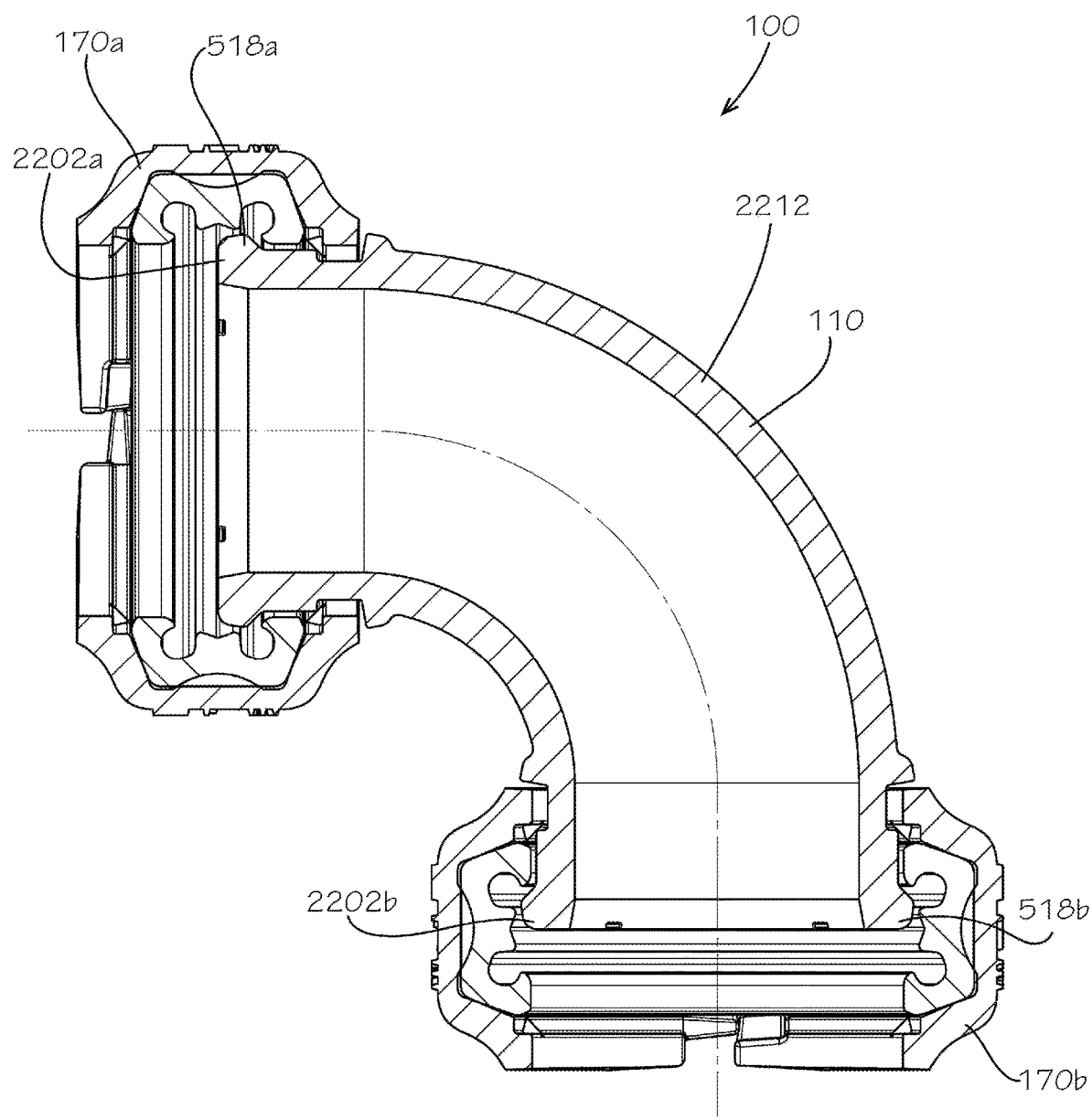
FIG. 5C is a cross-sectional side view of the pre-assembled coupling assembly of FIG. 5A taken along line 5C-5C shown in FIG. 5B.
Figure 6A:
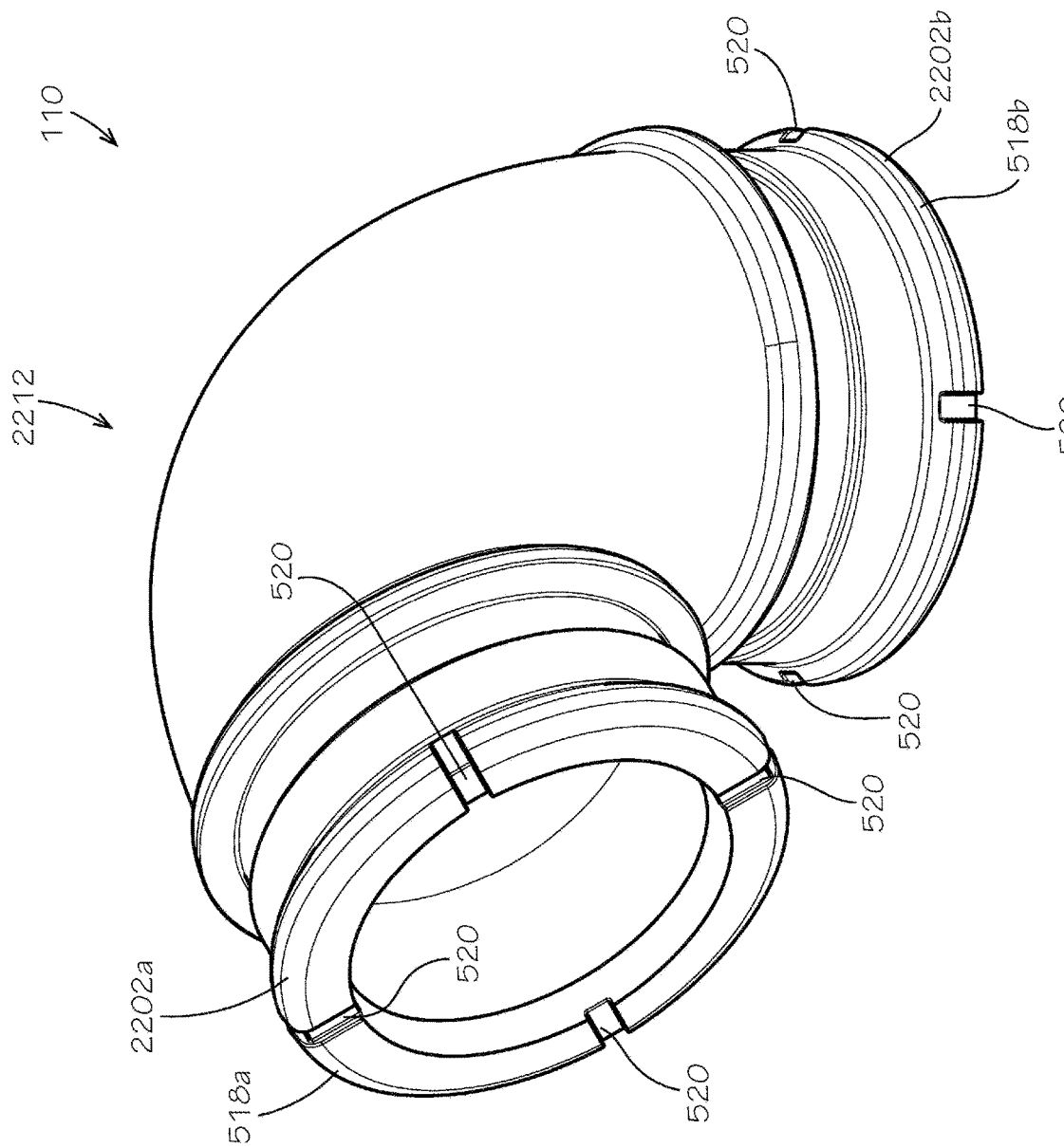
FIG. 6A is a perspective view of the elbow fitting of FIG. 5A.

FIGS. 5A-C show multiple views of another aspect of the pre-assembled coupling assembly 100 wherein the pipe fitting 110 can be the elbow fitting 2212. FIG. 6A-C show multiple views of the elbow fitting 2212 of FIGS. 5A-C. In the aspect shown, the elbow fitting 2212 can define a first raised-lip end 2202a and a second raised-lip end 2202b disposed opposite from the first raised-lip end 2202a. The first raised-lip end 2202a can be substantially similar to the second raised-lip end 2202b in the present aspect. In other aspects, the elbow fitting 2212 can define a standard grooved end, such as the standard grooved end 1402 shown in FIG. 2, opposite from the first raised-lip end 2202a. The pre-assembled coupling assembly 100 can comprise a first coupling 170a retained on the first raised-lip end 2202a by a first raised lip 518a and a second coupling 170b retained on the second raised-lip end 2202b by a second raised lip 518b. In the present aspect, the first raised-lip end 2202a can define a groove 514 extending radially inward into the first raised-lip end 2202a between an outer lip 512 and the raised lip 518a.

In the present aspect, the elbow fitting 2212 can be a 90-degree elbow. In other aspects, the elbow fitting 2212 can be a different type of elbow, such as a 45-degree elbow for example and without limitations. In other aspects, the elbow fitting 2212 can define a U-shape or any other suitable shape.

As shown, each raised-lip end 2202a,b can define a plurality of pressure relief channels 520 defined into the respective raised lip 518. In the present aspect, each raised-lip end 2202a,b can define four pressure relief channels 520 which can be equally circumferentially spaced around the raised lip 518. In other aspect, the raised-lip ends 2202a,b can define greater or fewer than four pressure relief channels 520, and the pressure relief channels 520 can be distributed in any suitable configuration around the raised lip 518.

Figure 7:
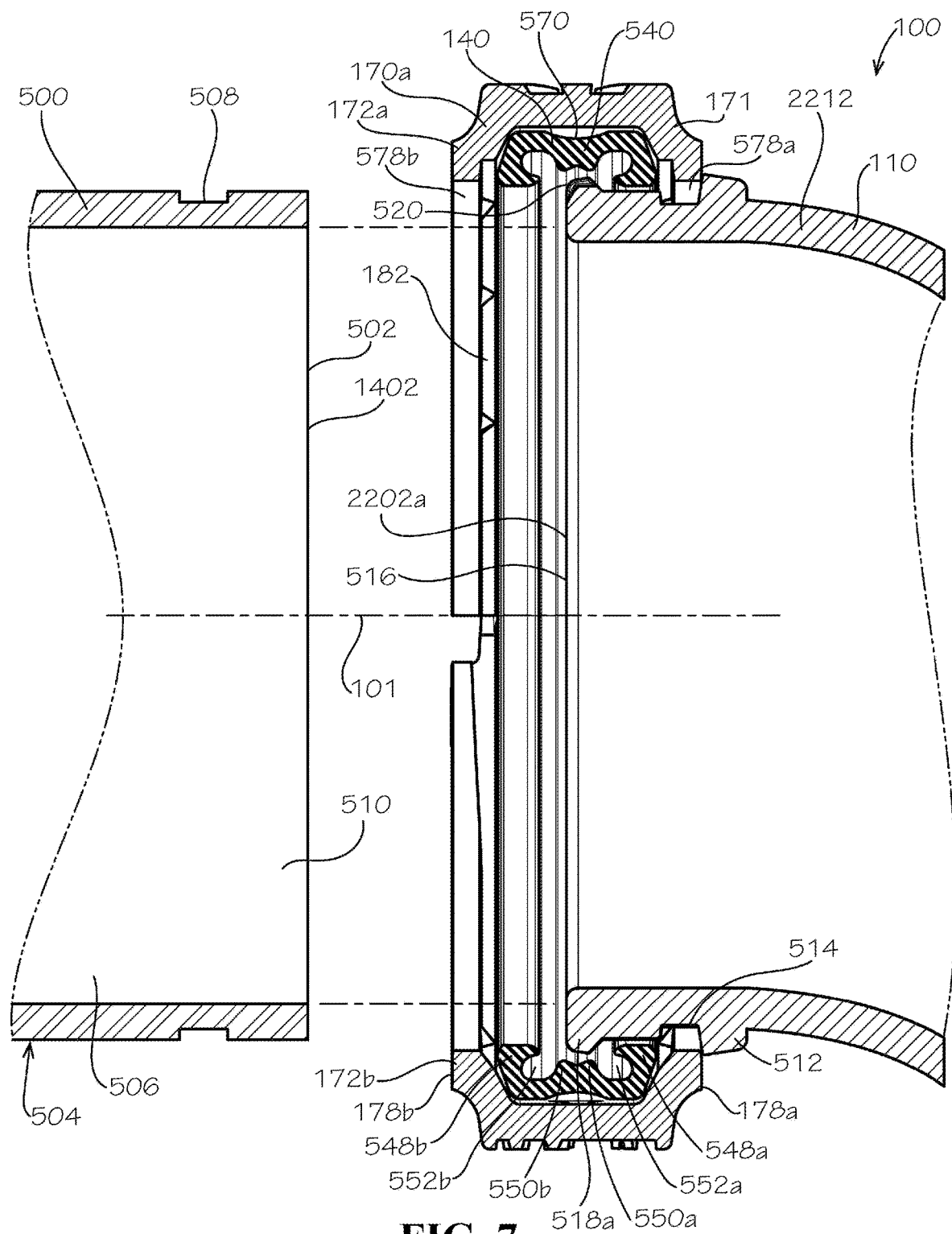
FIG. 7 is a detailed cross-sectional side view of the pre-assembled coupling assembly of FIG. 5A with a pipe in accordance with another aspect of the present disclosure.

FIG. 7 is a detailed cross-sectional view of the first raised-lip end 2202a of the pre-assembled coupling assembly 100 of FIGS. 5A-C taken along line 5C-5C as shown in FIG. 5B with a pipe 500 in accordance with another aspect of the present disclosure. In the present aspect, the pipe 500 can be a standard pipe, and the pipe end 502 can be a standard grooved end 1402. The housing 171 of the coupling 170a can define a first ridge 578a disposed at the first end 178a of the housing 171 and a second ridge 578b disposed at the second end 178b of the housing 171. The ridges 578a,b can extend radially inward relative to the axis 101. The housing 171 can define a gasket groove 570 within the coupling bore 182 which can be disposed between the ridges 578a,b, and the gasket 140 can be seated within the gasket groove 570.

The gasket 140 can define a sealing ridge 548a disposed proximate to the first end 178a of the housing 171 and a sealing ridge 548b disposed proximate to the second end 178b of the housing 171. The sealing ridges 548a,b can extend radially inward from the gasket 140 relative to the axis 101. The gasket 140 can also define a center ridge 540 disposed between the sealing ridges 548a,b. The center ridge 540 can extend radially inward from the gasket 140, and the center ridge 540 can define a pair of ribs 550a,b at a radially innermost end of the center ridge 540. The gasket 140 can define a sealing channel 552a disposed between the sealing ridge 548a and the rib 550a and a sealing channel 552b disposed between the sealing ridge 548b and the rib 550b.

The pipe 500 can define an inner pipe surface 506 and an outer pipe surface 504 disposed opposite from the inner pipe surface 506. The inner pipe surface 506 can define a pipe bore 510 extending through the pipe 500, and the pipe bore 510 can carry pressurized fluids through the piping system. A circumferential groove 508 can be defined extending radially inward into the outer pipe surface 504 relative to the axis 101. The groove 508 can be disposed proximate to the end 502 of the pipe 500. The second ridge 578b can be configured to engage the groove 508 when the end 502 of the pipe 500 is inserted into the coupling bore 182 and the coupling 170 is in the tensioned position. When engaged with the groove 508, the second ridge 578b secures the coupling 170 to the pipe 500 and prevents axial movement of the pipe 500 relative to the coupling 170.

The first raised-lip end 2202a can be substantially similar to the second raised-lip end 2202b (second raised-lip end 2202b shown in FIG. 6C) of the elbow fitting 2212 in the present aspect. In other aspects, the raised-lip ends 2202a,b can differ from one another. In the orientation shown, the raised-lip end 2202a can be an inner end 516 of the pipe fitting 110 which is inserted into the coupling bore 182. The first raised-lip end 2202a can define an outer lip 512 which can be disposed external to the coupling bore 182 when the first raised-lip end 2202a is inserted into the coupling bore 182. The outer lip 512 can extend radially outward from the elbow fitting 2212. In the present aspect, the outer lip 512 can radially overlap with the first ridge 578a of the housing 171 when the coupling is in the relaxed position. The outer lip 512 can provide a physical stop which can thereby prevent over-insertion of the first raised-lip end 2202a into the coupling bore 182.

The raised lip 518a can be disposed at the first raised-lip end 2202a, and the raised lip 518a can extend radially outward from the first raised-lip end 2202a relative to the axis 101. In the present aspect, the raised lip 518a can be disposed radially inward from the outer lip 512, therefore allowing the first raised-lip end 2202a and the raised lip 518a to be inserted into the coupling bore 182 with the coupling 170 in the relaxed position. In other aspects, the raised lip 518 can extend radially outwards beyond the first ridge 578a with the coupling 170 in the relaxed position, thereby preventing insertion and removal of the inner end 516 from the coupling bore 182. In such aspects, the first segment 172a and the second segment 172b of the housing 171 can be assembled around the first raised-lip end 2202a of the elbow fitting 2212 to capture the first raised-lip end 2202a within the coupling bore 182. In such aspects, the inner end 516 of the elbow fitting 2212 may not be removed from the coupling bore 182 without disassembling the housing 171.

The raised lip 518 can be sized to radially interfere with the sealing ridge 548a of the gasket 140 when the gasket 140 is in the relaxed and uncompressed state. For example, a radially outermost portion of the raised lip 518 can be disposed radially outward from a radially innermost portion of the sealing ridge 548a when the raised lip 518 is axially positioned between the sealing ridges 548a,b relative to the axis 101. The gasket 140 can comprise an elastic material, such as a rubber, a polymer, an elastomer, or any other suitable material, and the gasket 140 can be flexible and resilient.

Interference between the raised lip 518 and the sealing ridge 548a can prevent accidental removal of the first raised-lip end 2202a of the elbow fitting 2212 from the coupling bore 182 when the coupling 170a is in the relaxed position. The sealing ridge 548a can stretch over the raised lip 518 when the first raised-lip end 2202a is inserted into or withdrawn from the coupling bore 182. In the present aspect, the sealing ridge 548a can be in a relaxed state when the coupling 170 is in the relaxed position, and the sealing ridge 548a is axially positioned between the raised lip 518 and the outer lip 512 of the first raised-lip end 2202a relative to the axis 101.

In the present aspect, the first raised-lip end 2202a of the elbow fitting 2212 can be withdrawn from the coupling bore 182 of the coupling 170a with a deliberate force when the coupling 170a is in the relaxed position. By exerting the deliberate force, the sealing ridge 548a can stretch over the raised lip 518 to allow the elbow fitting 2212 to be removed from the coupling 170a. The resistance provided by the sealing ridge 548a can be optimized to prevent accidental disassembly of the pre-assembled coupling assembly 100 while still allowing for deliberate disassembly of the pre-assembled coupling assembly 100 without undue difficulty. For example, with the coupling 170a in the relaxed position, the pre-assembled coupling assembly 100 can be disassembled with the fingers of a user possessing typical hand strength without the need for tools while also resisting separation of the coupling 170a from the elbow fitting 2212 by the force of gravity and general handling of the pre-assembled coupling assembly 100. For example, the coupling 170a and the elbow fitting 2212 can resist separation if a user carries the pre-assembled coupling assembly 100 without supporting both the coupling 170a and the elbow fitting 2212.

In the present aspect, the first raised-lip end 2202a can define a groove 514 extending radially inward into the first raised-lip end 2202a between the outer lip 512 and the raised lip 518. The groove 514 can be configured to receive the first ridge 578a of the housing 171 when the coupling 170a is in the tensioned position. Engagement between the first ridge 578a and the groove 514 can secure the elbow fitting 2212 to the coupling 170a and prevent the first raised-lip end 2202a of the elbow fitting 2212 from being withdrawn from the coupling bore 182 when the coupling 170a is in the tensioned position.

The raised lip 518 can define at least one pressure relief channel 520 defined at the first raised-lip end 2202a of the elbow fitting 2212. The pressure relief channel 520 can extend through the raised lip 518 as shown and further described with respect to FIGS. 9 and 10 below.

Figure 8A:
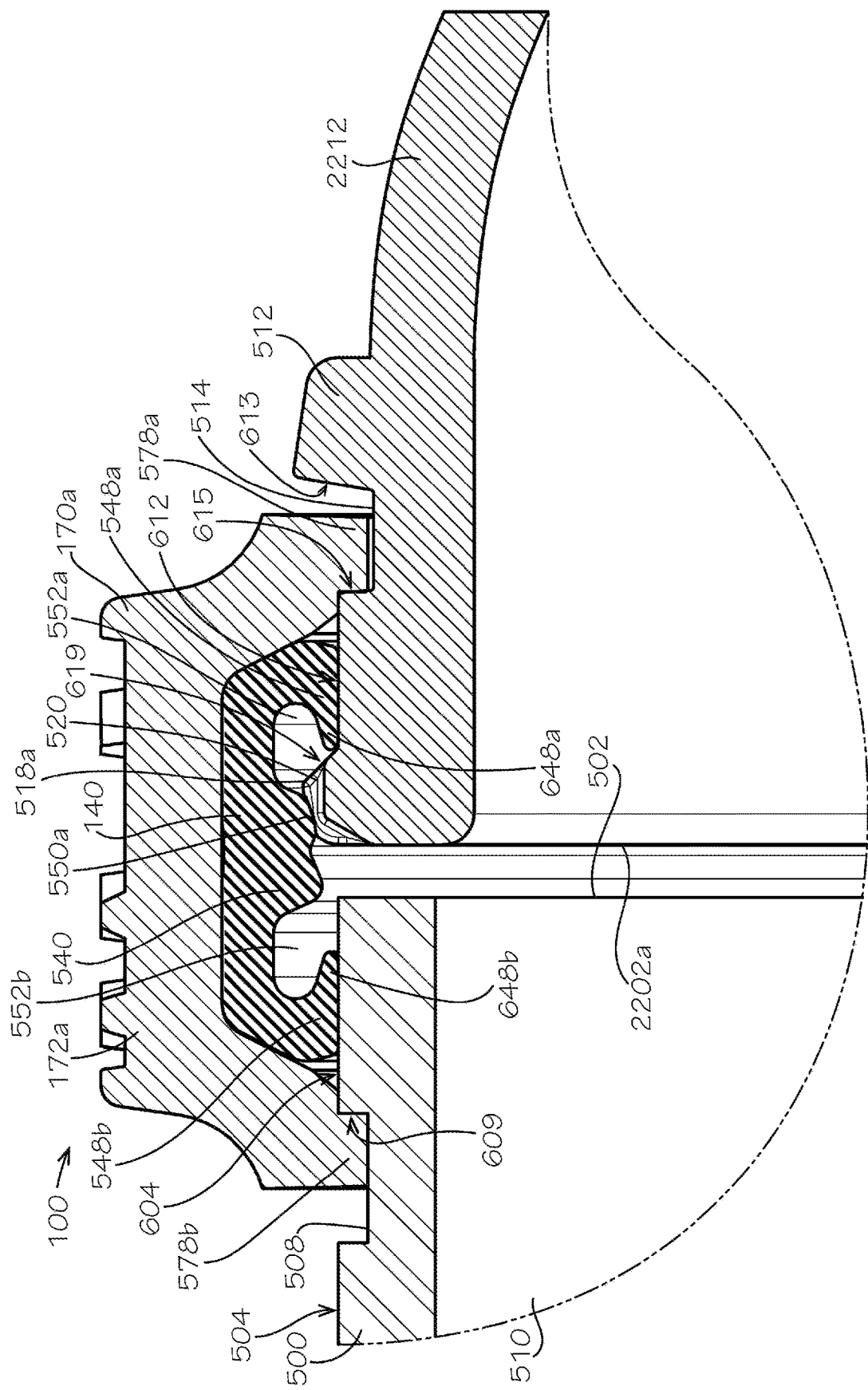
FIG. 8A is a detailed cross-sectional side view of a first raised-lip end of the pre-assembled coupling assembly of FIG. 5A and the pipe of FIG. 7 shown with the coupling in a tensioned position.

FIG. 8A is a detailed cross-sectional view of the pipe 500, the elbow fitting 2212, and the coupling 170a of FIG. 7 with the coupling 170a in the tensioned position and with the pre-assembled coupling assembly 100 in a pressurized condition in which fluid is allowed to flow into the pipe 500 to apply fluid pressure to the elbow fitting 2212 and the gasket 140. In the tensioned position, the gasket 140 can be compressed radially inward to form seals with the pipe 500 and the elbow fitting 2212. The sealing ridge 548a can form a seal with a sealing surface 612 defined by the first raised-lip end 2202a of the elbow fitting 2212. In the present aspect, the sealing surface 612 can be defined between the raised lip 518a and the groove 514, and the raised lip 518a can extend radially outward from the sealing surface 612. The sealing ridge 548b can form a seal with a sealing portion 604 of the outer pipe surface 504 of the pipe 500 defined between the groove 508 and the end 502 of the pipe 500.

The raised lip 518a can also define a ramped surface 619. The ramped surface 619 can be angled, as shown in FIG. 6A, thereby taking the shape of a truncated cone, or can be curved in other aspects. The angle or curve of the ramped surface 619 can be configured to guide the sealing ridge 548a into position around the sealing surface 612 as the first raised-lip end 2202a is inserted into the coupling 170a, and the gasket 140 can also be configured to prevent removal of the gasket 140 from over the raised lip 518a when the gasket 140 is in the relaxed position.

Figure 8B:
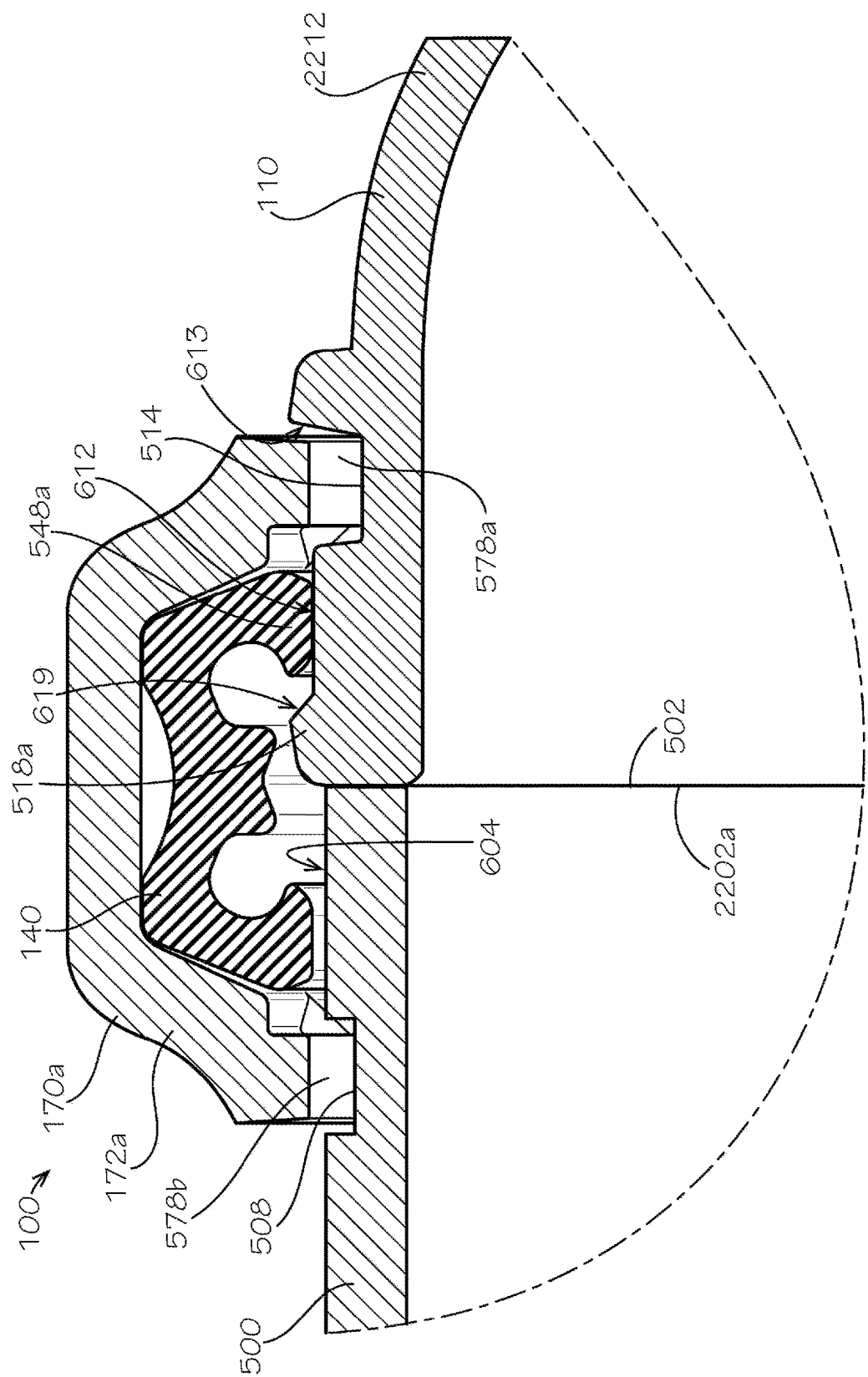
FIG. 8B is a detailed cross-sectional side view of the first raised-lip end of the pre-assembled coupling assembly of FIG. 5A and the pipe of FIG. 7 shown with the coupling in a relaxed position.

The outer lip 512 can also define a ramped surface 613 facing axially towards the pipe 500. The ramped surface 613 can also define a side of the groove 514 axially outward from the coupling 170a. The ramped surface 613 can be angled, as shown in FIG. 8A, thereby taking the shape of a truncated cone, or can be curved in other aspects, and can extend to a bottom of the groove 514. The angle or curve of the ramped surface 613 can be configured to guide the first ridge 578*a* into position in the groove 514 when the coupling 170*a* is tightened into the tensioned position. The ramped surface 613 can thereby function as a locating feature to allow the user to ensure that the coupling 170*a* is properly positioned over the first raised-lip end 2202*a* of the elbow fitting 2212 and, when the pipe 500 is inserted into the coupling 170*a* to abut the first raised-lip end 2202*a*, as shown in FIG. 8B, the coupling 170*a* is likewise properly positioned over the pipe 500 such that the second ridge 578*b* is aligned over the groove 508. Thus, when the coupling 170*a* is tightened into the tensioned position, the second ridge 578*b* can be properly guided into the groove 508. In various aspects, the groove 514 can be narrower in the axial direction than the groove 508 so that the second ridge 578*b* can be spaced slightly in the axial direction from sides of the groove 508. This can ensure that the second ridge 578*b* properly seats into the groove 508 without inadvertently contacting sides of the groove 508 when the coupling 170*a* is tightened.

Further, the grooves 508,514 of the pipe 500 and the first raised-lip end 2202*a*, respectively, can each define side stop surfaces 609,615, respectively. The side stop surfaces 609, 615 act as stops to prevent the pipe 500 and the elbow fitting 2212, respectively, from being removed from the coupling 170*a* when the coupling 170*a* is in the tensioned position by engaging the ridges 578*a,b* when either or both of the pipe 500 and the elbow fitting 2212 are pushed or pulled axially outward from the coupling 170*a*, such as when the pre-assembled coupling assembly 100 is in the pressurized condition.

FIG. 8A also shows that portions of the first segment 172*a* and, similarly, the second segment 172*b* (shown in FIG. 7) can contact the outer surfaces 504 of the pipe 500 and the elbow fitting 2212 adjacent to the grooves 508,514, respectively, when the coupling 170*a* is in the tensioned condition. However, in other aspects, the segments 172*a,b* may contact only one or both of the grooves 508,514, or contact the groove 508 and the outer surface of the elbow fitting 2212 adjacent to the groove 514, or contact the groove 514 and the outer surface 504 of the pipe 500 adjacent to the groove 508.

In the tensioned position, the center ridge 540 can be compressed radially inward, and the rib 550*a* can contact the raised lip 518*a*. In some aspects, the rib 550*a* can form a secondary seal with the raised lip 518*a*. In the present aspect, the pressure relief channel 520 can maintain fluid communication between the sealing channel 552*a* and the pipe bore 510. By maintaining fluid communication between the sealing channel 552*a* and the pipe bore 510, pressurized fluids carried by the pipe 500 can exert pressure within the sealing channel 552*a* which can energize the seal formed between the sealing ridge 548*a* and the sealing surface 612 of the first raised-lip end 2202*a*. The sealing channel 552*a* can define a U-shape of the sealing ridge 548*a*, and pressure exerted within the sealing channel 552*a* can press an axially inner end 648*a* of the sealing ridge 548*a* against the sealing surface 612. The sealing ridge 548*b* can function similarly, and pressurized fluids within the sealing channel 552*b* can press an axially inner end 648*b* of the sealing ridge 548*b* against the sealing portion 604 of the outer pipe surface 504 of the pipe 500 to energize the seal between the sealing ridge 548*b* and the pipe 500.

FIG. 8B is a detailed cross-sectional view of the pipe 500, the elbow fitting 2212, and the coupling 170*a* of FIG. 7 with the coupling 170*a* in the relaxed position with the pipe 500 inserted into the coupling 170*a* and abutting the first raised-lip end 2202*a*. The cross-section of FIG. 8B is taken from a sectional line extending through mid-sections of the first segment 172*a* and the second segment 172*b* (shown in FIG. 7). When the pipe 500 is inserted into pre-assembled coupling assembly 100 with a pipe fitting 110, the end 502 of the pipe 500 abuts an inner end of the pipe fitting 110, such as the first raised-lip end 2202*a* in this aspect. With the ramped surface 619 preventing withdrawal from the gasket 140 and thereby the coupling 170*a*, and with the ramped surface 613 preventing further insertion of the first raised-lip end 2202*a* into the coupling 170*a*, the pipe 500 can thereby be held in position to locate the second ridge 578*b* over the groove 508. In the current aspect, the sealing ridge 548*a* can also be in contact with the sealing surface 612 when the coupling 170*a* is in the relaxed position, further holding the first raised-lip end 2202*a* in the coupling 170*a*.

As shown in FIG. 8B, in some aspects, the bottom of the groove 514 can define a smaller diameter than a bottom of the groove 508. This can provide the benefit of the second ridge 578*b* rigidly contacting the pipe 500 before the first ridge 578*a* contacts the elbow fitting 2212, ensuring that the coupling 170*a* is rigidly attached to the pipe 500. The sealing surface 612 of the first raised-lip end 2202*a* can also define a larger diameter than the sealing portion 604 of the pipe 500, which can better hold the gasket 140, and thereby the coupling 170*a*, on the elbow fitting 2212. The diameter of the sealing surface 612 can be sized such that the gasket 140 contacts the sealing surface 612 in the relaxed position, or can be sized such that the gasket 140 does not contact the sealing surface 612 in the relaxed position but is closer to the gasket 140 than the sealing portion 604.

Figure 9:
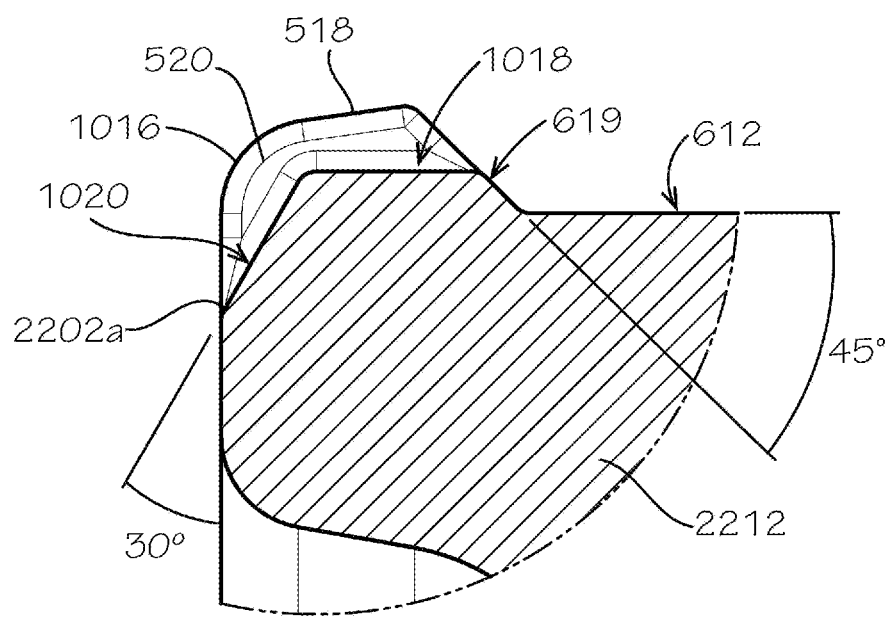
FIG. 9 is a detailed cross-sectional view of a pressure relief channel of the elbow fitting of FIG. 5A taken along line 9-9 shown in FIG. 6B.

FIG. 9 is a detail cross-sectional view of a one of the pressure relief channels 520 of FIGS. 6A-C taken along line 9-9 shown in FIG. 6B. The pressure relief channel 520 can comprise an angled surface 1020 and an axial surface 1018. The angled surface 1020 can be angled relative to the first raised-lip end 2202*a* of the elbow fitting 2212 and relative to the sealing surface 612. In the present aspect, the angled surface 1020 can define an about 30-degree angle with the first raised-lip end 2202*a* of the elbow fitting 2212; however in other aspects, the angle can be larger or smaller than 30 degrees. The axial surface 1018 can be substantially parallel to the axis 101 (shown in FIG. 7) and the sealing surface 612. The axial surface 1018 can be defined radially outward from the sealing surface 612 of the first raised-lip end 2202*a* of the elbow fitting 2212 and radially inward from the raised lip 518 (shown in FIG. 5).

The raised lip 518 can define a rounded transition surface 1016 defined at the first raised-lip end 2202*a* of the elbow fitting 2212. The raised lip 518 can define the ramped surface 619 extending to the sealing surface 612. In the present aspect, the ramped surface 619 can define an about 45-degree angle with the sealing surface 612; however, in other aspects, the angle can be greater or smaller than 45 degrees.

Figure 10:
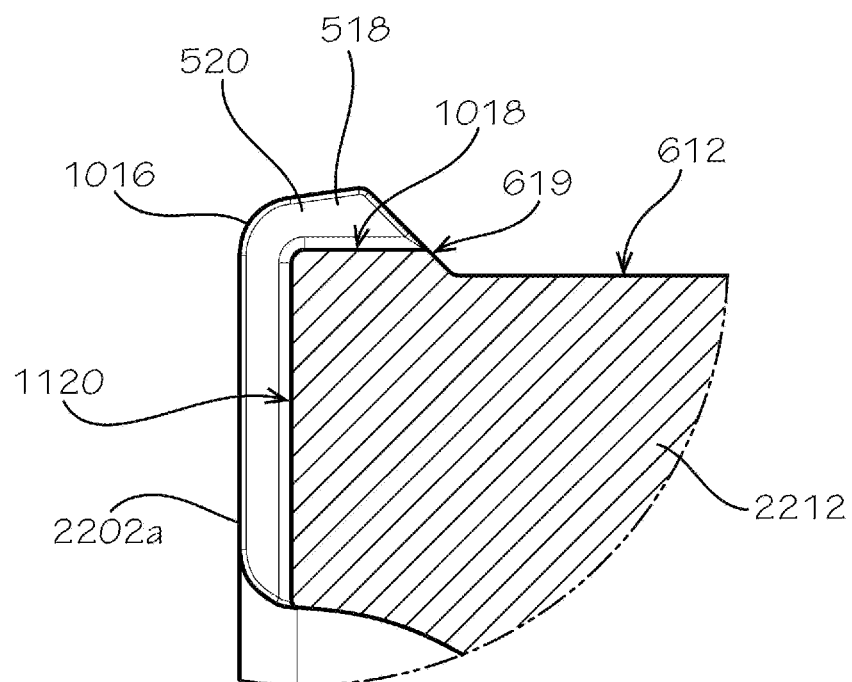
FIG. 10 is a detailed cross-sectional view of another aspect of the pressure relief channel in accordance with another aspect of the present disclosure.

FIG. 10 is a detail cross-sectional view of another aspect of the pressure relief channels 520 of FIG. 6A-C taken along line 9-9 shown in FIG. 6B. Rather than defining the angled surface 1020 as shown in FIG. 9, the pressure relief channel 520 can define a radial surface 1120, which can be substantially perpendicular to the axis 101 (shown in FIG. 9) and the axial surface 1018. In the present aspect, the radial surface 1120 can be substantially parallel to the first raised-lip end 2202*a* of the elbow fitting 2212. In the present aspect, the radial surface 1120 can extend completely across the first raised-lip end 2202*a* of the elbow fitting 2212.

Figure 11:
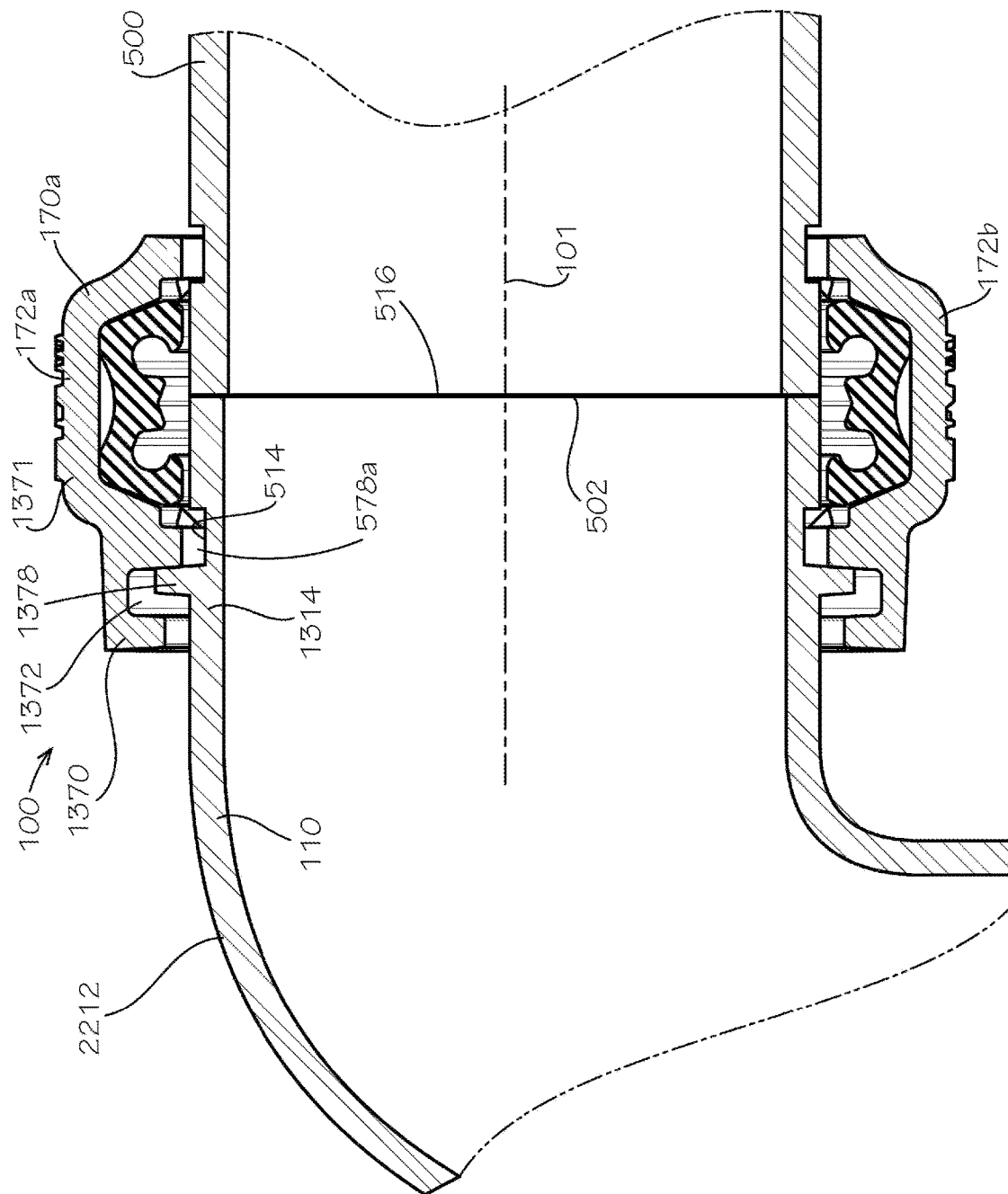
FIG. 11 is a cross-sectional view of the pipe of FIG. 7 with another aspect of the pre-assembled coupling assembly wherein the elbow fitting defines a secondary key in accordance with another aspect of the present disclosure.

FIG. 11 shows another aspect of the pre-assembled coupling assembly 100 wherein the elbow fitting 2212 can define a secondary key 1378 extending radially outward from a cylindrical portion 1314 of the elbow fitting 2212 defined proximate to the inner end 516 of the elbow fitting 2212. The secondary key 1378 can be disposed adjacent to the groove 514, and the groove 514 can be disposed between the secondary key 1378 and the inner end 516. In the present aspect, the inner end 516 may not define the raised lip 518 (shown in FIG. 10) and may be a plain grooved end, similar to the standard grooved end 1402 of the raised-lip pipe 1412 of FIG. 2.

The coupling 170*a* can comprise a grooved housing 1371 comprising another aspect of the first segment 172*a* and the second segment 172*b*. The grooved housing 1371 can define a secondary shoulder 1370 attached to the first ridge 578*a*. A secondary groove 1372 can be defined between the secondary shoulder 1370 and the first ridge 578*a*. The secondary key 1378 can be received within the secondary groove 1372 to retain the coupling 170*a* on the elbow fitting 2212.

During assembly, the coupling 170*a* in the relaxed position can be slipped over the end 502 of the pipe 500, and the end 502 can be positioned in facing engagement with the inner end 516 of the elbow fitting 2212. With the end 502 in facing engagement with the inner end 516, the secondary key 1378 can be positioned adjacent to the first ridge 578*a*. Once the coupling 170*a* is in the tensioned position and the pipe 500 is pressurized, the inner end 516 of the elbow fitting 2212 can pull away from the end 502 of the pipe 500 due to end cap forces from pressurized fluids transmitted by the pipe 500. Contact between the secondary key 1378 and the secondary shoulder 1370 can limit axial movement of the elbow fitting 2212 relative to the coupling 170*a* and the pipe 500.

Figure 12:
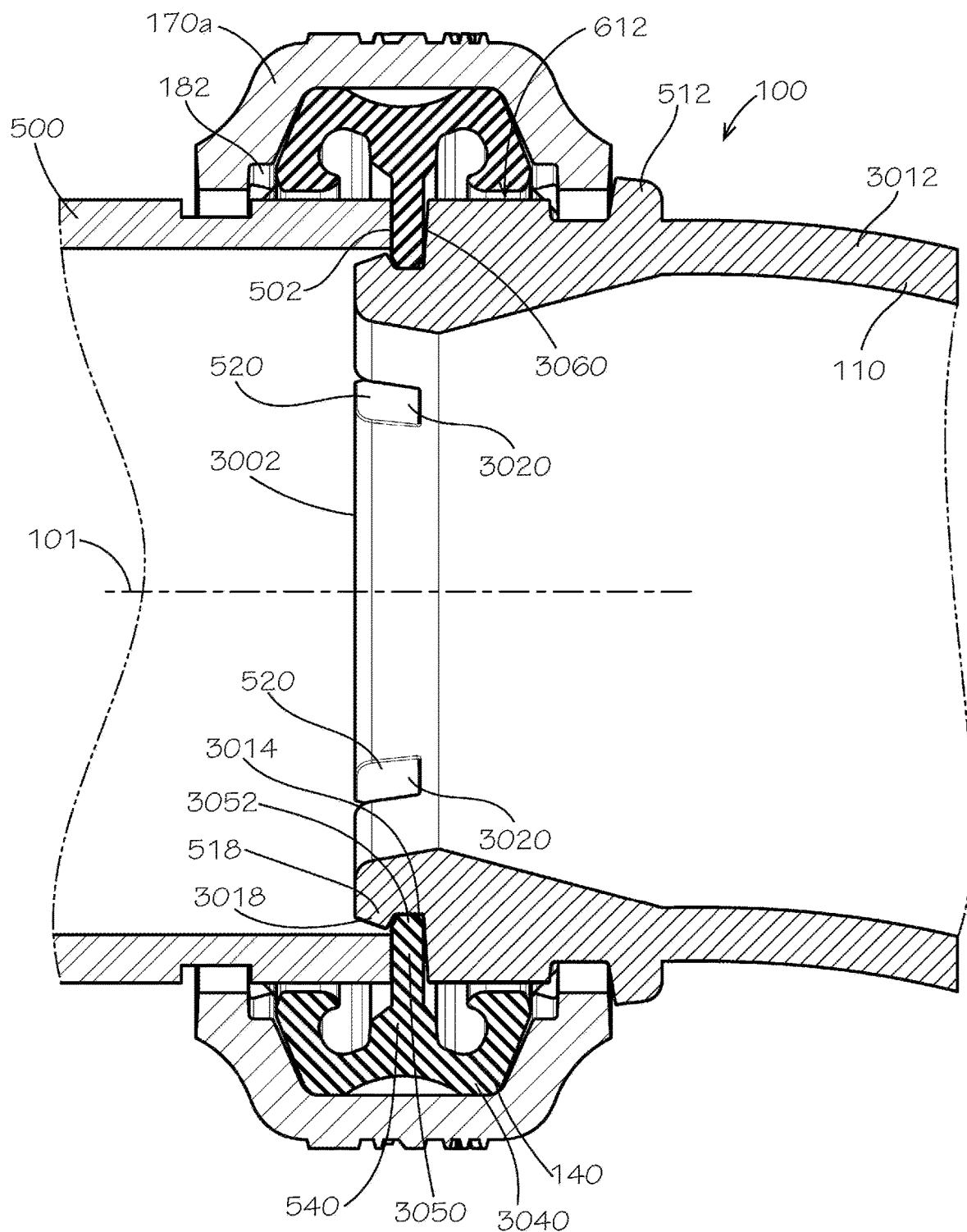
FIG. 12 is a cross-sectional view of the pipe of FIG. 7 with another aspect of the pre-assembled coupling assembly with another aspect of the elbow fitting in accordance with another aspect of the present disclosure wherein the elbow fitting is a recessed elbow fitting.

FIG. 12 shows a cross-sectional side view of another aspect of the pre-assembled coupling assembly 100. The pipe fitting 110 can be a recessed elbow fitting 3012. The recessed elbow fitting 3012 can be similar to the elbow fitting 2212 except that the recessed elbow fitting 3012 can define a recessed raised-lip end 3002 in place of the raised-lip ends 2202*a,b* (shown in FIG. 2). The outer lip 512 can be disposed axially outward from the coupling 170*a* with respect to the axis 101. The recessed elbow fitting 3012 can define a shoulder 3060 disposed between the sealing surface 612 and the raised lip 518. The shoulder 3060 can extend radially inward from the sealing surface 612 with respect to the axis 101. The recessed elbow fitting 3012 can further define a groove 3014 axially disposed between the raised lip 518 and the shoulder 3060 with respect to the axis 101. The groove 3014 can extend radially inward from the raised lip 518 with respect to the axis 101.

In the present aspect, the raised lip 518 can be a recessed raised lip 3018 disposed radially inward from the sealing surface 612 with respect to the axis 101. The pressure relief channels 520 can be recessed pressure relief channels 3020 which can radially extend through the recessed raised lip 3018 and can axially extend between the recessed raised-lip end 3002 and the shoulder 3060 with respect to the axis 101.

In the present aspect, the gasket 140 can be a rimmed gasket 3040. The rimmed gasket 3040 can define an inner rim 3050 which can extend radially inward from the center ridge 540 of the rimmed gasket 3040. The inner rim 3050 can define a radially inner end 3052. With the recessed raised-lip end 3002 disposed within the coupling bore 182, the inner rim 3050 can be positioned adjacent to the shoulder 3060. The radially inner end 3052 of the inner rim 3050 can be received within the groove 3014 of the recessed elbow fitting 3012, and the recessed raised lip 3018 can radially overlap with the radially inner end 3052 of the inner rim 3050 with respect to the axis 101. Radial overlap of the recessed raised lip 3018 and the radially inner end 3052 can retain the coupling 170*a* on the recessed elbow fitting 3012 when the coupling 170*a* is in the relaxed position.

The end 502 of the pipe 500 can also be inserted into the coupling bore 182 with the coupling 170*a* in the relaxed position. With the end 502 of the pipe 500 disposed within the coupling bore 182, the inner rim 3050 can extend axially inwards from the rimmed gasket 3040 between the end 502 of the pipe 500 and the shoulder 3060, thereby preventing contact between the end 502 of the pipe 500 and the shoulder 3060. The recessed raised-lip end 3002 can be inserted into the end 502 of the pipe 500. The recessed raised lip 3018 can define a tapered pipe alignment surface which can facilitate insertion of the recessed raised-lip end 3002 of the recessed elbow fitting 3012 into the end 502 of the pipe 500.

Figure 13:
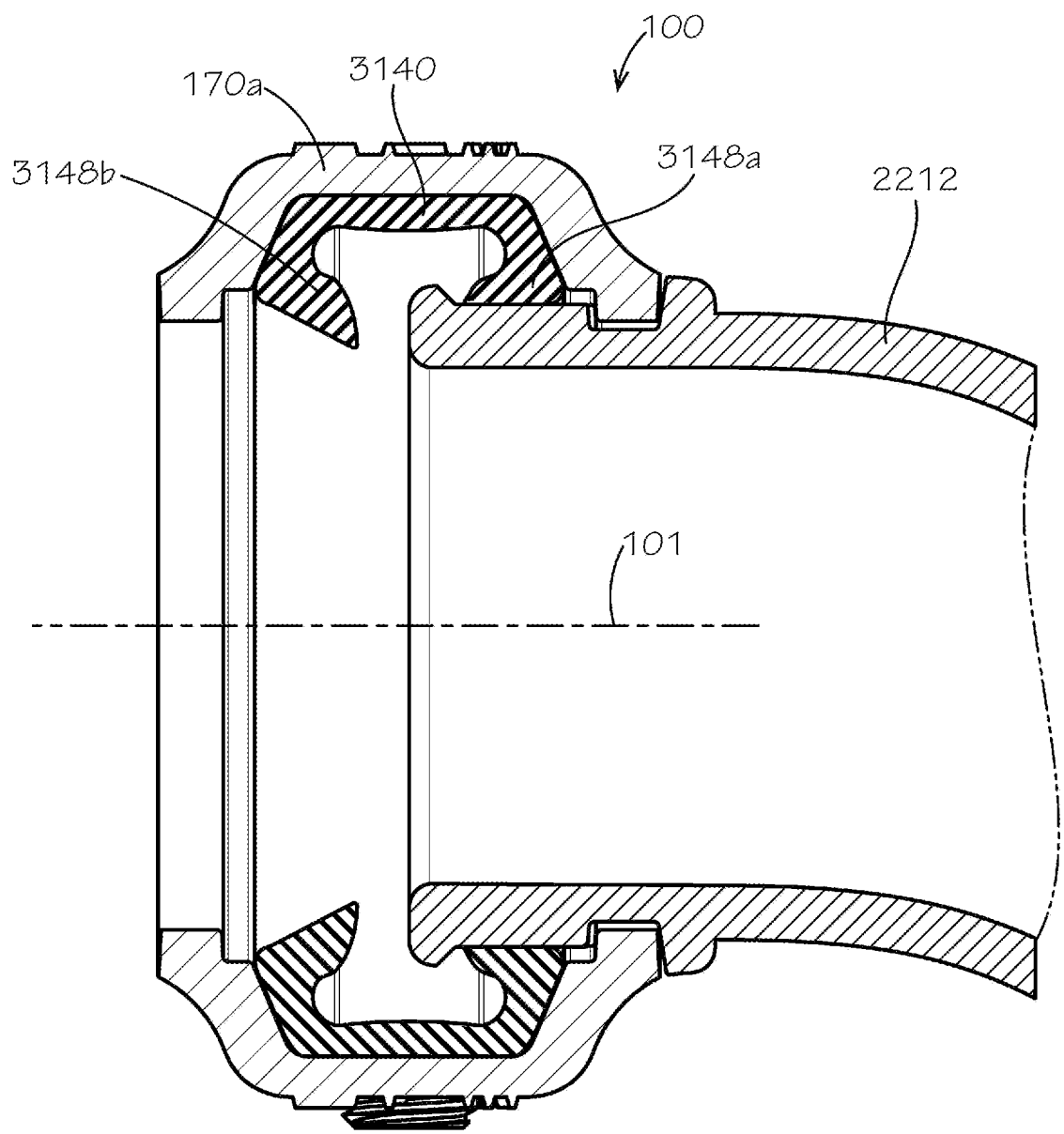
FIG. 13 is a cross-sectional side view of another aspect of the pre-assembled coupling assembly comprising another aspect of the coupling wherein the coupling comprises a C-style gasket in accordance with another aspect of the present disclosure.

FIG. 13 shows a cross-sectional side view of another aspect of the pre-assembled coupling assembly 100. The coupling 170*a* of the present aspect of the pre-assembled coupling assembly 100 can comprise a C-style gasket 3140 which may not define the center ridge 540 (shown in FIG. 7) of the gasket 140 (shown in FIG. 7). The C-style gasket 3140 can define a pair of sealing ridges 3148*a,b*. In the present aspect, the sealing ridges 3148*a,b* can extend axially and radially inward relative to the axis 101, as demonstrated by sealing ridge 3148*b*, when the C-style gasket 3140 is in a relaxed and uncompressed state. Once the end 502 of the pipe 500 (not shown) is inserted into the coupling 170*a*, the sealing ridge 3148*b* can stretch over the end 502 of the pipe 500 and rotate radially outward with respect to the axis 101.

Figure 14:
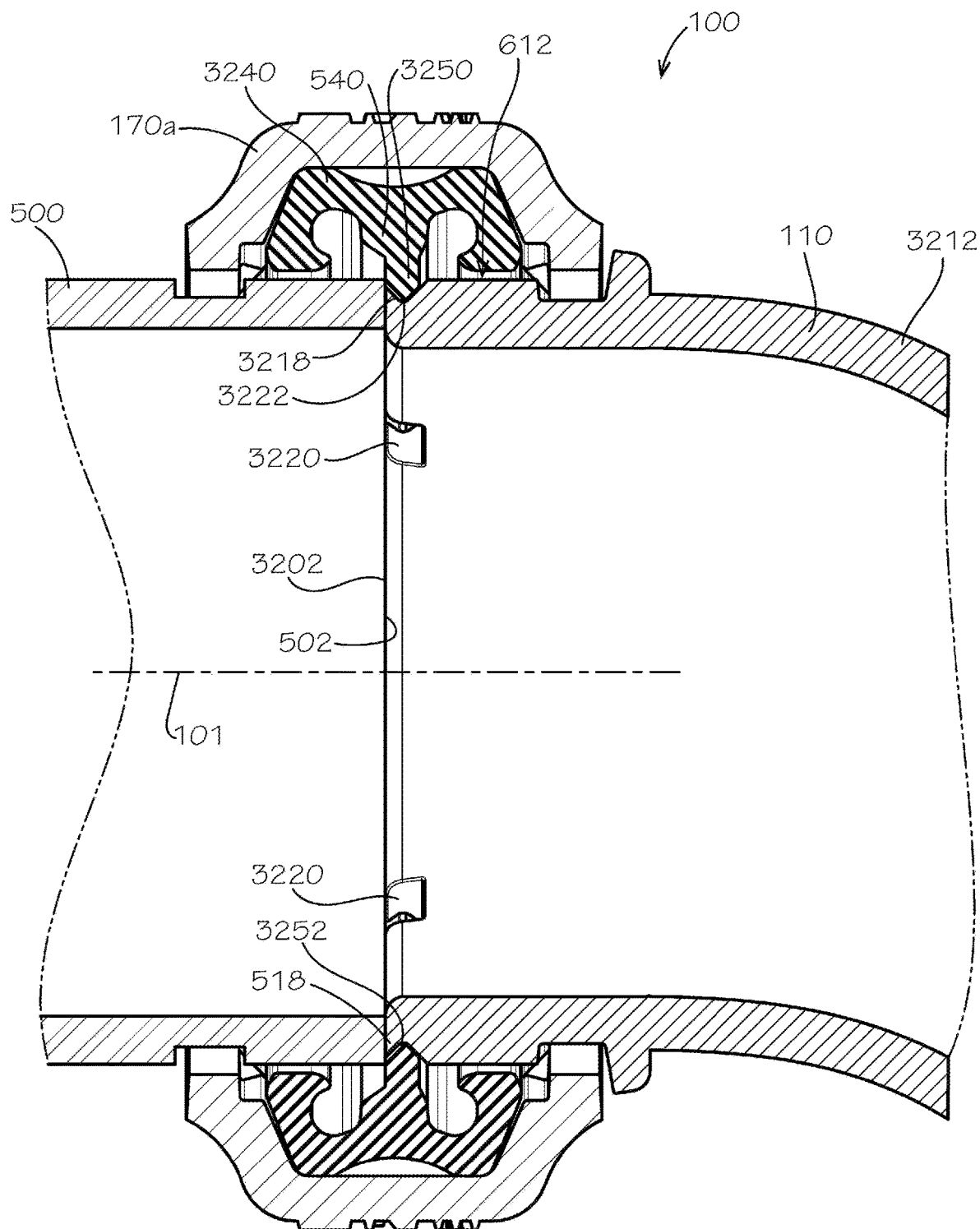
FIG. 14 is a cross-sectional view of the pipe of FIG. 7 with another aspect of the pre-assembled coupling assembly comprising another aspect of the coupling wherein the gasket is a modified rimmed gasket, and another aspect of the elbow fitting in accordance with another aspect of the present disclosure, wherein the elbow fitting is a grooved elbow fitting.

FIG. 14 shows a cross-sectional side view of another aspect of the pre-assembled coupling assembly 100 wherein the pipe fitting 110 can be a grooved elbow fitting 3212. The grooved elbow fitting 3212 can define an inner end 3202, and a circumferential groove 3222 can be defined at the inner end 3202, and the circumferential groove 3222 can extend around a circumference of the grooved elbow fitting 3212. The circumferential groove 3222 can be defined extending radially inward from the sealing surface 612. In the present aspect, the circumferential groove 3222 can define a triangular cross-sectional shape; however in other aspects, the circumferential groove 3222 can define a different cross-sectional shape, such as semi-circular, rectangular, or any other suitable shape. In the present aspect, the raised lip 518 can be a recessed raised lip 3218 disposed radially inward from the sealing surface 612 with respect to the axis 101. The inner end 3202 can also define pressure relief channels 3220 extending radially through the inner end 3202 and intersecting the circumferential groove 3222 with respect to the axis 101. With the end 502 of the pipe 500 inserted into the coupling 170*a*, the end 502 of the pipe 500 can contact the inner end 3202 of the grooved elbow fitting 3212.

The coupling 170*a* can comprise a modified rimmed gasket 3240 which can define an inner rim 3250 which can extend radially inward from the center ridge 540 with respect to the axis 101. A radially inner end 3252 of the inner rim 3250 can define a cross-sectional shape formed complimentary to the cross-sectional shape of the circumferential groove 3222. In the present aspect, the radially inner end 3252 can define the triangular cross-sectional shape for example and without limitation. The radially inner end 3252 of the inner rim 3250 can engage the circumferential groove 3222, and engagement between the radially inner end 3252 and the circumferential groove 3222 can retain the coupling 170a on the inner end 3202 of the grooved elbow fitting 3212 when the coupling 170a is in the relaxed position.

FIGS. 15A-C show multiple views of another aspect of the pipe fitting 110 wherein the pipe fitting 110 can be a weldolet 1812. The weldolet 1812 can define a raised-lip end 1802 disposed opposite from a coped end 1804. The raised-lip end 1802 can define the raised lip 518 and the pressure relief channels 520. The coped end 1804 can define a coped profile 1808 configured to match a radius of curvature of a pipe (not shown). The coped end 1804 can also define a beveled edge 1806, and the weldolet 1812 can be configured to attach to an outer surface of the pipe (not shown), such as by welding, in order to attach a nipple for the pipe (not shown). A coupling, such as the coupling 170a of FIG. 1, can be slipped over the raised-lip end 1802 and retained by the raised lip 518 to form another aspect of the pre-assembled coupling assembly 100. The weldolet 1812 can define a secondary key 1818, similar to the secondary key 1378 shown in FIG. 11, which can act as a stop for the coupling 170a when the raised-lip end 1802 of the weldolet 1812 is inserted into the coupling 170a. In some aspects, the coupling 170 can receive the secondary key 1378 in a secondary groove (not shown) which can be similar to the secondary groove 1372 of the coupling 170 of the aspect of FIG. 11.

Figure 16A:
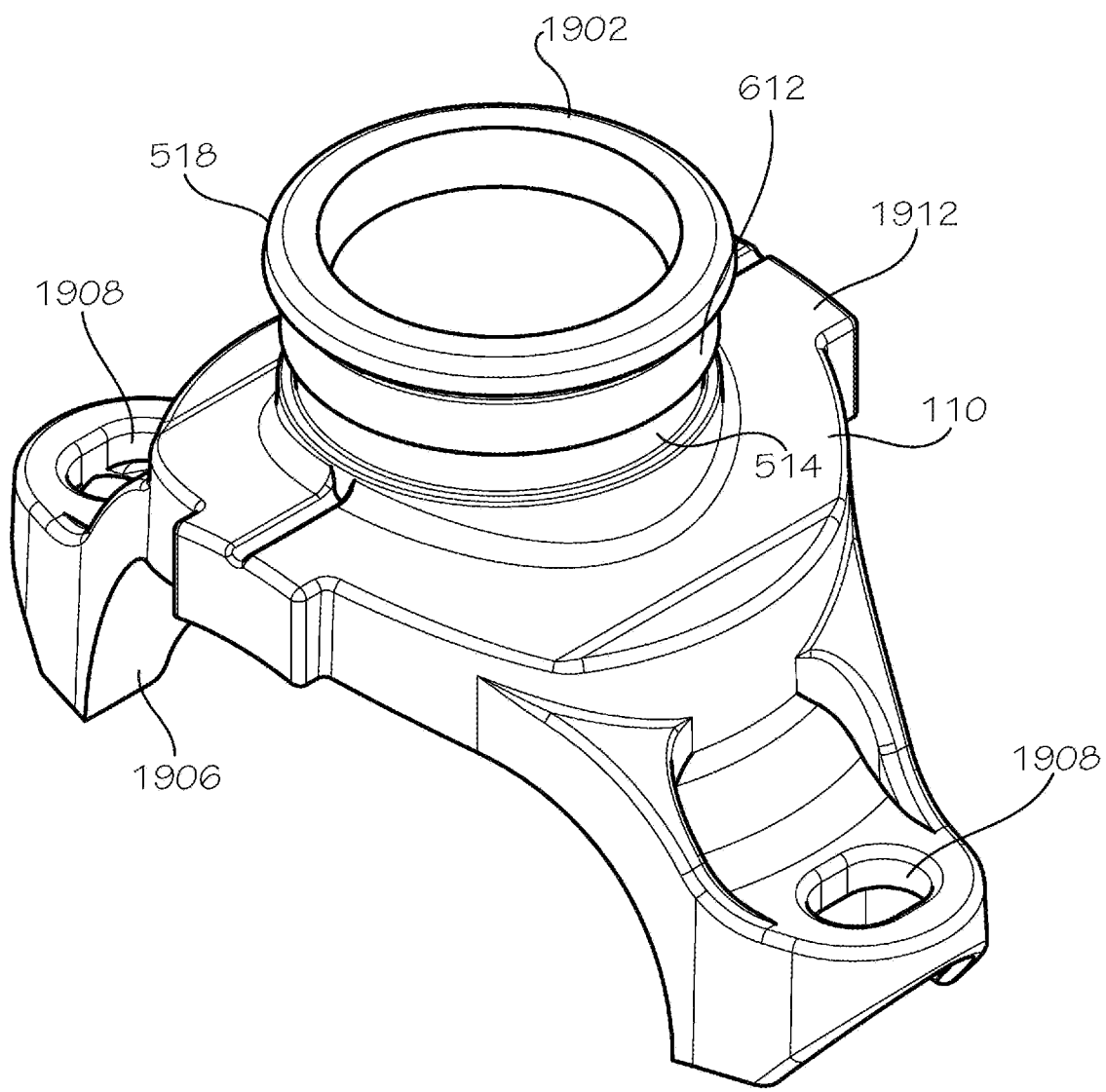
FIG. 16A is a perspective view of another aspect of the pipe fitting defining a mechanical tee in accordance with another aspect of the present disclosure.
Figure 16B:
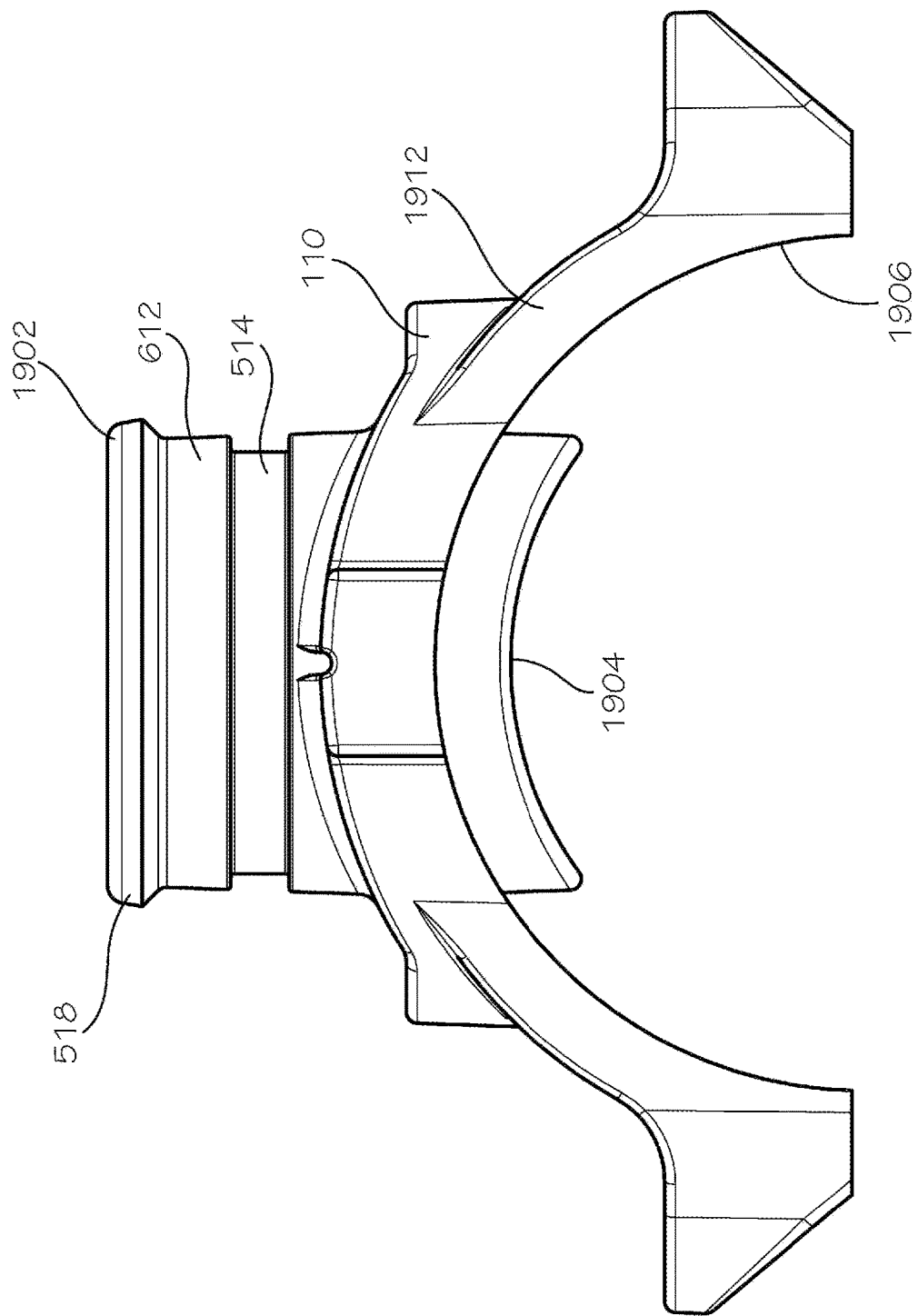
FIG. 16B is an end view of the mechanical tee of FIG. 16A.
Figure 16C:
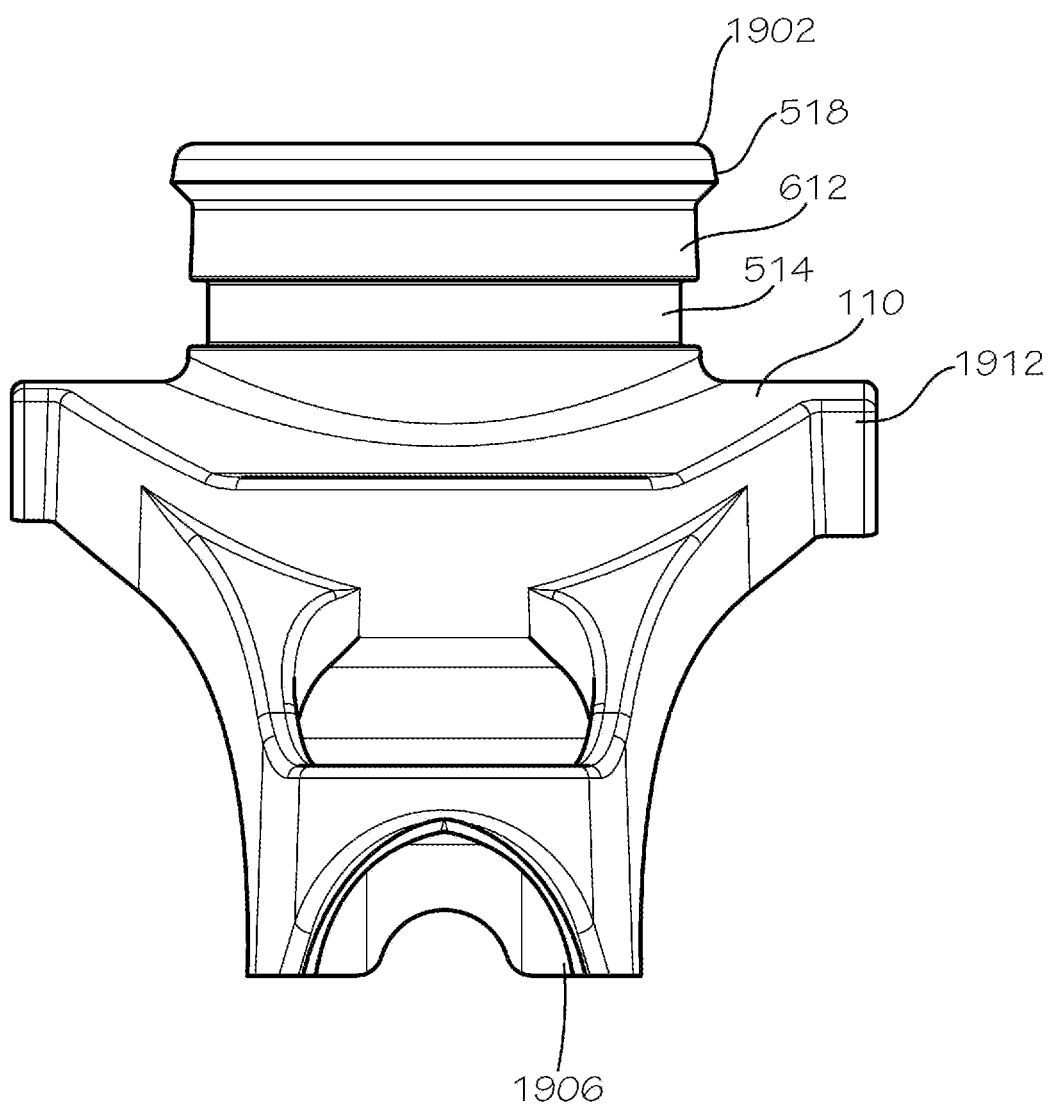
FIG. 16C is a side view of the mechanical tee of FIG. 16A.

FIGS. 16A-C show multiple views of another aspect of the pipe fitting 110 wherein the pipe fitting 110 can be a mechanical tee 1912. The mechanical tee 1912 can define a saddle 1906 configured to fit around an outer pipe surface of a pipe (not shown). The saddle 1906 can define a pair of fastener holes 1908 which can receive fasteners (not shown) to secure the mechanical tee 1912 to the other pipe. The mechanical tee 1912 can define a raised-lip end 1902 disposed opposite from the saddle 1906. In the present aspect, the mechanical tee 1912 can define a coped end 1904 disposed opposite from the raised-lip end 1902 which can extend downwards between the saddle 1906. The coped end 1904 can be received by a hole (not shown) defined by the pipe, and the mechanical tee 1912 can be secured and sealed to the other pipe to provide a tee connection. A coupling, such as the coupling 170a of FIG. 1, can be attached to the raised-lip end 1902 and retained by the raised lip 518 to form another aspect of the pre-assembled coupling assembly 100.

Figure 17A:
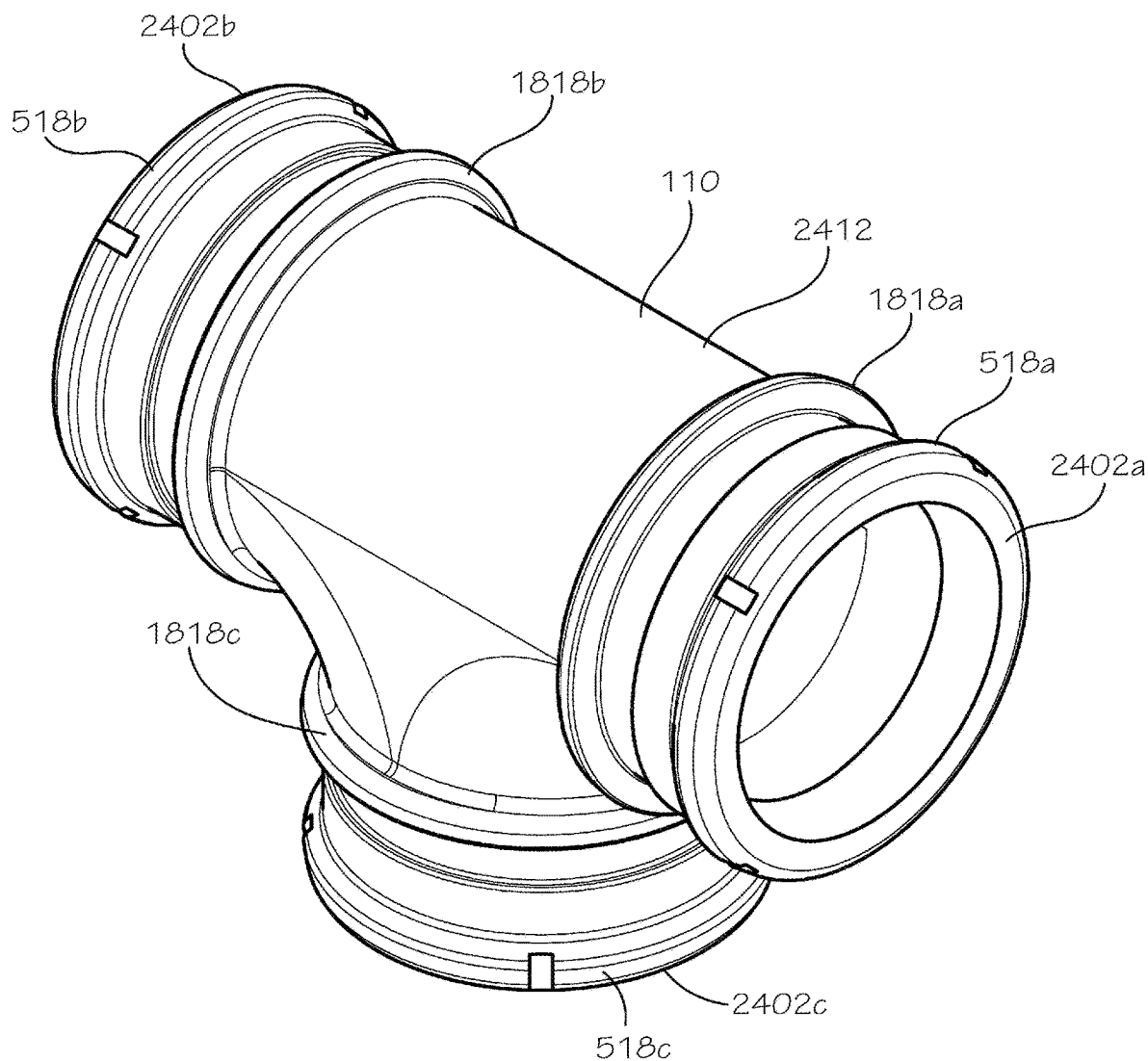
FIG. 17A is a perspective view of another aspect of the pipe fitting defining a tee fitting in accordance with another aspect of the present disclosure.
Figure 17B:
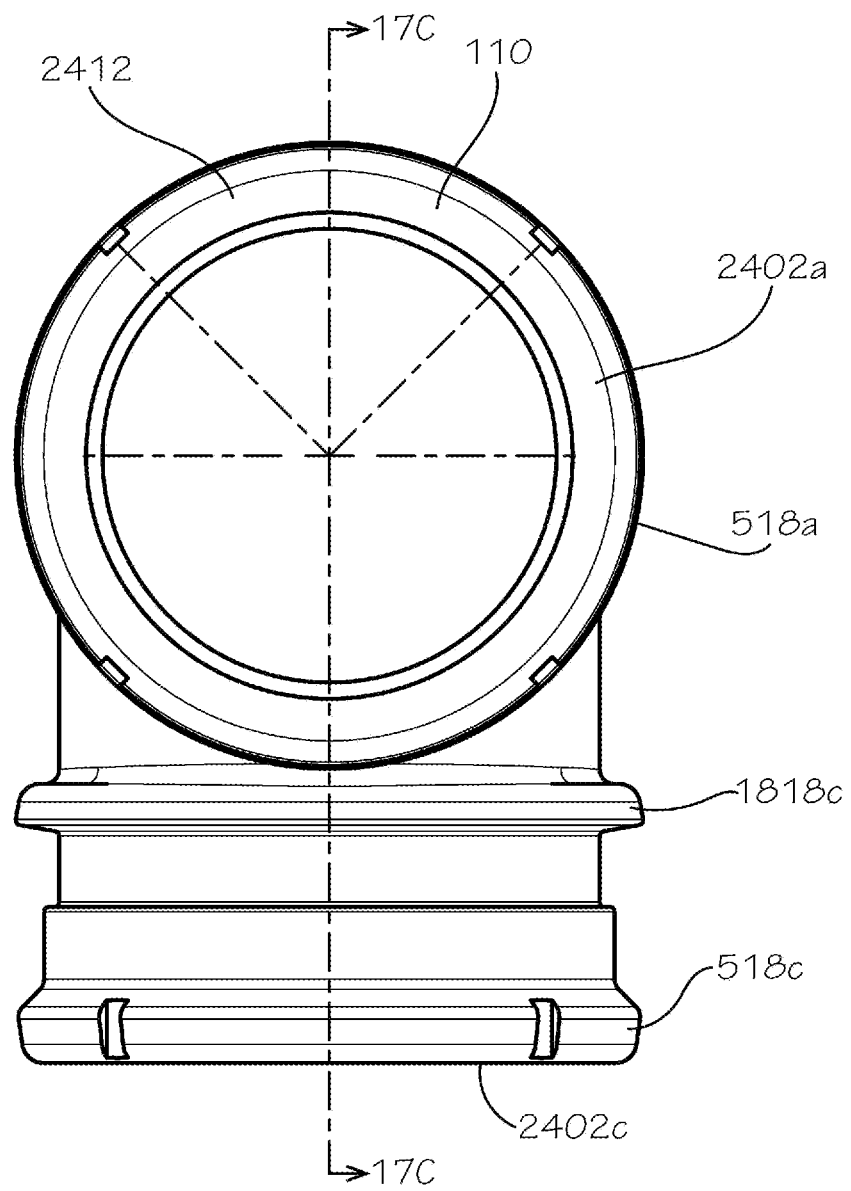
FIG. 17B is an end view of the tee fitting of FIG. 17A.
Figure 17C:
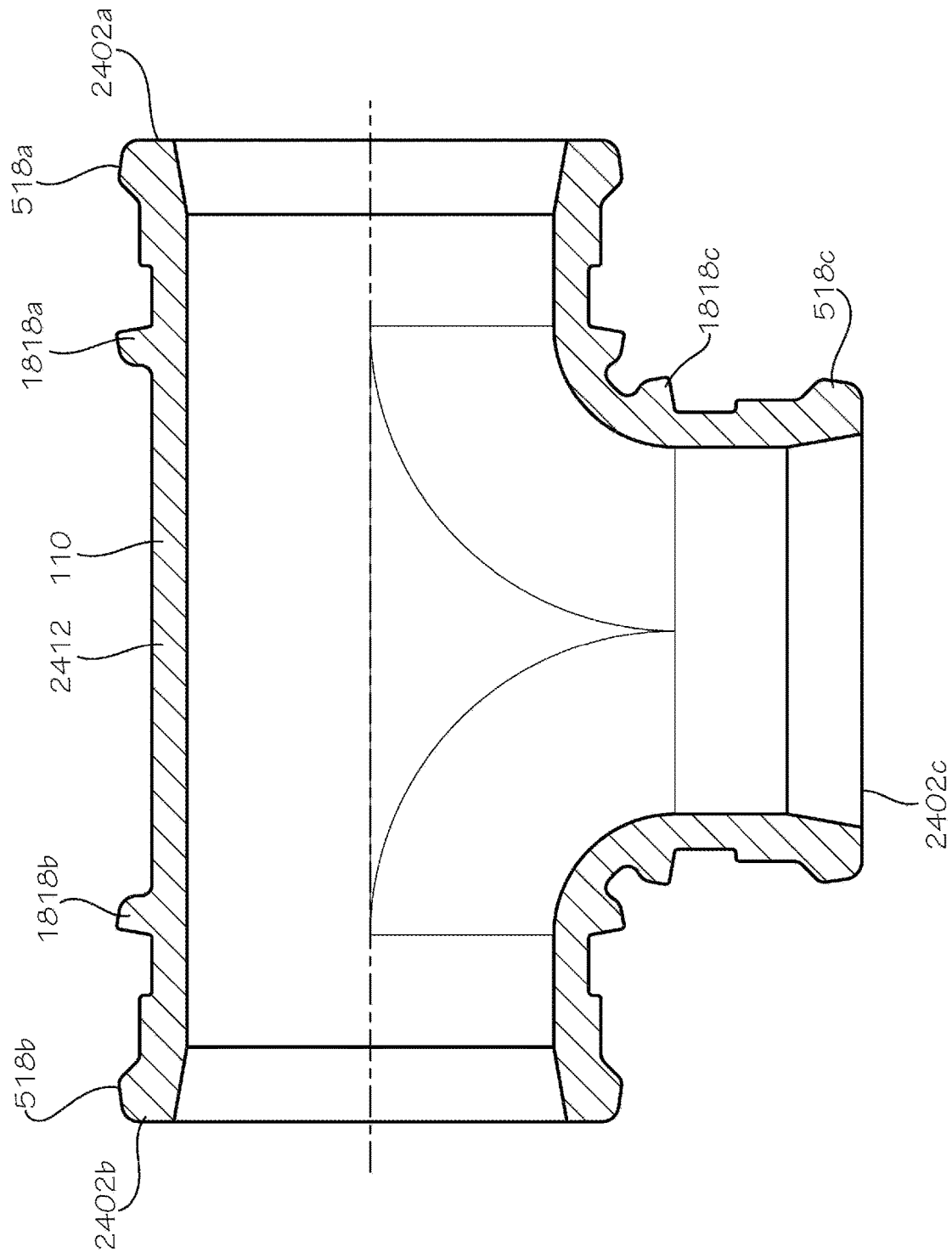
FIG. 17C is a cross-sectional side view of the tee fitting of FIG. 17A taken along line 17C-17C shown in FIG. 17B.
Figure 18A:
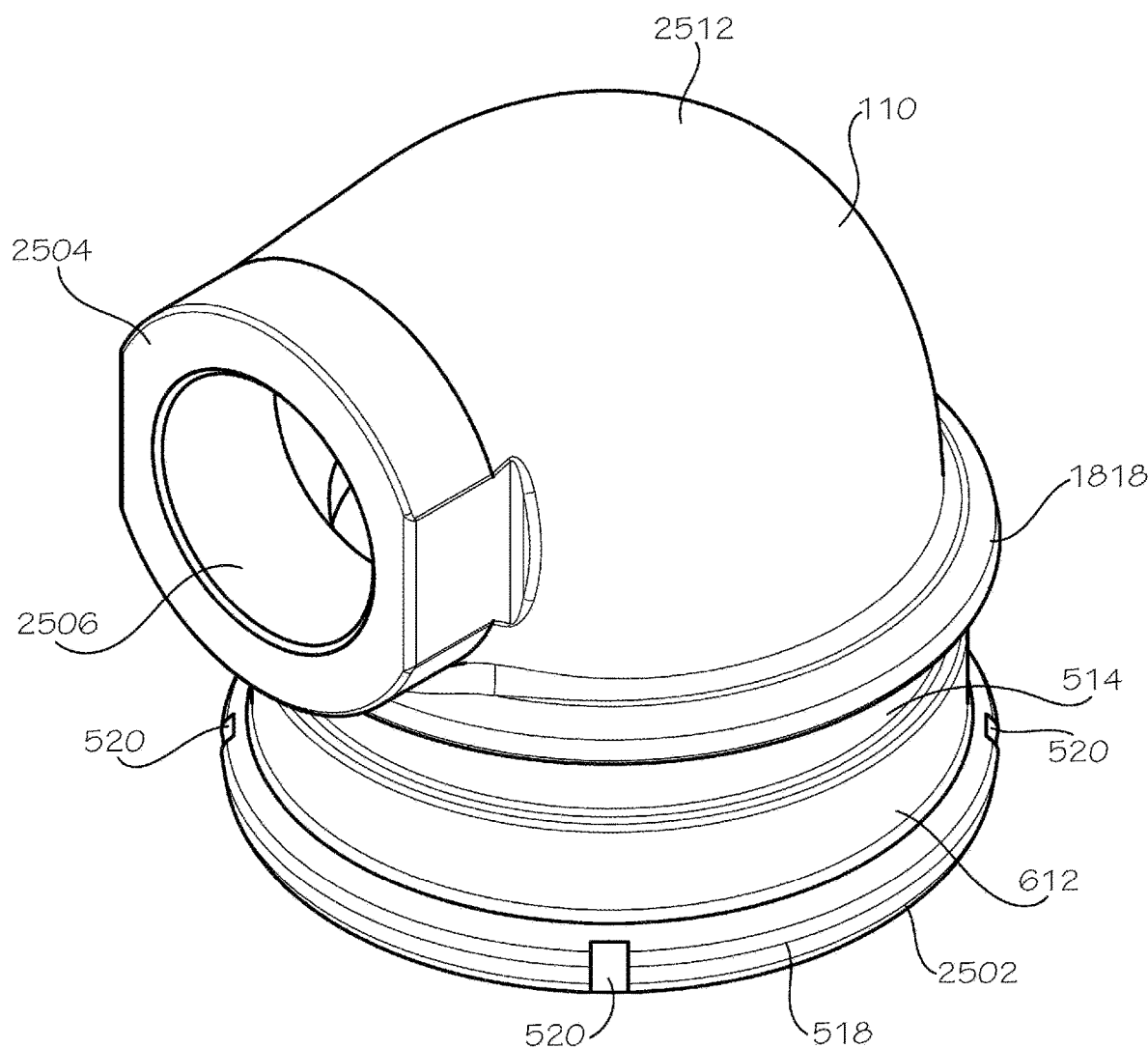
FIG. 18A is a perspective view of another aspect of the pipe fitting defining an end-of-line elbow in accordance with another aspect of the present disclosure.
Figure 18B:
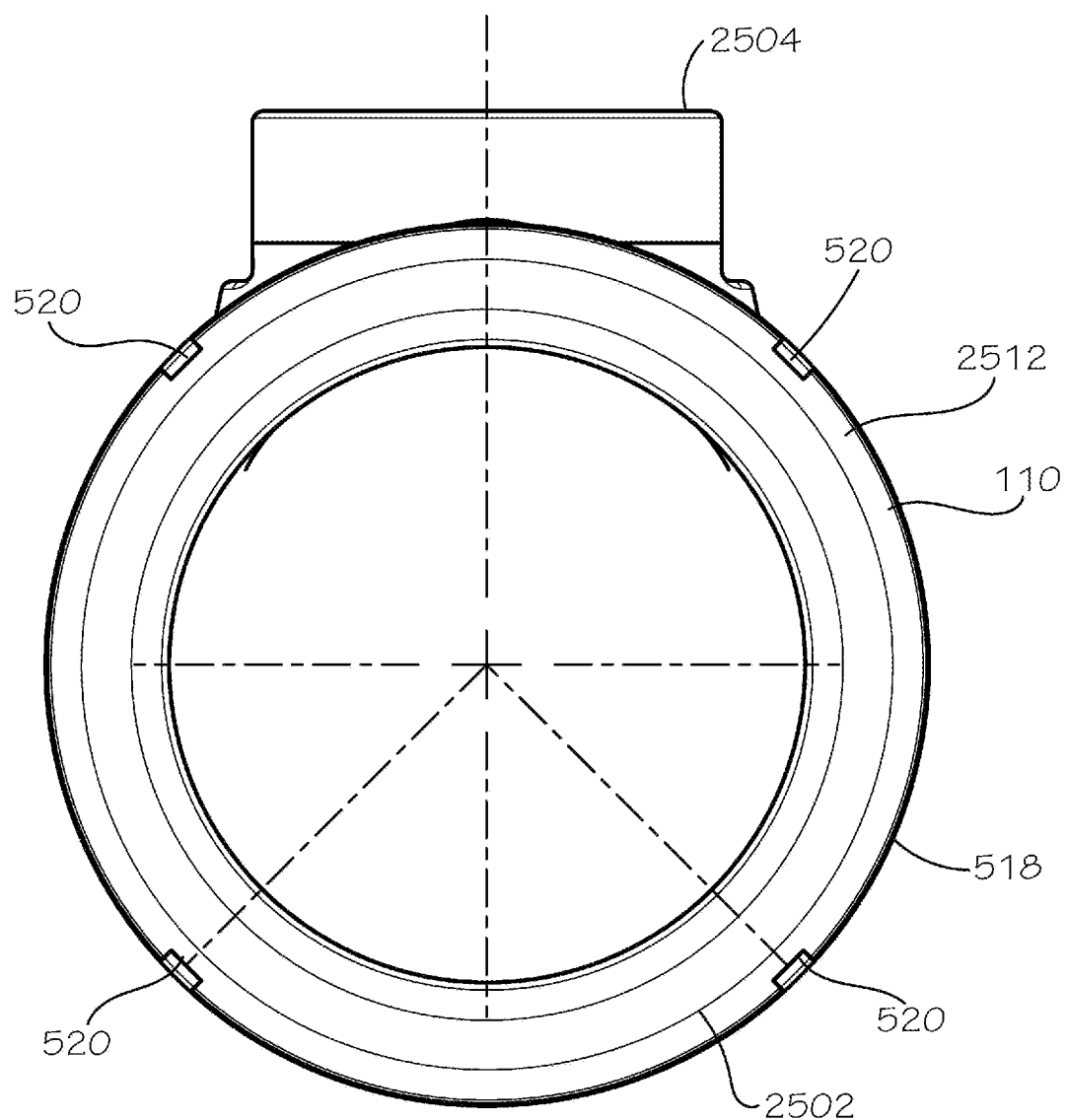
FIG. 18B is an end view of the end-of-line elbow of FIG. 18A facing a raised-lip end of the end-of-line elbow.
Figure 18C:
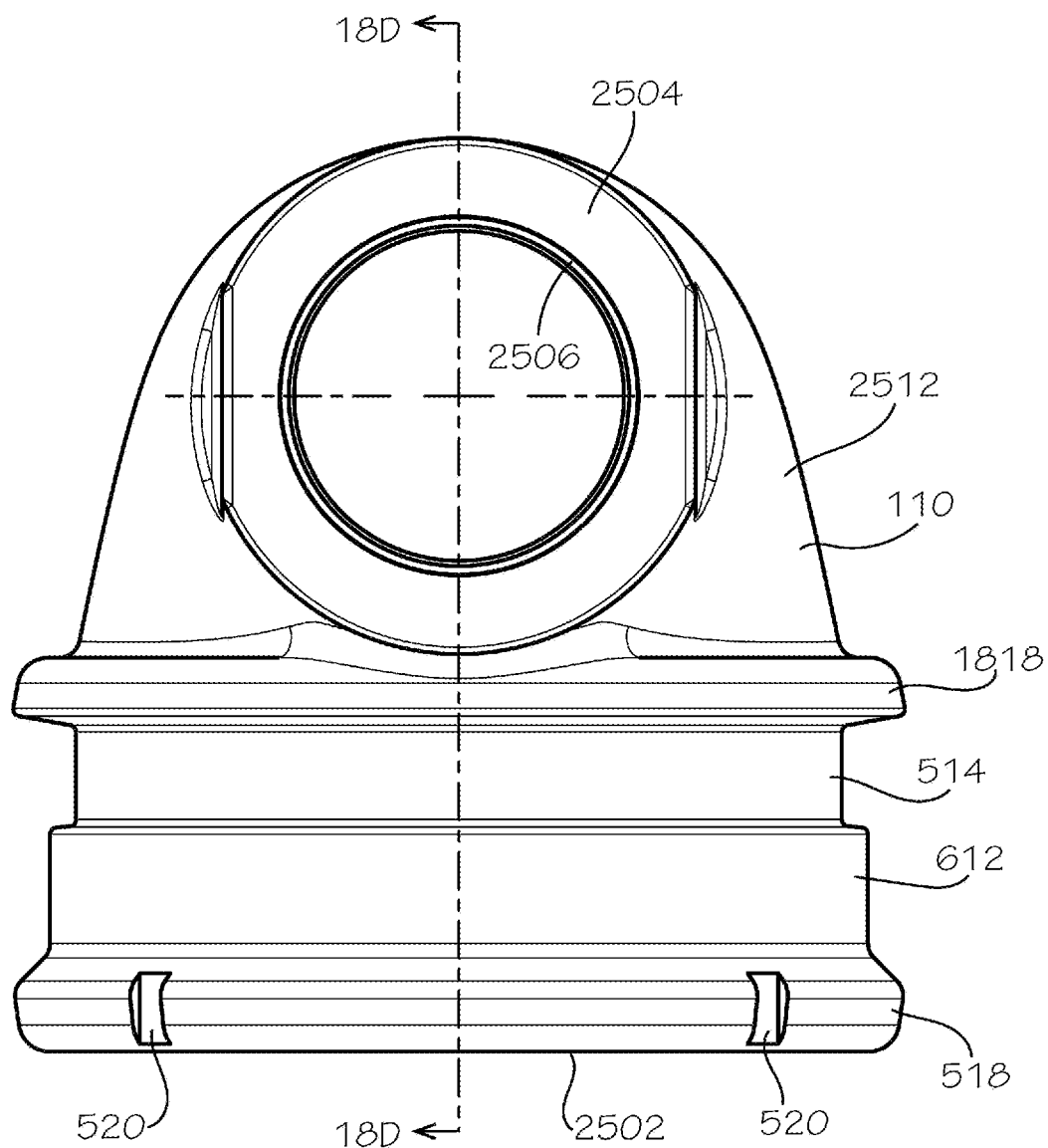
FIG. 18C is an end view of the end-of-line elbow of FIG. 18A facing a socket end of the end-of-line elbow.
Figure 18D:
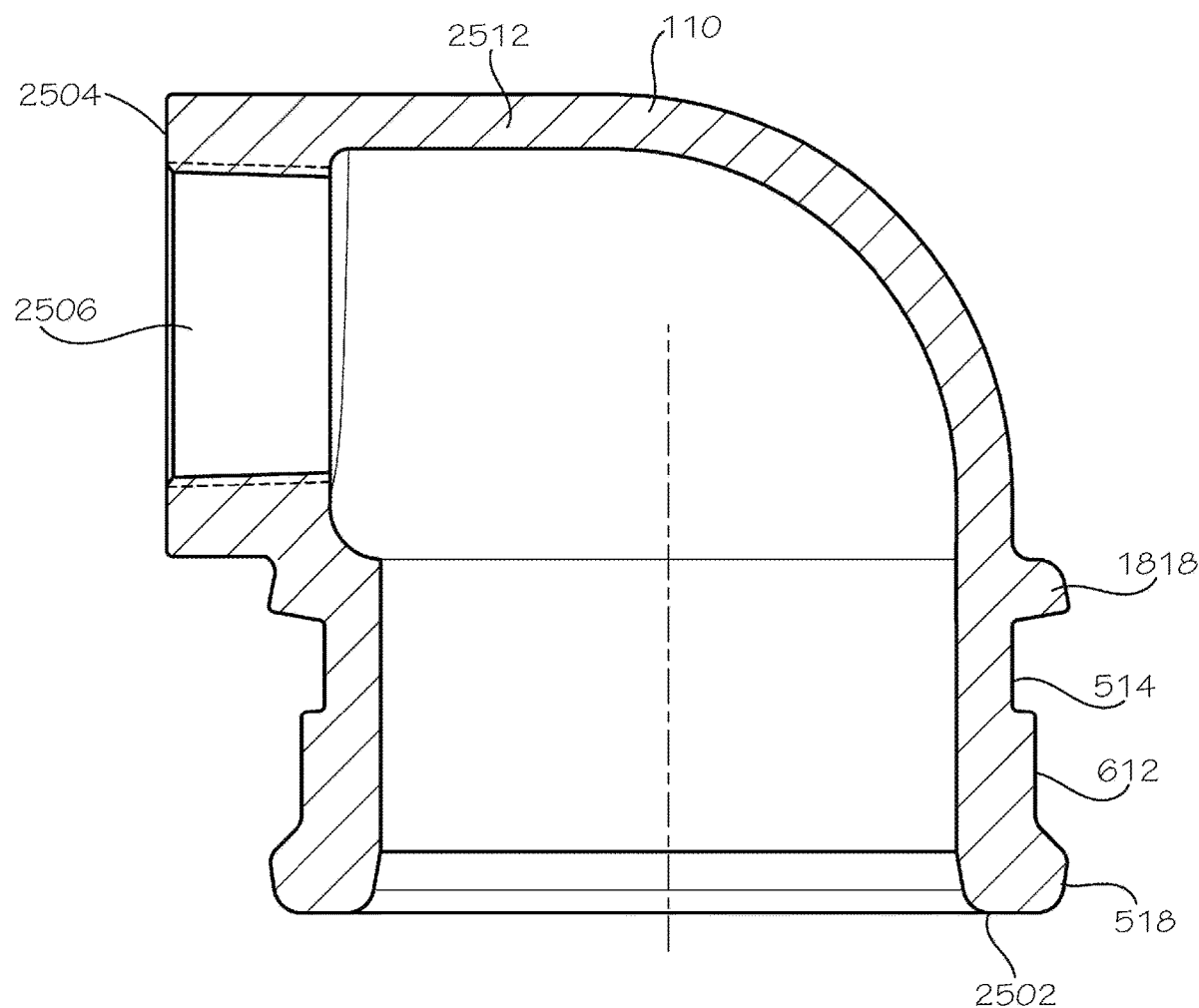
FIG. 18D is a cross-sectional side view of the end-of-line elbow of FIG. 18A taken along line 18D-18D shown in FIG. 18C.

FIGS. 17A-C show multiple views of another aspect of the pipe fitting 110 wherein the pipe fitting 110 can be a tee fitting 2412. The tee fitting 2412 can define three raised-lip ends 2402a,b,c, respectively defining the raised lips 518a,b,c. The raised-lip ends 2402a,b can be disposed opposite from one another on the tee fitting 2412, and the raised-lip end 2402c can extend outwards substantially perpendicular to the raised-lip ends 2402a,b. In other aspects, one or more of the raised-lip ends 2402a,b,c can be a standard grooved end, such as the standard grooved end 1402 shown in FIG. 2, in place of a raised-lip end 2402. Couplings 170, as shown in FIG. 1, can be slipped over any or all of the raised-lip ends 2402a,b,c and retained by the respective raised lips 518a,b,c to form another aspect of the pre-assembled coupling assembly 100.

FIGS. 18A-D shows multiple views of another aspect of the pipe fitting 110 wherein the pipe fitting 110 can be an end-of-line elbow 2512. The end-of-line elbow 2512 can define a raised-lip end 2502 and a socket end 2504. The socket end 2504 can define a socket 2506. The socket 2506 can be a threaded socket which can be configured to receive a threaded plug, a threaded pipe end, a hose connection, or any other suitable threaded fitting in the present aspect. In other aspects, the socket 2506 can be a tapered socket, as commonly used with polyvinyl chloride (PVC) piping for example and without limitation, or a weld socket, as commonly used with socket-weld pipe connections. The raised-lip end 2502 can define the raised lip 518. A coupling 170, as shown in FIG. 1, can be slipped over the raised-lip end 2502 and retained by the raised lip 518 to form another aspect of the pre-assembled coupling assembly 100.

Figure 19A:
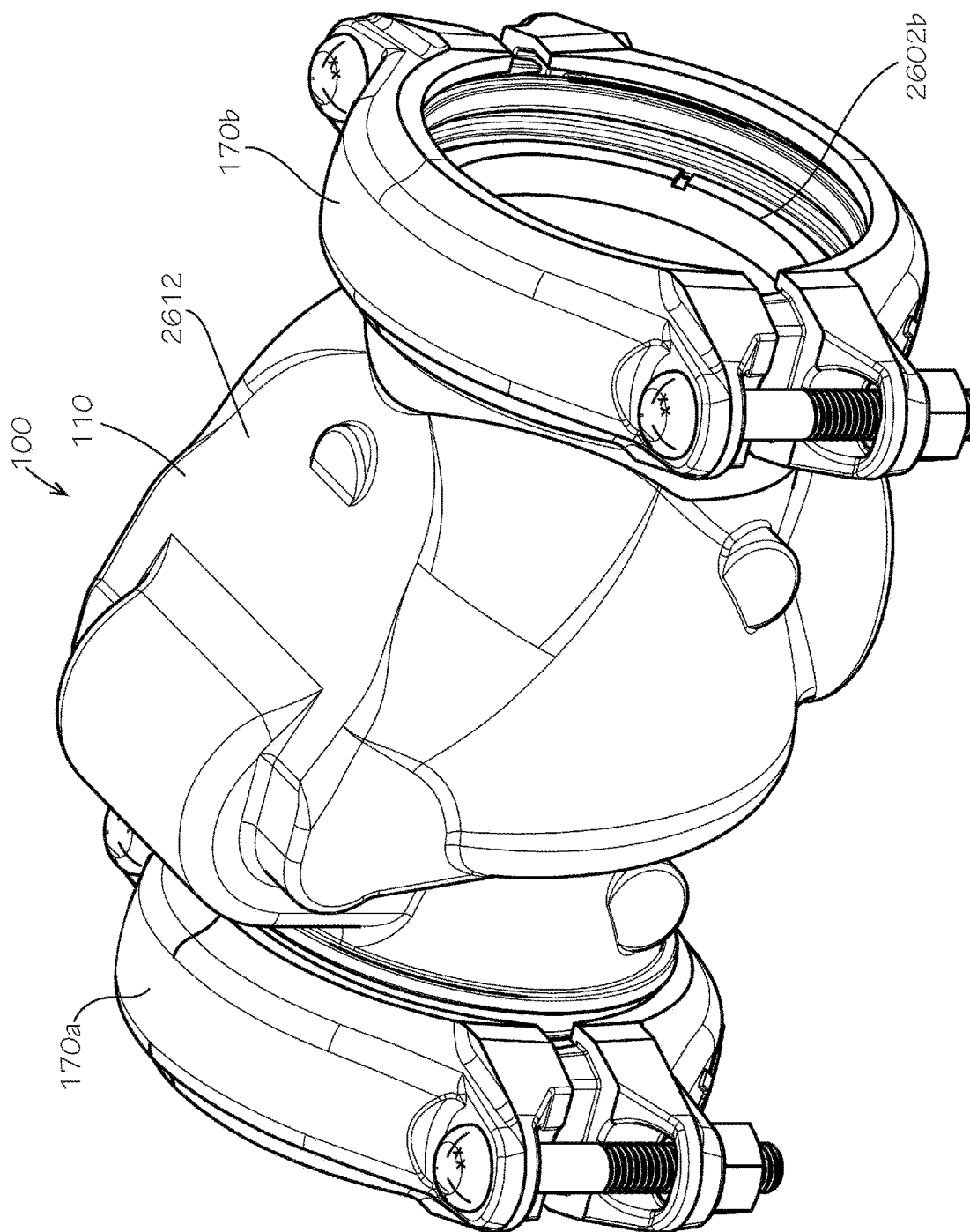
FIG. 19A is a perspective view of another aspect of the pre-assembled coupling assembly wherein the pipe fitting defines a check valve in accordance with another aspect of the present disclosure.
Figure 19B:
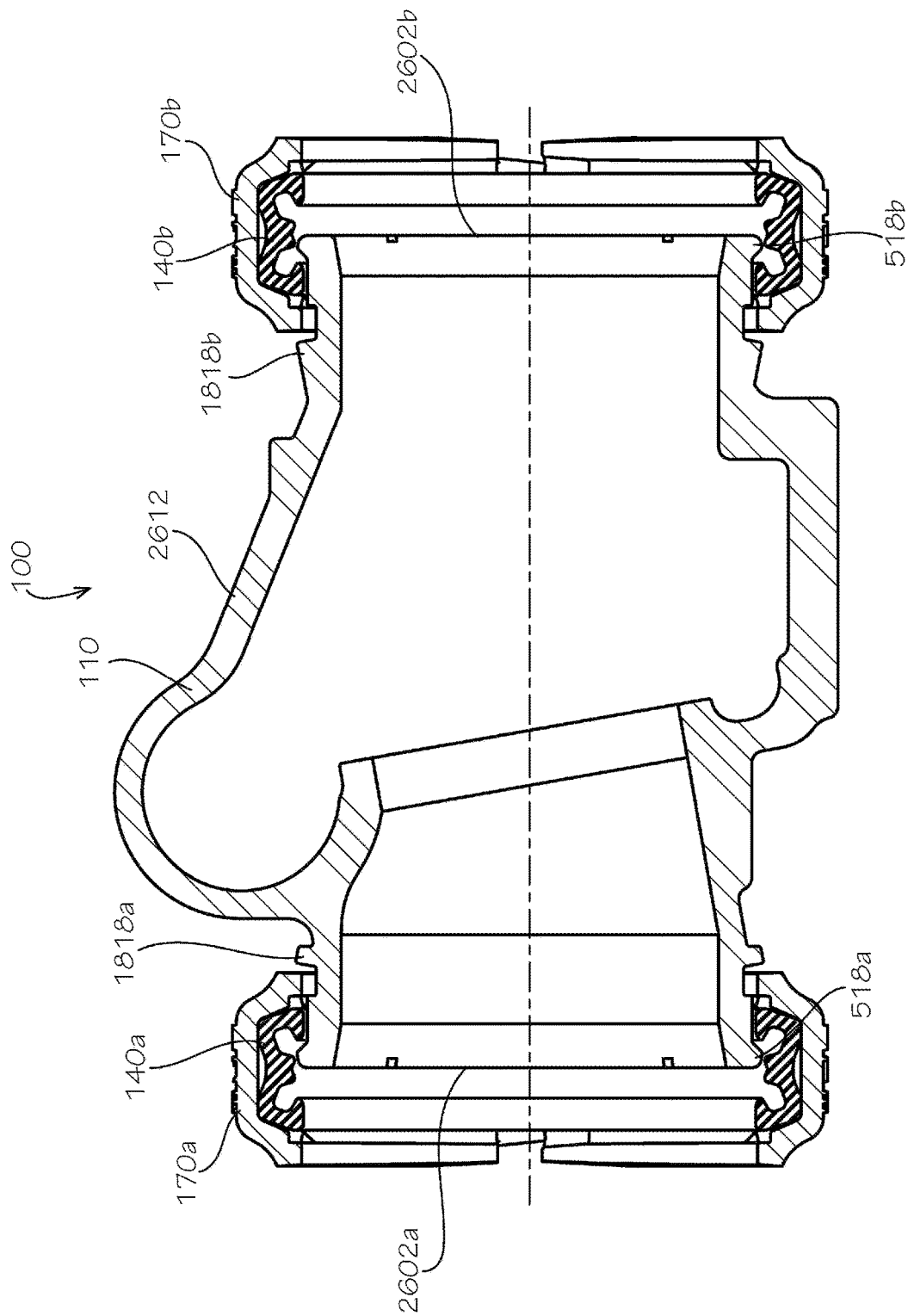
FIG. 19B is a cross-sectional side view of the pre-assembled coupling assembly of FIG. 19A.

FIGS. 19A-B show multiple views of another aspect of the pre-assembled coupling assembly 100 wherein the pipe fitting 110 can be a check valve 2612. In the present aspect, the check valve 2612 can define a pair of raised-lip ends 2602a,b. The raised-lip end 2602a can be disposed opposite from the raised-lip end 2602b on the check valve 2612. In other aspects, a one of the raised-lip ends 2602a,b can be a standard grooved end, such as the standard grooved end 1402 shown in FIG. 2. Each raised-lip end 2602a,b can respectively define the raised lip 518a,b. The couplings 170a,b can be positioned and retained on the raised-lip ends 2602a,b, respectively.

Figure 20A:
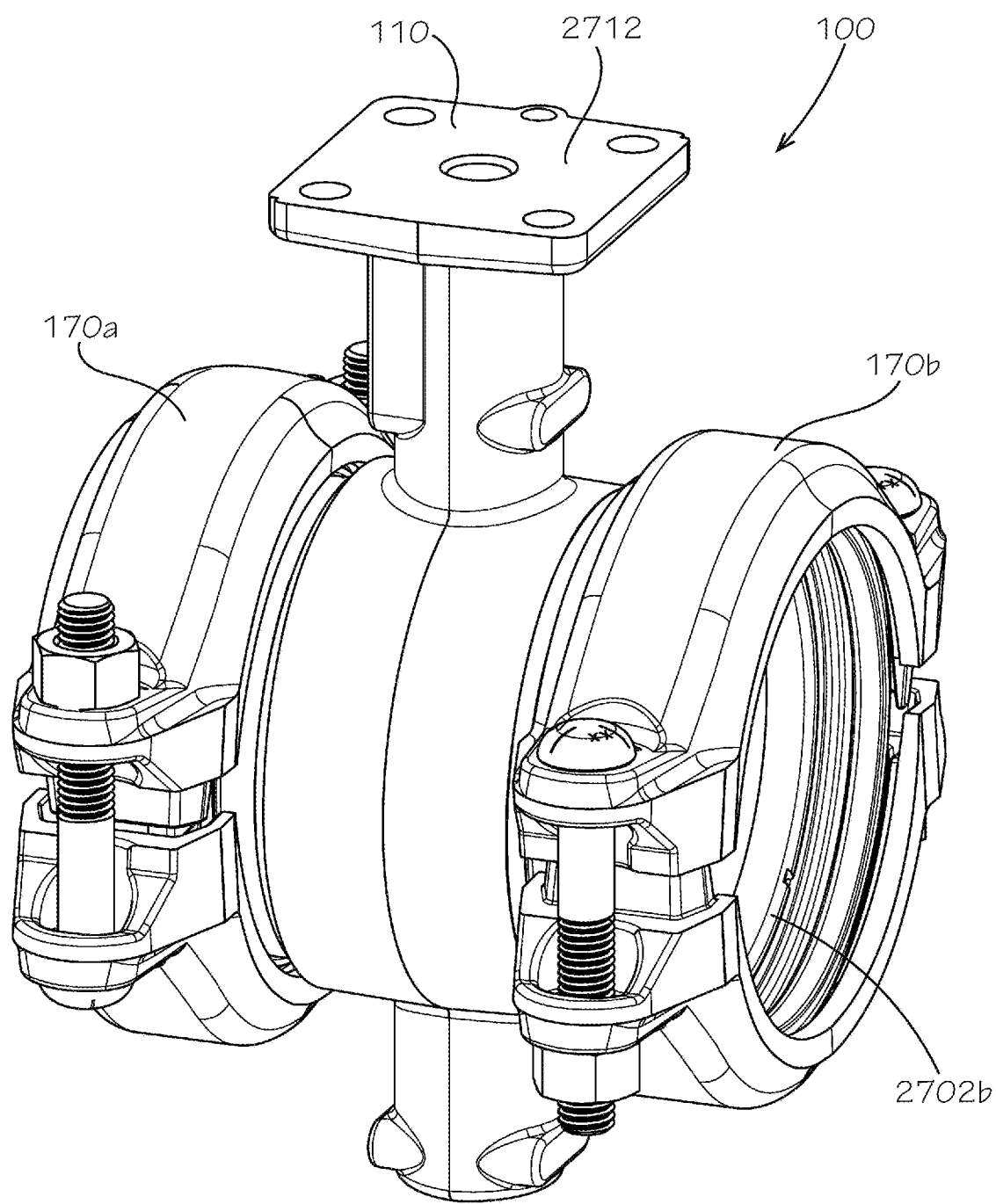
FIG. 20A is a perspective view of another aspect of the pre-assembled coupling assembly wherein the pipe fitting defines a disc valve in accordance with another aspect of the present disclosure.
Figure 20B:
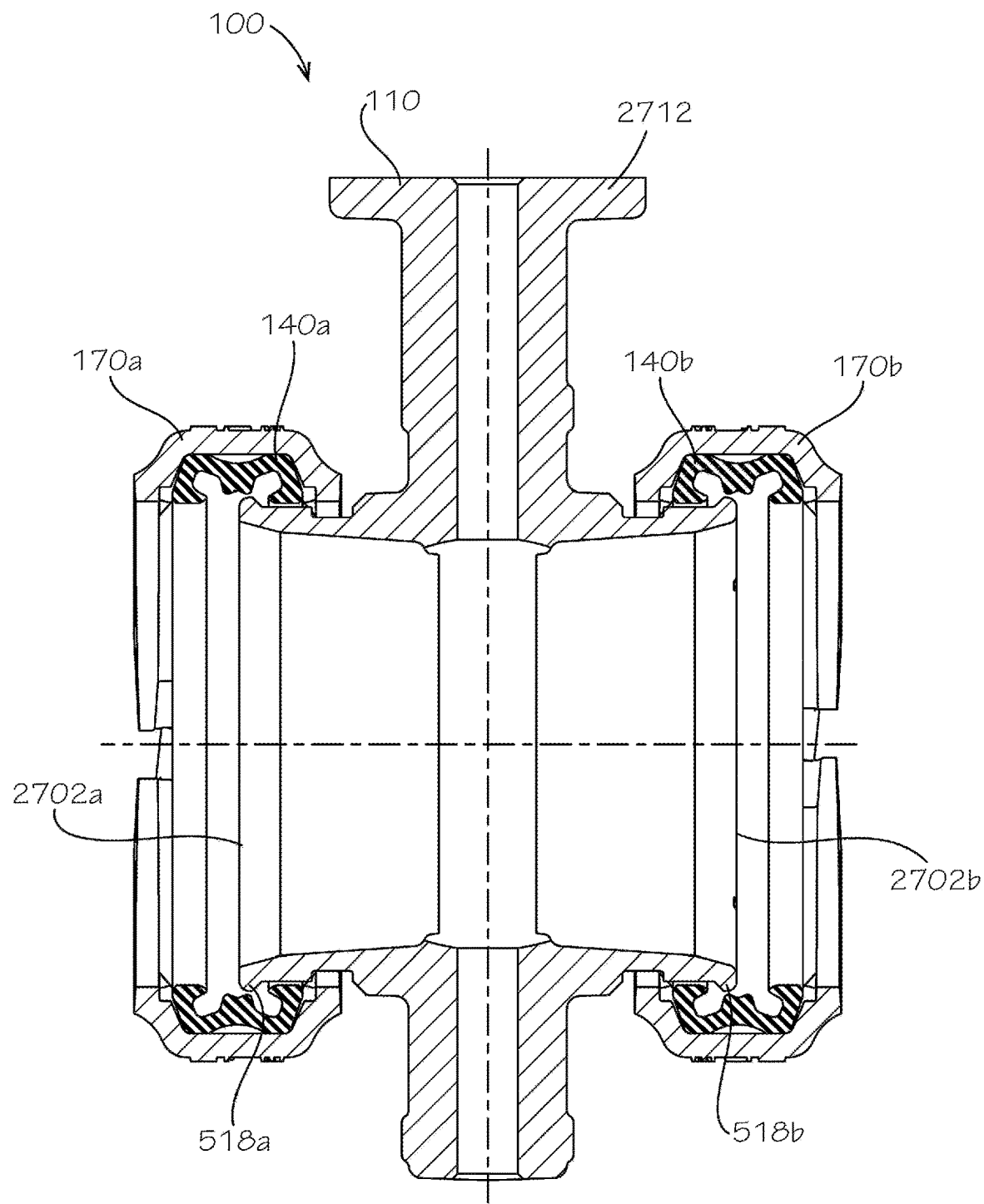
FIG. 20B is a cross-sectional side view of the pre-assembled coupling assembly of FIG. 20A.

FIGS. 20A-B shows multiple views of another aspect of the pre-assembled coupling assembly 100 wherein the pipe fitting 110 can be a disc valve 2712. In the present aspect, the disc valve 2712 can define a pair of raised-lip ends 2702a,b. The raised-lip end 2702a can be disposed opposite from the raised-lip end 2702b on the disc valve 2712. In other aspects, a one of the raised-lip ends 2702a,b can be a standard grooved end, such as the standard grooved end 1402 shown in FIG. 14. Each raised-lip end 2702a,b can respectively define the raised lip 518a,b. The couplings 170a,b can be positioned and retained on the raised-lip ends 2602a,b, respectively.

Figure 21A:
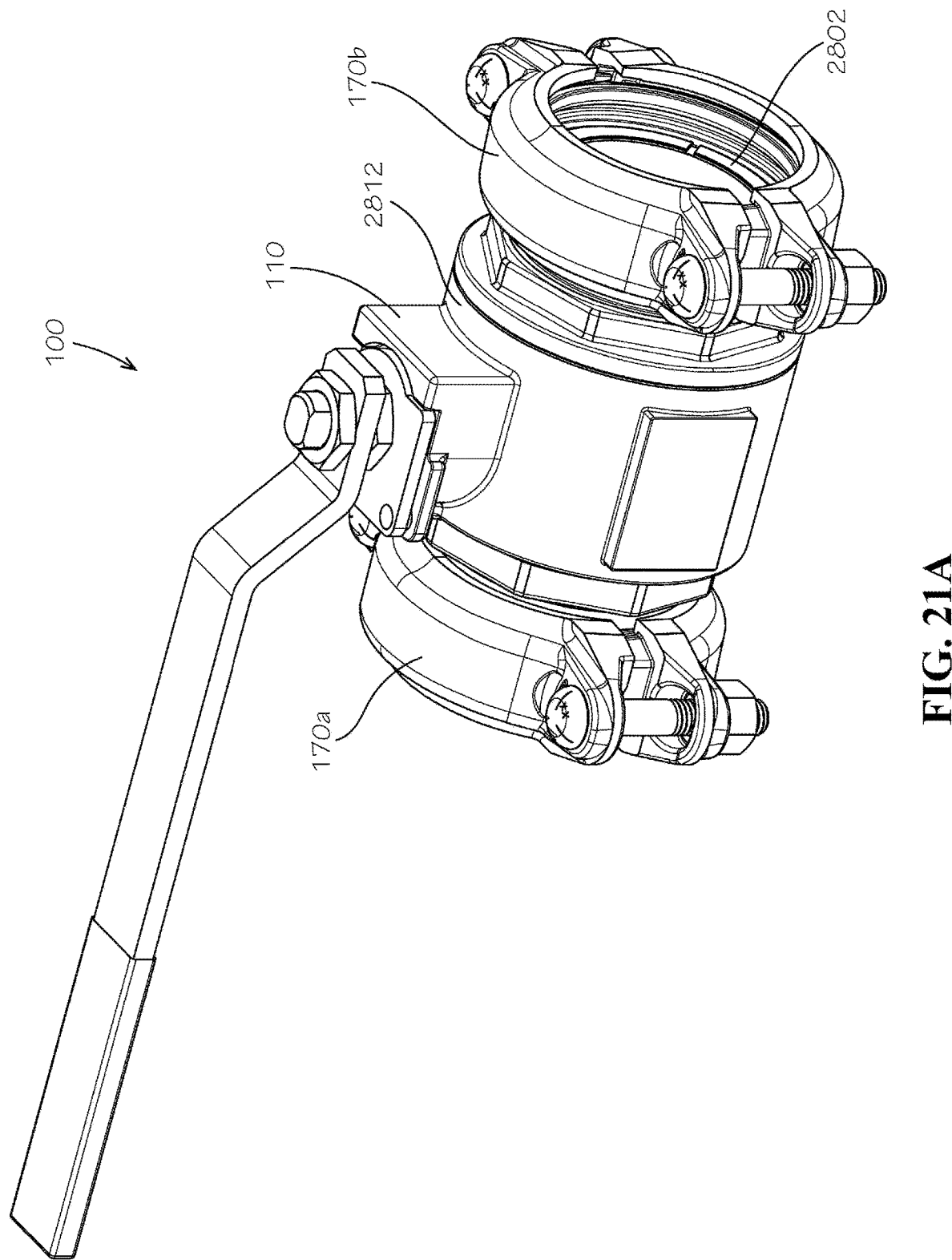
FIG. 21A is a perspective view of another aspect of the pre-assembled coupling assembly wherein the pipe fitting defines a ball valve in accordance with another aspect of the present disclosure.
Figure 21B:
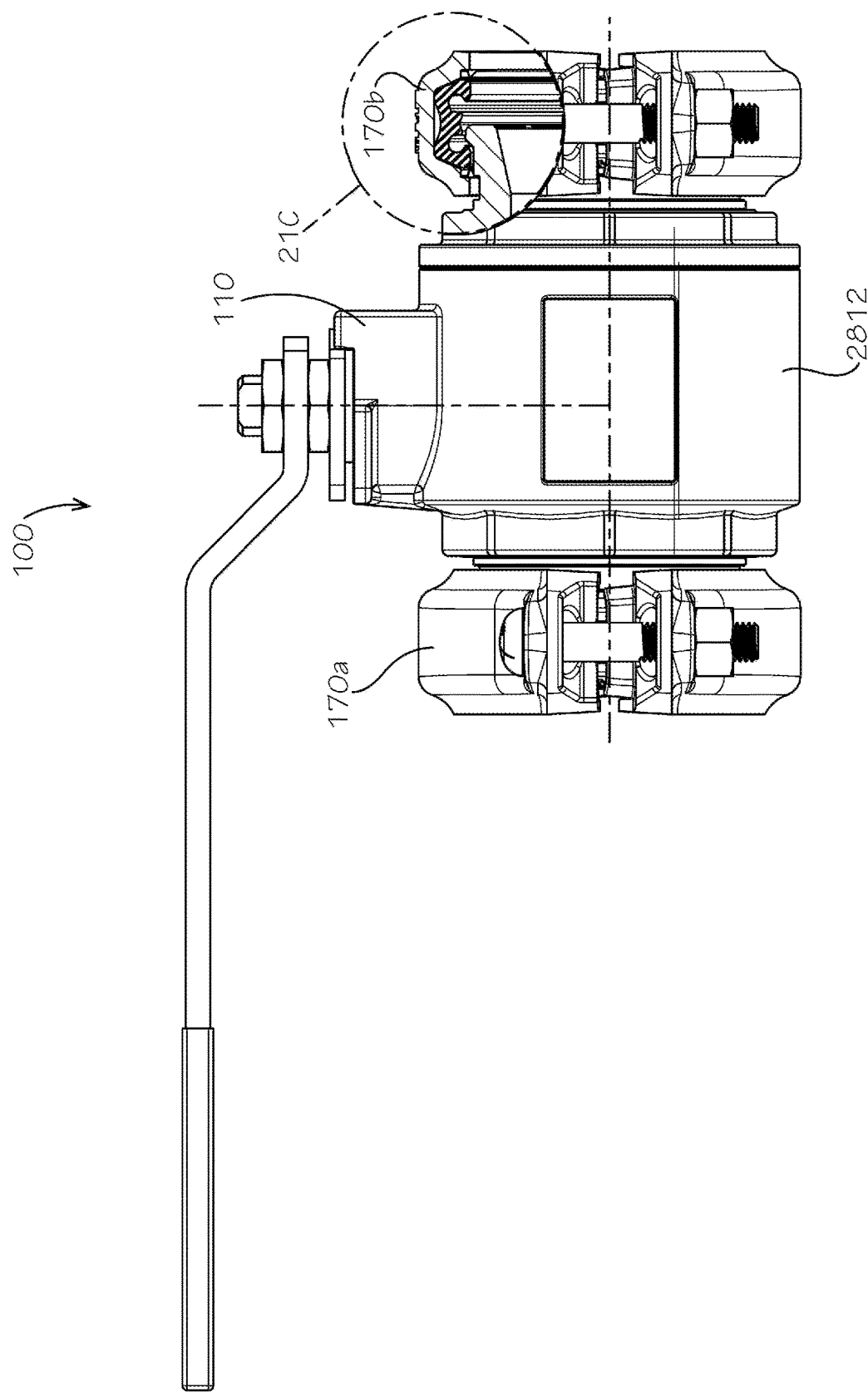
FIG. 21B is a side view of the pre-assembled coupling assembly of FIG. 21A showing a partial cross-section.
Figure 21C:
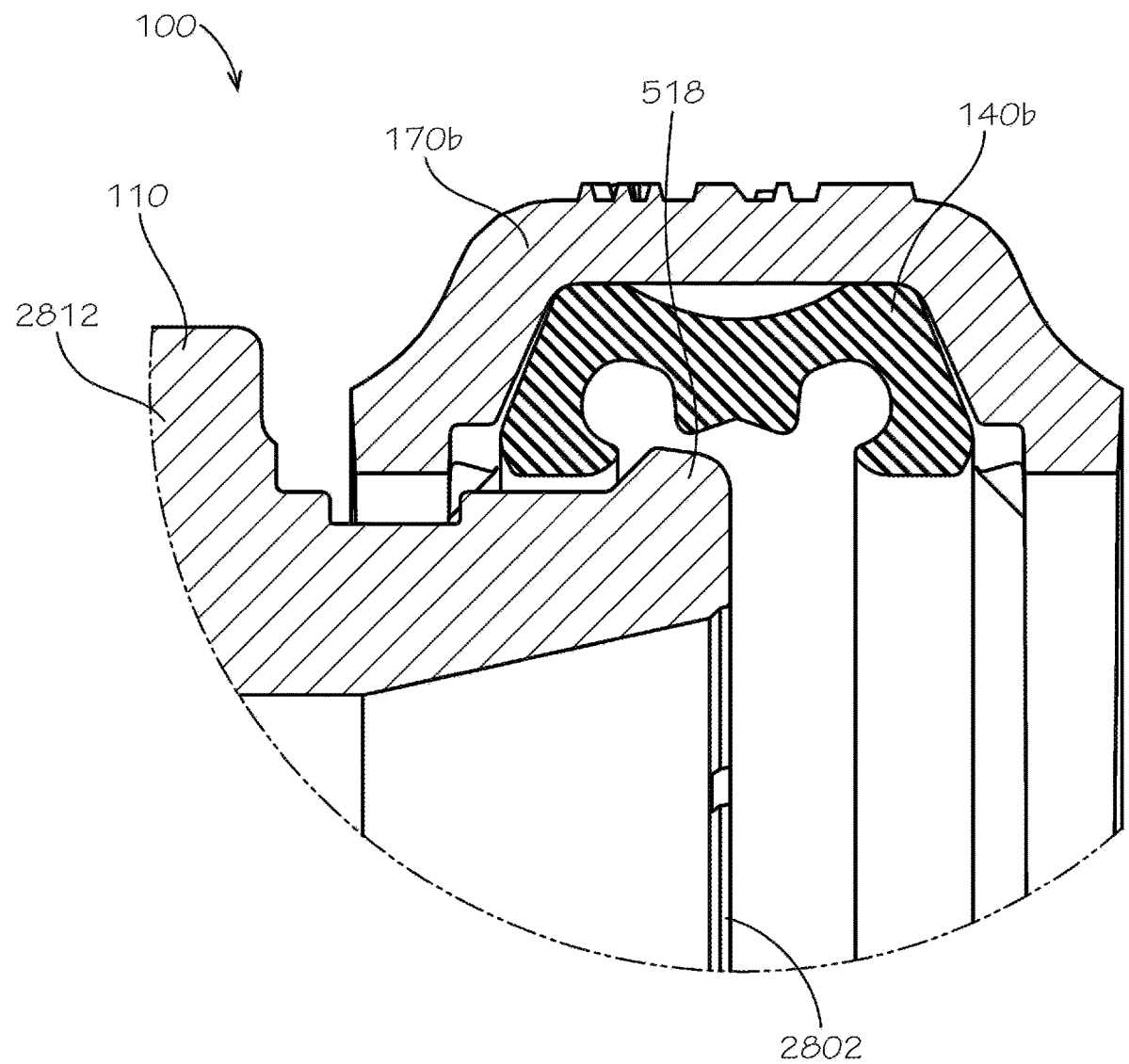
FIG. 21C is a detailed cross-sectional side view of the pre-assembled coupling assembly of FIG. 21A taken from Detail 21C shown in FIG. 21B.

FIGS. 21A-C show multiple views of another aspect of the pre-assembled coupling assembly 100 wherein the pipe fitting 110 can be a ball valve 2812. In the present aspect, the ball valve 2812 can define a pair of raised-lip ends, as represented by the raised-lip end 2802. The raised-lip end 2802 can respectively define the raised lip 518. The couplings 170a,b can be positioned and retained on the raised-lip ends, respectively.

Figure 22A:
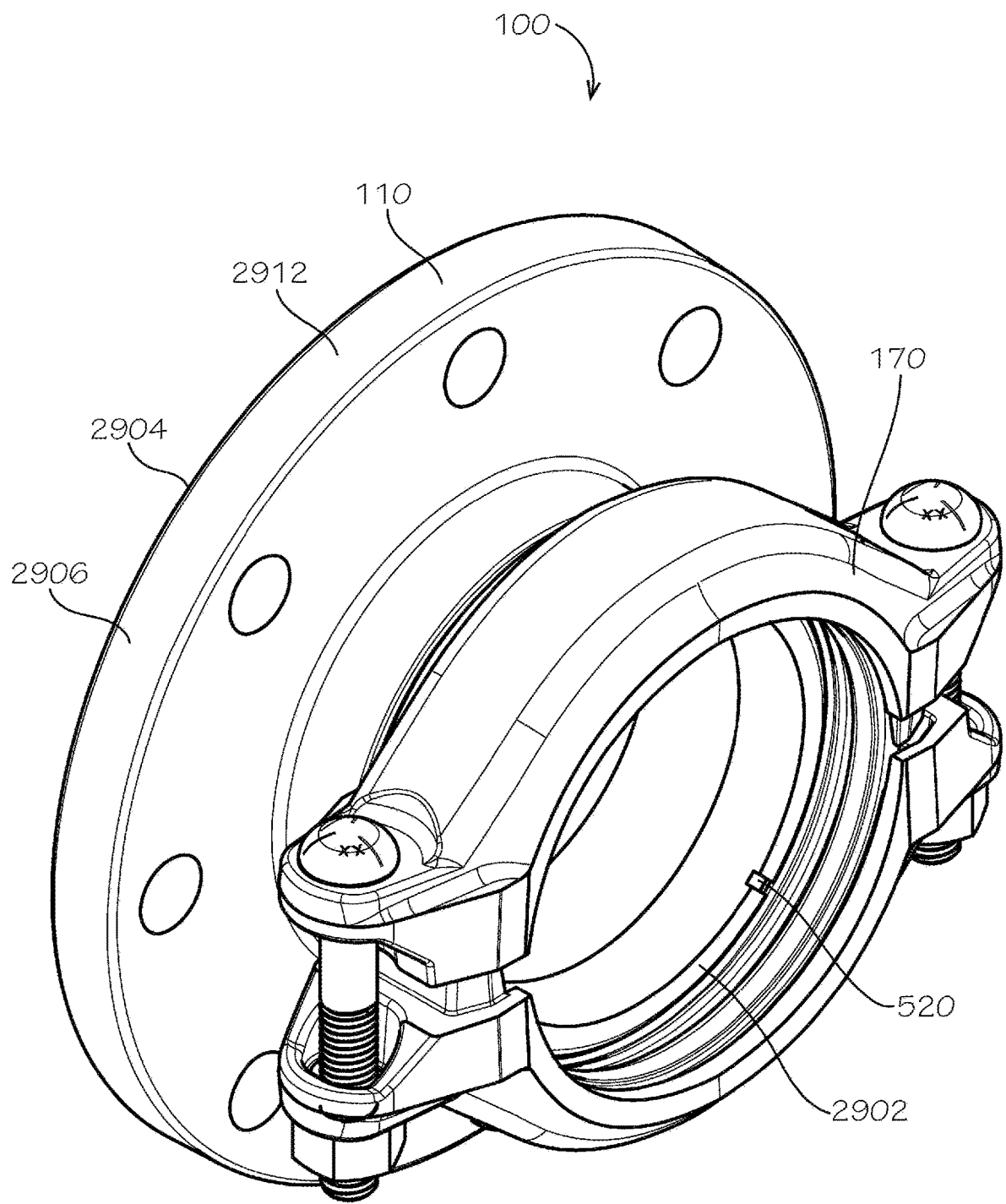
FIG. 22A is a perspective view of another aspect of the pre-assembled coupling assembly wherein the pipe fitting defines a flanged fitting in accordance with another aspect of the present disclosure.
Figure 22B:
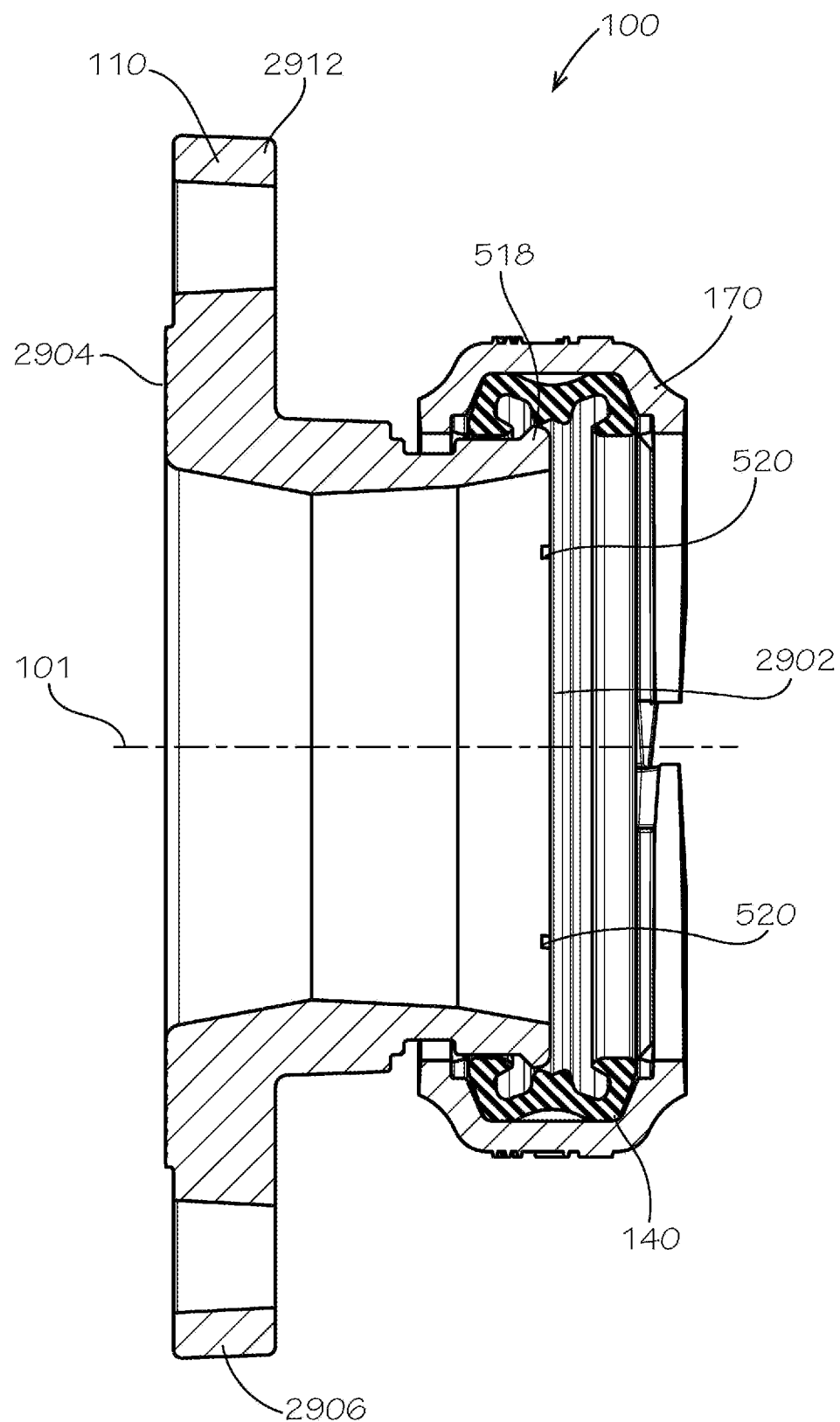
FIG. 22B is a cross-sectional side view of the pre-assembled coupling assembly of FIG. 22A.

FIGS. 22A-B show multiple views of another aspect of the pre-assembled coupling assembly 100 wherein the pipe fitting 110 can be a flanged fitting 2912. The flanged fitting 2912 can define a raised-lip end 2902 and a flanged end 2904. The flanged end 2904 can define a flange 2906 configured to couple with a flange (not shown) of another pipe fitting (not shown). The raised-lip end 2902 can define the raised lip 518. In the relaxed position, the coupling 170 can be retained on the raised-lip end 2902 by interference between the raised lip 518 and the gasket 140.

Figure 23A:
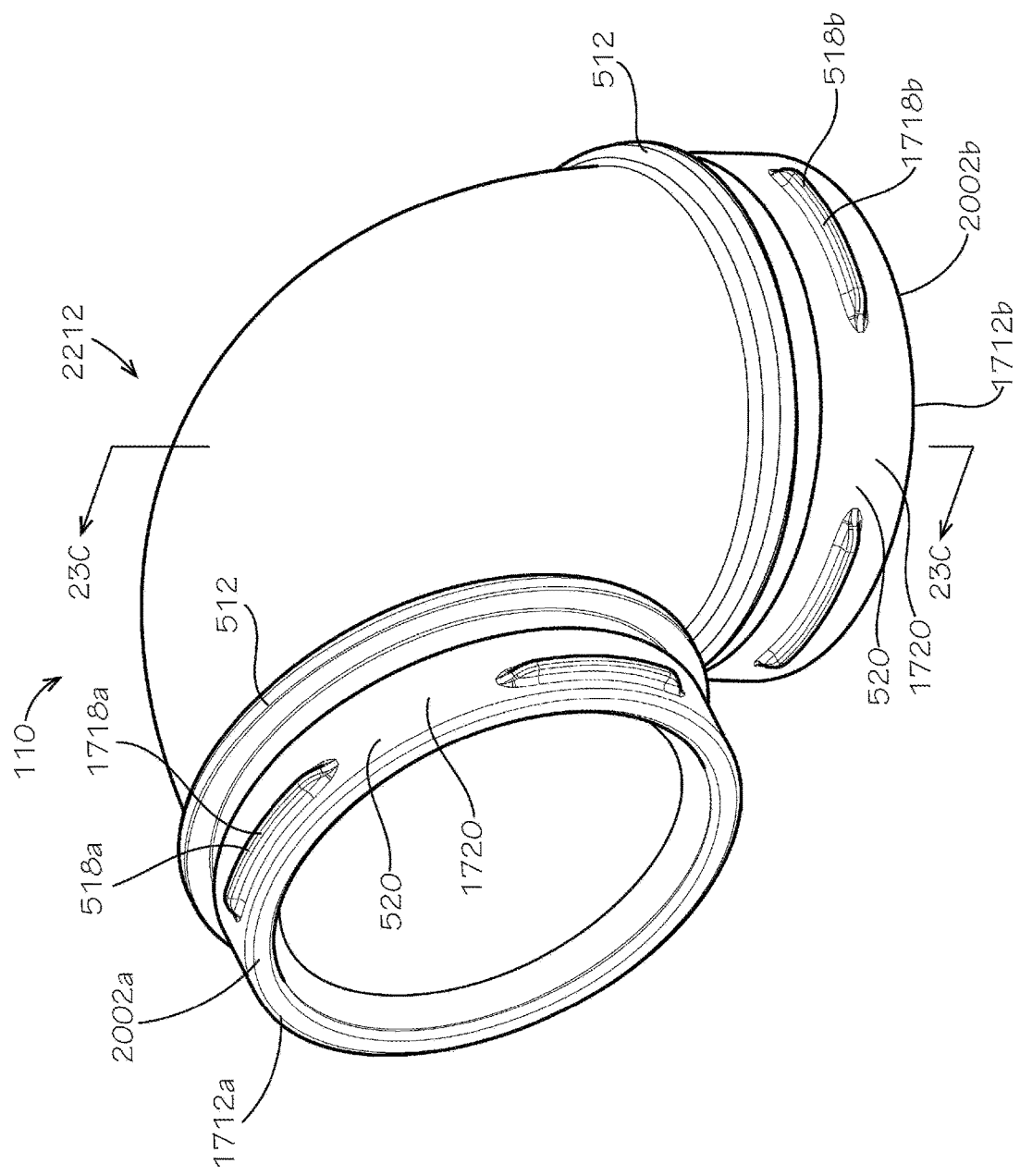
FIG. 23A is a perspective view of another aspect of the elbow fitting wherein each of the raised-lip ends is a stop lip end in accordance with another aspect of the present disclosure.
Figure 23B:
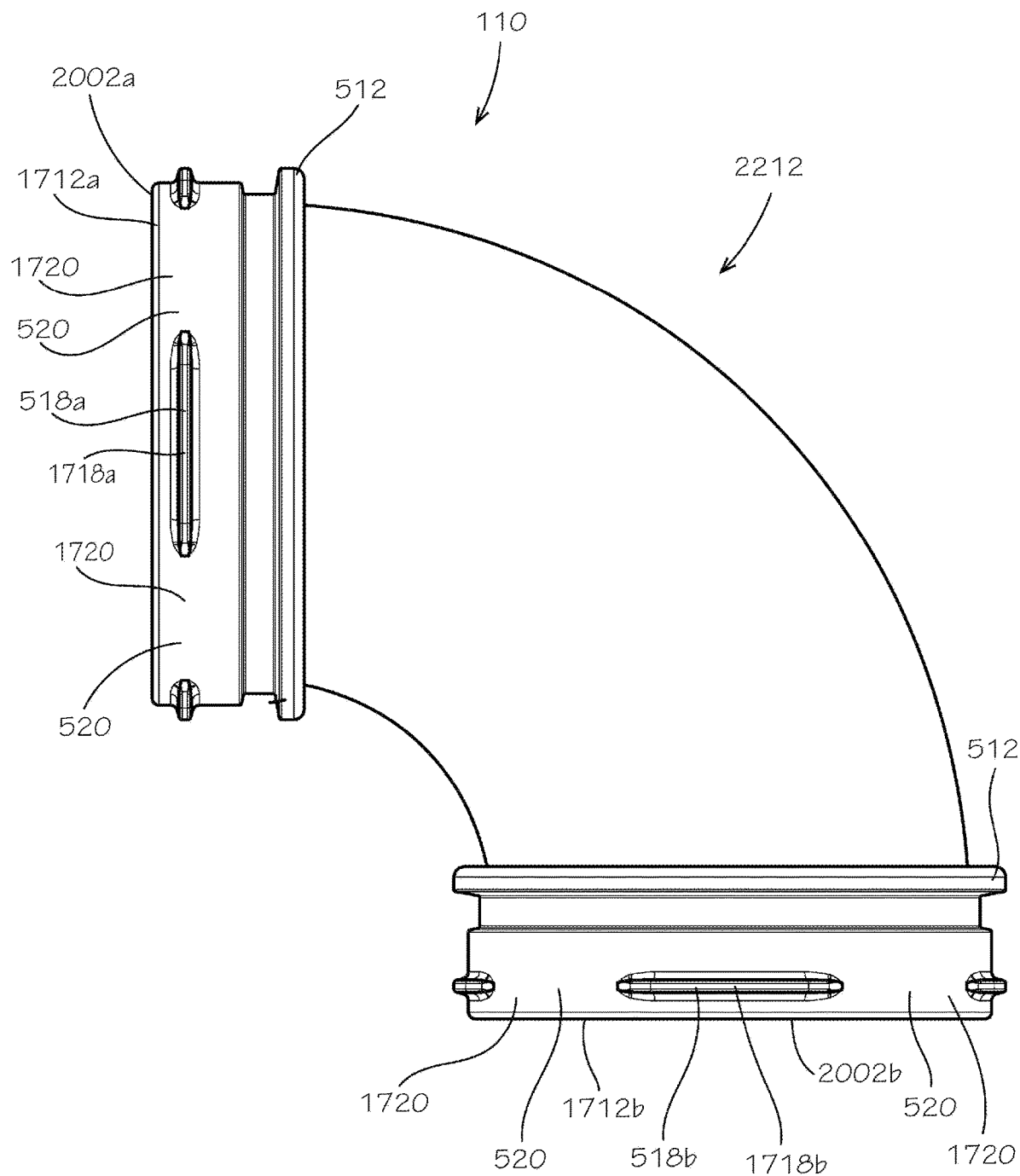
FIG. 23B is a side view of the elbow fitting of FIG. 23A.

FIG. 23A is a perspective view of another aspect of the elbow fitting 2012 wherein each of the raised-lip ends 2002a,b is a stop lip end 1712a,b, respectively, in accordance with another aspect of the present disclosure. FIG. 23B is a side view of the elbow fitting 2012 of FIG. 23A. On the elbow fitting 2012, each of the raised lips 518a,b can be a stop lip 1718a,b. The stop lips 1718a,b can be spaced inward towards the adjacent outer lip 512 and away from the respective stop lip end 1712a,b. The pressure relief channels 520 can also be defined by circumferential gaps 1720 in the respective stop lips 1718a,b in the present aspect.

Figure 23C:
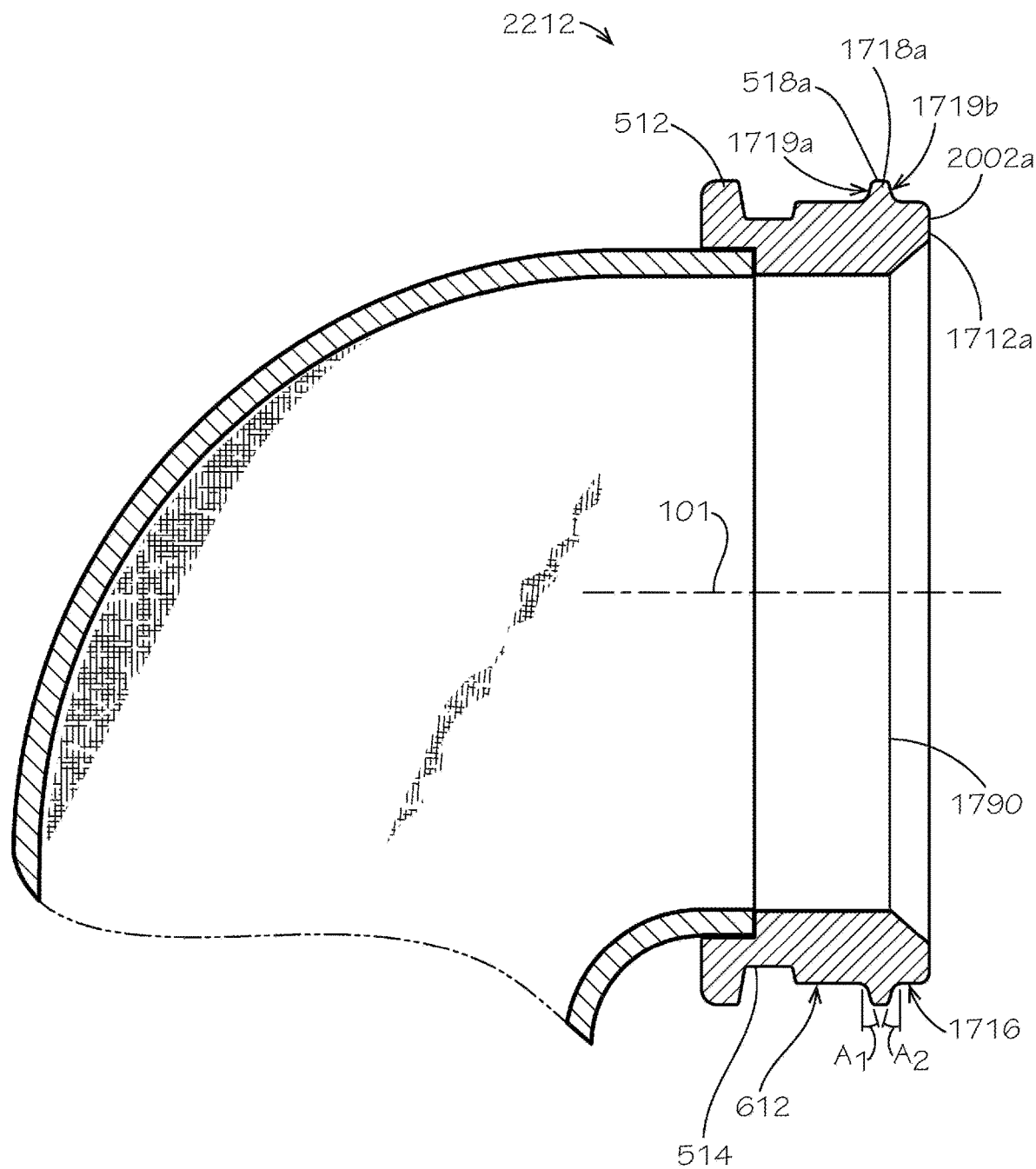
FIG. 23C is a cross-sectional detail view of the stop lip end taken along line 23C-23C shown in FIG. 23A.

FIG. 23C is a cross-sectional detail view of the stop lip end 1712a taken along line 23C-23C shown in FIG. 23A. The stop lip end 1712a can also be representative of the stop lip end 1712b. The stop lip end 1712a can define a bore 1790, and the bore 1790 can define an axis 1701. Unlike the raised lips 518a,b of the aspects of the elbow fitting 2212 of FIGS. 5A-8B, in this aspect, the raised lip 518a, stop lip 1718a, does not extend to the stop lip end 1712a, itself.

Instead, a step surface 1716 can be defined between the stop lip 1718a and the stop lip end 1712a. In the present aspect, the step surface 1716 can be a cylindrical surface. In the present aspect, the step surface 1716 can be radially aligned with the sealing surface 612; however in other aspects, the step surface 1716 can be defined radially inward or radially outward from the sealing surface 612. In the present aspect, the step surface 1716 can be defined radially outward from the groove 514 but radially inward from the stop lip 1718a and the outer lip 512. In the present aspect, the stop lip 1718a can extend radially outwards even with the outer lip 512; however in other aspects, the stop lip 1718a can extend radially outwards beyond the outer lip 512.

The stop lip 1718a can define an outer surface 1719a facing the outer lip 512 and an inner surface 1719b facing the stop lip end 1712a of the elbow fitting 2212. The outer surface 1719a can define an outer angle $A_1$ relative to a radial direction of the axis 1701, and the inner surface 1719b can define an inner angle $A_2$ relative to the radial direction of the axis 1701. In the present aspect, each of the angles $A_1$, $A_2$ can be less than 45 degrees. In some aspects, the angles $A_1$, $A_2$ can be 0 degrees, and the inner surface 1719a and the outer surface 1719b can be parallel to the radial direction of the axis 1701.

Figure 24A:
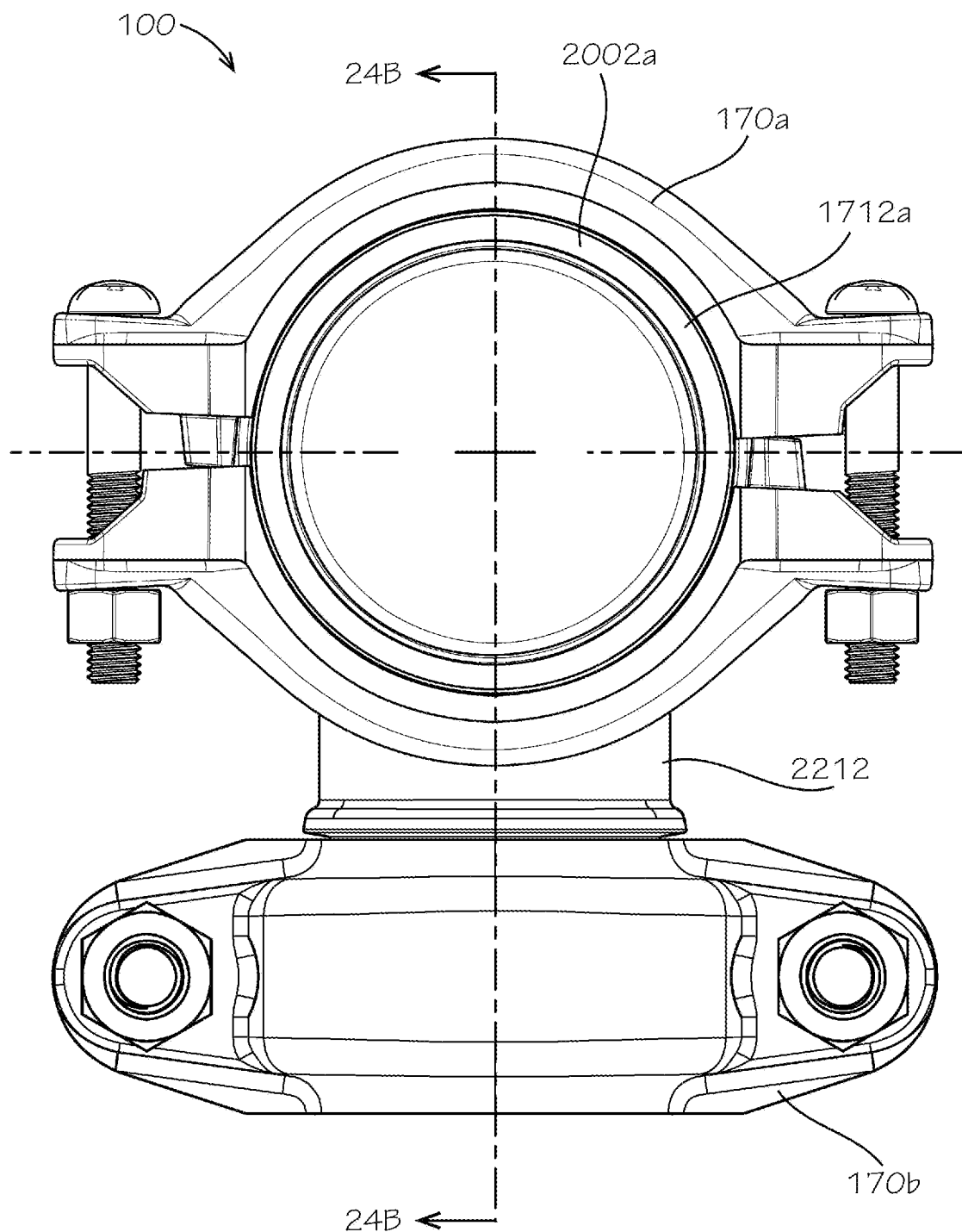
FIG. 24A is an end view of an aspect of the pre-assembled coupling assembly comprising the elbow fitting of FIG. 23A.
Figure 24B:
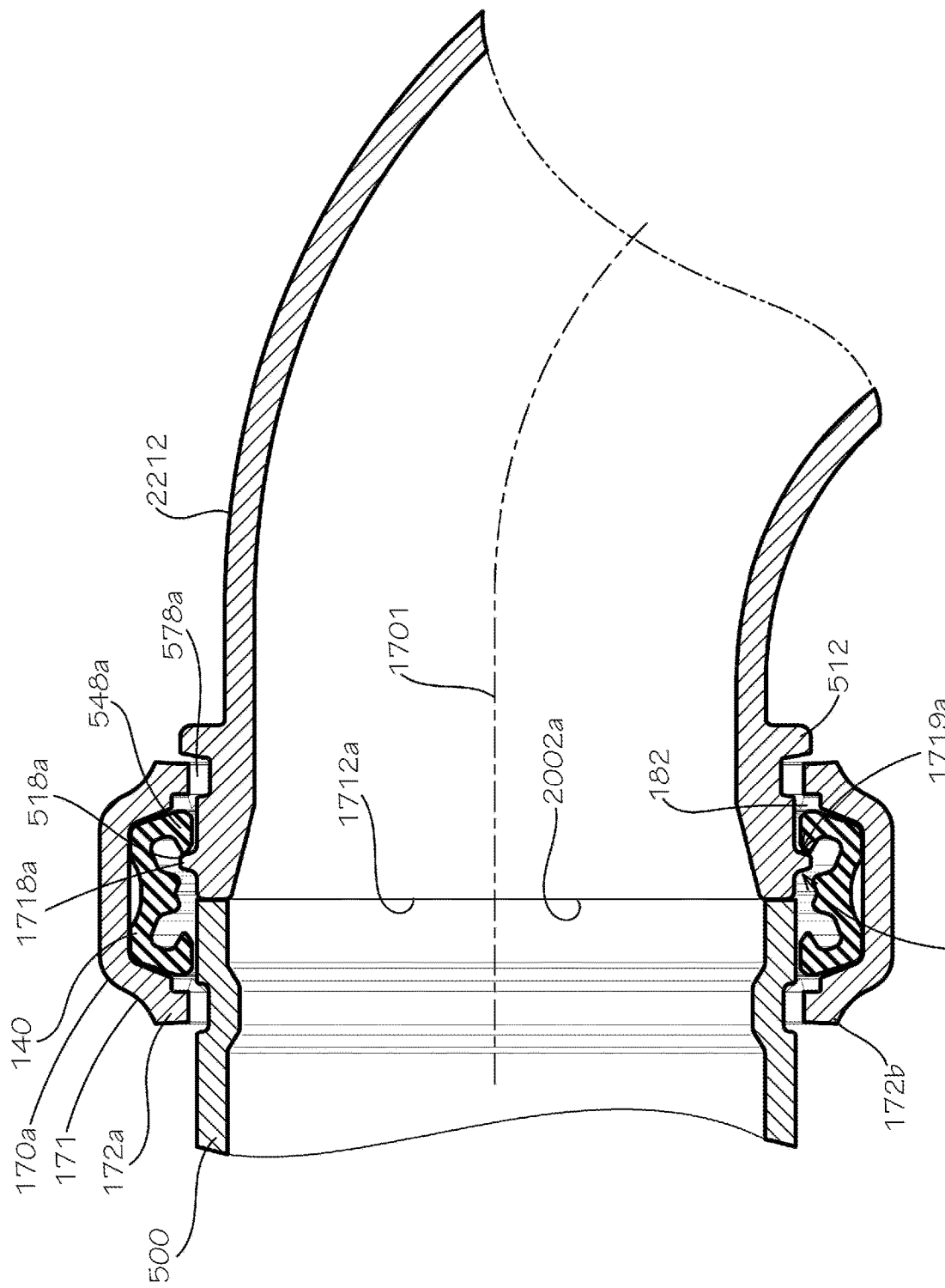
FIG. 24B is a cross-sectional detail side view of the stop lip end of the pre-assembled coupling of FIG. 24A taken along line 24B-24B shown in FIG. 24A with the pipe of FIG. 7.

FIG. 24A is an end view of an aspect of the pre-assembled coupling assembly 100 comprising the elbow fitting 2212 of FIGS. 23A-C. FIG. 24B is a cross-sectional detail side view of the stop lip end 1712a of the pre-assembled coupling 100 of FIG. 24A taken along line 24B-24B shown in FIG. 24A with the pipe 500 of FIG. 7. In the present aspect, the stop lip 1718a can be specifically shaped to prevent insertion and withdrawal of the stop lip end 1712a of the elbow fitting 2212 into the coupling bore 182 when the coupling 170a is in the relaxed position. For example, the stop lip 1718a can extend radially outward far enough to radially overlap with the ridge 578a. Consequently, if a user attempts to insert the stop lip end 1712a into the coupling bore 182 in the relaxed state or remove the stop lip end 1712a from the coupling bore 182 in the relaxed state, interference between the stop lip 1718a and the ridge 578a will prevent the user from succeeding. Instead, the user must disassemble the coupling 170a by separating the first segment 172a from the second segment 172b of the housing 171 to insert or remove the stop lip end 1712a from the coupling bore 182. Therefore, to assemble the pre-assembled coupling 100, the user must first insert the stop lip end 1712a into the gasket 140 and then assembled the housing 171 around the gasket 140 in the present aspect. In some aspects, the stop lip end 1712a cannot be stabbed into the gasket 140 without a tool to aid in expanding the sealing ridge 548a over the stop lip 1718a, particularly in aspects wherein the inner angle $A_2$ (shown in FIG. 23C) approaches a very small value, such as less than 10 degrees.

Figure 25:
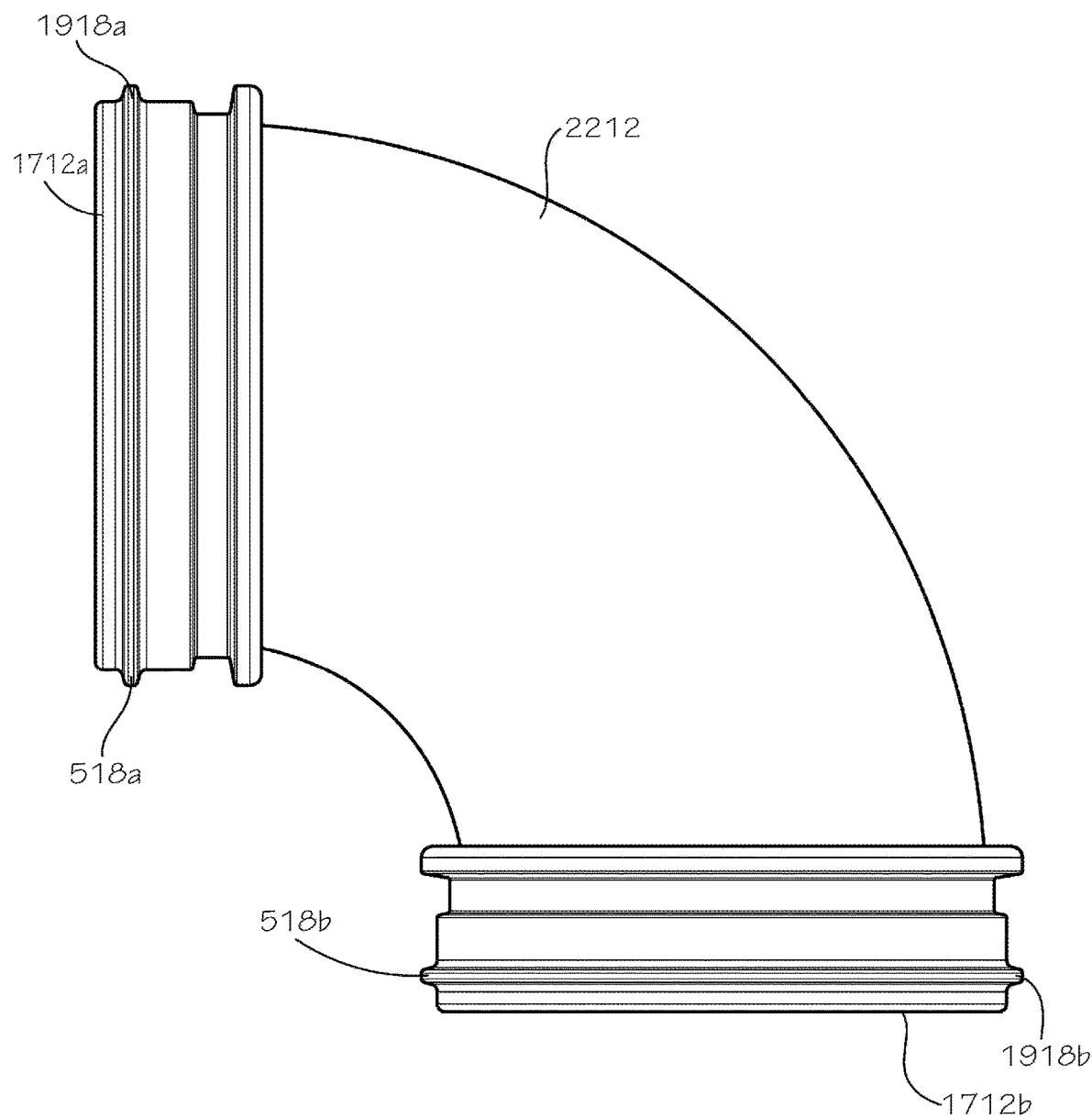
FIG. 25 is a side view of the elbow fitting defining another aspect of the stop lip ends wherein the raised lip is a continuous stop lip in accordance with another aspect of the present disclosure.

FIG. 25 is a side view of the elbow fitting 2212 defining another aspect of the stop lip ends 1712a,b wherein the raised lip 518 is a continuous stop lip 1918 which does not define the circumferential gaps 1720 (shown in FIG. 23A).

Figure 26:
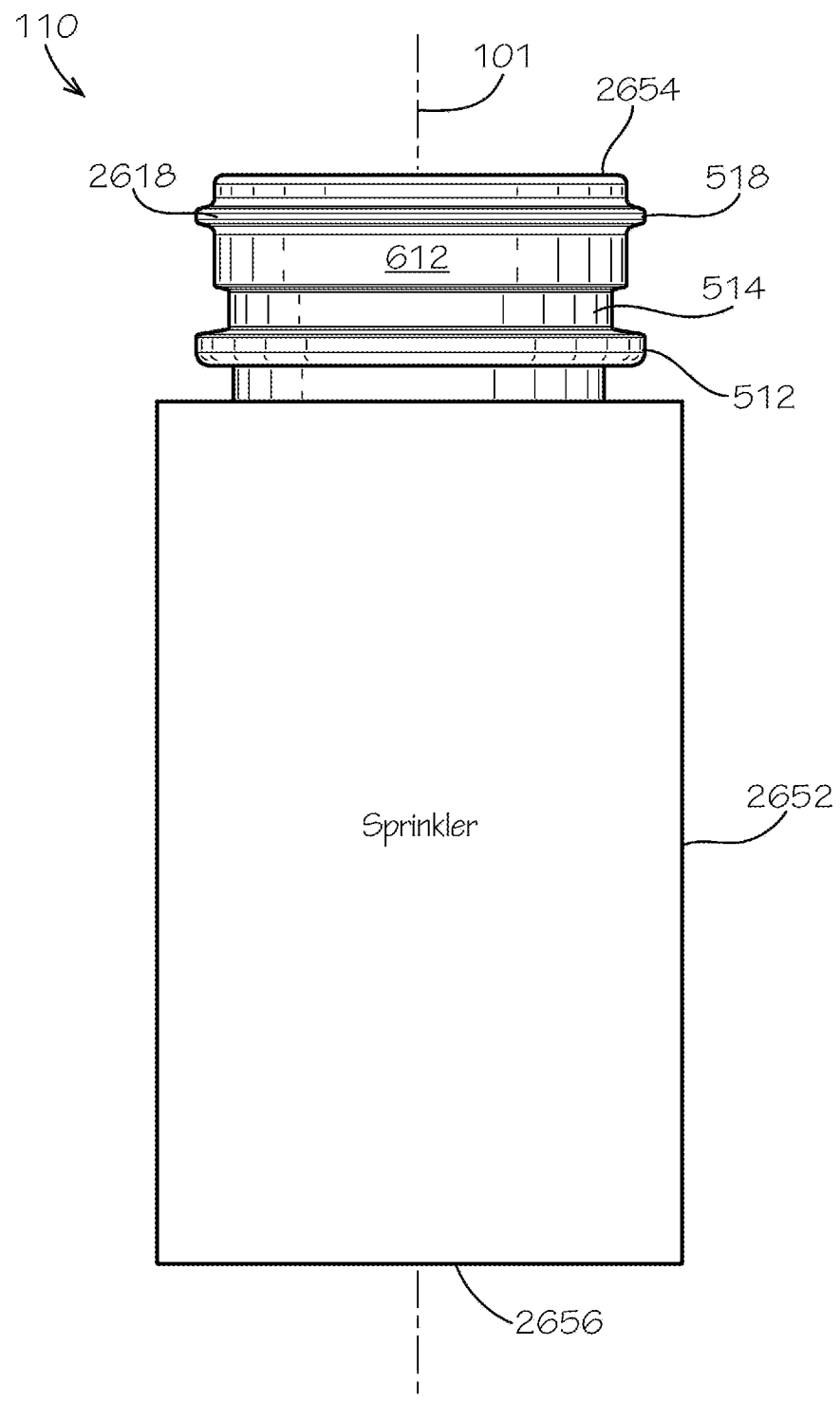
FIG. 26 is a side view of another aspect of the pipe fitting wherein the pipe fitting is a sprinkler in accordance with another aspect of the present disclosure.

As previously disclosed, the pipe fitting 110 can be a sprinkler and thus can comprise any of the previously disclosed raised-lip end arrangements. FIG. 26 is a side view of another aspect of the pipe fitting 110 wherein the pipe fitting 110 is a sprinkler 2652 in accordance with another aspect of the present disclosure. The sprinkler 2652 can define a distal end 2656 and a raised lip end 2654 disposed opposite from the distal end 2656. The sprinkler 2652 can define an axis 101 extending from the distal end 2656 to the raised lip end 2654. The sprinkler 2652 can be a standard sprinkler head that has been modified to define the raised lip 518.

In the present aspect, the raised lip 518 can be a stop lip 2618, similar to the continuous stop lip 1918 of FIG. 25. In other aspects, the raised lip 518 can be a stop lip similar to the stop lip 1718a,b of FIG. 24B. In other aspects, the raised lip 518 can be similar to the raised lip 518a of FIGS. 5A-10. In other aspects, the raised lip 518 can be a recessed raised lip, similar to the recessed raised lip 3018 of FIG. 12 or the recessed raised lip 3218 of FIG. 14. In other aspects, the sprinkler 2652 may not define a raised lip 518, and the outer lip 512 can be a secondary key, similar to the secondary key 1378 of FIG. 11. In such aspects, the sprinkler 2652 can be configured for use with a coupling 170 comprising a grooved housing 1371, as shown in FIG. 11.

The sprinkler 2652 can further define a sealing surface 612, a groove 514, and an outer lip 512 positioned between the raised lip 518 and the distal end 2656. The groove 514, the outer lip 512, and the sealing surface 612 can be similar to the groove 514, the outer lip 512, and the sealing surface 612 of FIGS. 5A-8A.

To pre-assemble the pre-assembled coupling assembly 100, the inner end 516 of the pipe fitting 110 can be inserted into a relaxed gasket 140, without the housing 171 assembled around the gasket 140,3140 so that the inner end 516 can be axially positioned between the sealing ridges 548a,b,3148a,b. In some aspects, the sealing ridge 548a can contact the sealing surface 612 of the pipe fitting 110. As discussed above, in aspects defining the stop lip 1718a,b, a tool or tools may be required to stretch the sealing ridge 548a over the stop lip 1718a,b.

In aspects of the pipe fitting 110 such as that of FIGS. 1-8, 13, 15-22B, the gasket 140,3140 can be retained on the inner end 516 of the pipe fitting 110 due to interference between the sealing ridge 548a,3148a and the raised lip 518. In such aspects the sealing ridge 548a,3148a can be stretched over the raised lip 518 when inserting the inner end 516 through the sealing ridge 548a,3148a and elastic resistance of the sealing ridge 548a,3148a can resist withdrawal of the inner end 516 outward through the sealing ridge 548a,3148a, thereby retaining the relaxed gasket 140,3140 on the pipe fitting 110. In aspects of the pipe fitting 110 such as those of FIGS. 12 and 14, the inner rim 3050,3250 of the gasket 140 can stretch over the raised lip 518,3018,3218 upon insertion of the inner end 516 into the relaxed gasket 140,3040,3240, and the inner rim 3050,3250 can seat in the groove 3014, 3222. Elastic resistance of the inner rim 3050,3250 can resist withdrawal of the inner end 516 of the pipe fitting 110 back through the inner rim 3050,3250, thereby retaining the relaxed gasket 140 on the inner end 516 of the pipe fitting 110. In these aspects of the pipe fitting 110, the housing 171 of the coupling 170 can then be assemble around the gasket 140,3040,3140,3240 by positioning the gasket 140,3040, 3140,3240 within the gasket groove 570 of the segments 172a,b and fastening the segments 172a,b together with the fasteners 176a,b. The gasket 140,3040,3140,3240 can then retain the coupling 170 on the inner end 516 of the pipe fitting 110.

Alternatively, for the aspect of the pipe fitting shown in FIG. 11, the coupling 170 may not be retained on the inner end 516 of the pipe fitting 110 by elastic resistance of the gasket 140. Instead the relaxed gasket 140 can be freely slipped over the inner end 516 with no or minimal resistance, and the grooved housing 1371 can be assembled around the gasket 140 and the secondary key 1378. The segments 172a,b can be aligned so that the gasket 140 fits within the gasket groove 570, and the secondary key 1378 fits within the secondary groove 1372, thereby retaining the coupling 170 on the pipe fitting 110 through interference between the secondary groove 1372 and the secondary key 1378.

Once the coupling 170 is secured on the inner end 516 of the pipe fitting 110, the pipe 500 or another pipe fitting 110 can be stabbed into the assembled coupling 170 opposite from the pipe fitting 110 when the coupling 170 is in the relaxed position. The coupling 170 can then be tightened to the tensioned position by tightening the fasteners 176*a,b*, thereby securing and sealing the pipe fitting 110 to the pipe 500 or another pipe element. In other aspects, the assembled coupling 170 in the relaxed position can be slipped over the pipe fitting 110 to secure the coupling 170 on the inner end 516 of the pipe fitting 110. By contrast, aspects defining the stop lip 1718*a,b* can be specifically configured to prevent the assembled coupling 170 from being slipped over the stop lip 1718*a,b*.

The disclosed examples of pipe fittings 110 are exemplary and should not be viewed as limiting. The pipe fitting 110 can be any type of fitting such as a reducer, sprinkler, wye fitting, nipple, trap, valve, regulator, adapter, quick disconnect coupling end, or any other suitable type of fitting.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sprinkler configured for engagement with a coupling, the sprinkler comprising:
    a raised lip end;
    a distal end disposed opposite from the raised lip end;
    a sealing surface proximate to the raised lip end;
    a raised lip extending radially outward from the sealing surface at the raised lip end; and
    a groove extending radially inward from the sealing surface between the sealing surface and the distal end.

2. The sprinkler of claim 1, wherein the raised lip is a stop lip, and the sprinkler further defines the sealing surface between the stop lip and the groove, the sprinkler further comprising an outer lip that is further from the raised lip end than the groove.

3. The sprinkler of claim 1, wherein the sprinkler defines an outer lip disposed between the groove and the distal end.

4. A pre-assembled coupling assembly comprising:
    a coupling, the coupling defining a coupling bore extending through the coupling, the coupling comprising a gasket disposed within the coupling bore, the gasket being relaxed and uncompressed when the coupling is in a relaxed position; and
    a sprinkler, comprising:
       a raised lip end;
       a distal end disposed opposite from the raised lip end;
       a sealing surface proximate to the raised lip end;
       a raised lip extending radially outward from the sealing surface and inserted into the coupling bore, the coupling retained on the raised lip end of the sprinkler when the coupling is in the relaxed position; and
       a groove extending radially inward from the sealing surface between the sealing surface and the distal end.

5. The pre-assembled coupling assembly of claim 4, wherein:
    the sprinkler defines an axis extending from the raised lip end of the sprinkler to the distal end of the sprinkler;
    the sprinkler defines the raised lip positioned within the coupling bore; and
    the raised lip extends radially outward relative to the axis from the sealing surface of the sprinkler.

6. The pre-assembled coupling assembly of claim 5, wherein:
    the gasket defines a first sealing ridge and a second sealing ridge; and
    the raised lip is positioned axially between the first sealing ridge and the second sealing ridge with respect to the axis.

7. The pre-assembled coupling assembly of claim 5, wherein the gasket defines a center ridge that contacts the raised lip when the coupling is in a tensioned position.

8. The pre-assembled coupling assembly of claim 4, wherein:
    the sprinkler defines an axis extending from the raised lip end of the sprinkler to the distal end of the sprinkler; and
    at least a portion of the sprinkler positioned within the coupling bore is disposed radially outward from at least a part of the gasket with respect to the axis when the coupling is in the relaxed position.

9. The pre-assembled coupling assembly of claim 4, wherein the sprinkler defines an outer lip, wherein the coupling defines a ridge, and wherein the outer lip is configured to locate the ridge of the coupling above the groove of the sprinkler.

10. A method for using a pre-assembled coupling assembly, the method comprising:
    providing a sprinkler defining a raised lip end and a distal end disposed opposite from the raised lip end, the sprinkler defining a sealing surface proximate to the raised lip end, the sprinkler defining an axis extending from the raised lip end to the distal end, wherein a raised lip extends radially outward from the sealing surface and a groove extends radially inward from the sealing surface from the axis;

axially inserting the raised lip end into a gasket, the raised lip of the sprinkler positioned radially outward from at least a portion of the gasket relative to the axis; and assembling a housing around the gasket, the housing and the gasket comprising a coupling, the coupling retained on the raised lip end of the sprinkler when the coupling is in a relaxed position.

11. The method of claim 10, further comprising positioning a sealing ridge of the gasket axially between the raised lip end and the distal end relative to the axis.

12. The method of claim 10, further comprising stretching a sealing ridge of the gasket over the raised lip of the sprinkler.

13. The method of claim 10, wherein assembling the housing around the gasket comprises fastening at least one segment around the gasket, the at least one segment defining a gasket groove, the gasket seated within the gasket groove.

14. The method of claim 10, further comprising inserting an end of a pipe into the coupling.

\* \* \* \* \*